US007833102B2

(12) United States Patent
Beadell et al.

(10) Patent No.: US 7,833,102 B2
(45) Date of Patent: Nov. 16, 2010

(54) GAMING MACHINE WITH CONSOLIDATED PERIPHERALS

(75) Inventors: John Leagh Beadell, Sparks, NV (US); Russell Chudd, Reno, NV (US); Fred Nesemeier, Reno, NV (US); Randy Hedrick, Reno, NV (US); Charles Curbbun, Encinitas, CA (US); Andrew Zoolakis, Carlsbad, CA (US); Kevin Simmons, San Diego, CA (US); Bill Leach, Huntington Beach, CA (US)

(73) Assignee: IGT, Reno, NV (US)

( * ) Notice: Subject to any disclaimer, the term of this patent is extended or adjusted under 35 U.S.C. 154(b) by 291 days.

(21) Appl. No.: 11/598,261

(22) Filed: Nov. 9, 2006

(65) Prior Publication Data

US 2008/0113709 A1 May 15, 2008

(51) Int. Cl.
*A63F 13/08* (2006.01)

(52) U.S. Cl. ........................................................ 463/46

(58) Field of Classification Search .................... 463/46
See application file for complete search history.

(56) References Cited

U.S. PATENT DOCUMENTS

| | | | |
|---|---|---|---|
| 3,796,433 | A | 3/1974 | Fraley et al. |
| 4,084,194 | A | 4/1978 | Hector |
| 4,099,722 | A | 7/1978 | Rodesch et al. |
| 4,247,845 | A | 1/1981 | Schmidt et al. |
| 4,363,486 | A | 12/1982 | Chaudhry et al. |
| 4,422,775 | A | 12/1983 | Thoenig |
| 4,440,457 | A | 4/1984 | Fogelman et al. |
| 4,454,670 | A | 6/1984 | Bachmann et al. |
| 4,527,798 | A | 7/1985 | Siekierski et al. |

(Continued)

FOREIGN PATENT DOCUMENTS

| | | | |
|---|---|---|---|
| EP | 0 274 879 | A2 | 7/1988 |

(Continued)

OTHER PUBLICATIONS

International Search Report and Written Opinion for Application No. PCT/US2007/084131 dated Apr. 4, 2008.

(Continued)

*Primary Examiner*—Dmitry Suhol
*Assistant Examiner*—Werner Garner
(74) *Attorney, Agent, or Firm*—Weaver Austin Villeneuve & Sampson LLP

(57) ABSTRACT

Disclosed are gaming machines, including related methods, apparatus, and systems, including computer program products, implementing and using techniques for providing a game of chance. Peripheral devices are consolidated in a first region of the gaming machine, behind a first door of the machine. The peripheral devices include a printer having a ticket stack and a bill acceptor having a cashbox. The printer is configured to print and dispense tickets from the ticket stack. The bill acceptor is configured to receive cash and store the cash in the cashbox. The ticket stack and the bill acceptor each have an access portion situated in the first region for access when the first door is open. A second door is mounted to the cabinet in a second region of the cabinet. The second door encloses a processor coupled to output game data to a display and control play of the game of chance.

20 Claims, 27 Drawing Sheets

U.S. PATENT DOCUMENTS

| | | | |
|---|---|---|---|
| 4,551,717 A | 11/1985 | Dreher | |
| 4,554,419 A | 11/1985 | King et al. | |
| 4,567,481 A | 1/1986 | Meier et al. | |
| 4,662,637 A | 5/1987 | Pfeiffer | |
| 4,718,672 A | 1/1988 | Okada | |
| 4,745,543 A | 5/1988 | Michener et al. | |
| 4,760,527 A | 7/1988 | Sidley | |
| 4,792,783 A | 12/1988 | Burgess et al. | |
| 4,818,672 A | 4/1989 | Masukawa et al. | |
| 5,024,439 A | 6/1991 | Okada | |
| 5,113,990 A | 5/1992 | Gabrius et al. | |
| 5,127,651 A | 7/1992 | Okada | |
| 5,202,549 A | 4/1993 | Decker et al. | |
| 5,243,697 A | 9/1993 | Hoeber et al. | |
| 5,321,241 A | 6/1994 | Craine | |
| 5,342,047 A | 8/1994 | Heidel et al. | |
| 5,370,399 A | 12/1994 | Liverance | |
| 5,404,406 A | 4/1995 | Fuchigami et al. | |
| 5,472,195 A | 12/1995 | Takemoto et al. | |
| 5,477,952 A | 12/1995 | Castellano et al. | |
| 5,509,655 A | 4/1996 | Ugawa | |
| 5,510,809 A | 4/1996 | Sakai et al. | |
| 5,537,290 A | 7/1996 | Brown et al. | |
| 5,572,239 A | 11/1996 | Jaeger | |
| 5,603,659 A | 2/1997 | Okada | |
| 5,611,730 A | 3/1997 | Weiss | |
| 5,630,081 A | 5/1997 | Rybicki et al. | |
| 5,657,221 A | 8/1997 | Warman et al. | |
| 5,684,879 A | 11/1997 | Verdick | |
| 5,687,331 A | 11/1997 | Volk et al. | |
| 5,694,562 A | 12/1997 | Fisher | |
| 5,712,661 A | 1/1998 | Jaeger | |
| 5,720,662 A | 2/1998 | Holmes, Jr. et al. | |
| 5,739,809 A | 4/1998 | McLaughlin et al. | |
| 5,765,797 A | 6/1998 | Green et al. | |
| 5,774,115 A | 6/1998 | Jaeger et al. | |
| 5,786,811 A | 7/1998 | Jaeger | |
| 5,805,145 A | 9/1998 | Jaeger | |
| 5,805,146 A | 9/1998 | Jaeger et al. | |
| 5,813,914 A | 9/1998 | McKay et al. | |
| 5,818,361 A | 10/1998 | Acevedo | |
| 5,826,882 A | 10/1998 | Ward | |
| 5,834,889 A | 11/1998 | Ge | |
| 5,841,428 A | 11/1998 | Jaeger et al. | |
| 5,867,149 A | 2/1999 | Jaeger | |
| 5,876,285 A | 3/1999 | Salour et al. | |
| 5,882,261 A | 3/1999 | Adams | |
| 5,914,676 A | 6/1999 | Akpa | |
| 5,936,613 A | 8/1999 | Jaeger et al. | |
| 5,956,876 A | 9/1999 | Burdette et al. | |
| 5,966,125 A | 10/1999 | Johnson | |
| 5,971,850 A | 10/1999 | Liverance | |
| 5,977,955 A | 11/1999 | Jaeger | |
| D421,774 S | 3/2000 | Toriyama | |
| 6,068,101 A | 5/2000 | Dickenson et al. | |
| 6,071,190 A | 6/2000 | Weiss et al. | |
| 6,102,394 A | 8/2000 | Wurz et al. | |
| 6,106,393 A | 8/2000 | Sunaga et al. | |
| 6,110,041 A | 8/2000 | Walker et al. | |
| 6,117,010 A | 9/2000 | Canterbury et al. | |
| 6,126,542 A | 10/2000 | Fier | |
| 6,134,103 A | 10/2000 | Ghanma | |
| 6,135,884 A | 10/2000 | Hedrick et al. | |
| 6,146,273 A | 11/2000 | Olsen | |
| 6,146,274 A | 11/2000 | Salour et al. | |
| 6,164,645 A | 12/2000 | Weiss | |
| 6,165,069 A | 12/2000 | Sines et al. | |
| 6,201,532 B1 | 3/2001 | Tode et al. | |
| 6,201,703 B1 | 3/2001 | Yamada et al. | |
| 6,213,875 B1 | 4/2001 | Suzuki | |
| 6,217,448 B1 | 4/2001 | Olsen | |
| 6,227,970 B1 | 5/2001 | Shimizu et al. | |
| 6,270,404 B2 | 8/2001 | Sines et al. | |
| 6,275,217 B1 | 8/2001 | Jaeger | |
| 6,315,663 B1 | 11/2001 | Sakamoto | |
| 6,315,666 B1 | 11/2001 | Mastera et al. | |
| 6,319,125 B1 | 11/2001 | Acres | |
| 6,342,901 B1 | 1/2002 | Adler et al. | |
| 6,350,199 B1 | 2/2002 | Williams et al. | |
| 6,364,314 B1 | 4/2002 | Canterbury | |
| 6,364,769 B1 | 4/2002 | Weiss et al. | |
| 6,368,216 B1 | 4/2002 | Hedrick et al. | |
| 6,398,217 B1 | 6/2002 | Shimizu et al. | |
| 6,435,970 B1 | 8/2002 | Baerlocher et al. | |
| 6,454,649 B1 | 9/2002 | Mattice et al. | |
| 6,461,239 B1 | 10/2002 | Sagawa et al. | |
| 6,475,087 B1 | 11/2002 | Cole | |
| 6,491,298 B1 * | 12/2002 | Criss-Puszkiewicz et al. | 273/148 R |
| 6,520,308 B1 | 2/2003 | Martin et al. | |
| 6,565,434 B1 | 5/2003 | Acres | |
| 6,575,090 B1 * | 6/2003 | Vienneau et al. | 101/66 |
| 6,609,969 B1 | 8/2003 | Luciano et al. | |
| 6,609,970 B1 | 8/2003 | Luciano, Jr. | |
| 6,641,483 B1 | 11/2003 | Luciano et al. | |
| 6,641,484 B2 | 11/2003 | Oles et al. | |
| 6,645,077 B2 | 11/2003 | Rowe | |
| 6,646,695 B1 | 11/2003 | Gauselmann | |
| 6,688,984 B2 | 2/2004 | Cole | |
| 6,700,567 B1 | 3/2004 | Jaeger et al. | |
| 6,769,688 B1 | 8/2004 | Lean | |
| 6,769,982 B1 | 8/2004 | Brosnan | |
| 6,798,359 B1 | 9/2004 | Ivancic | |
| 6,835,133 B2 | 12/2004 | Baerlocher et al. | |
| 6,843,720 B2 | 1/2005 | Luciano et al. | |
| 6,860,814 B2 | 3/2005 | Cole | |
| 6,880,825 B2 | 4/2005 | Seelig et al. | |
| 6,908,387 B2 | 6/2005 | Hedrick et al. | |
| 6,923,720 B2 | 8/2005 | Loose | |
| 6,964,370 B1 | 11/2005 | Hagale et al. | |
| 6,976,919 B2 | 12/2005 | Cole | |
| 6,984,174 B2 | 1/2006 | Cannon et al. | |
| 6,997,810 B2 | 2/2006 | Cole | |
| 7,008,324 B1 | 3/2006 | Johnson et al. | |
| 7,071,845 B2 | 7/2006 | Ivancic | |
| 7,084,860 B1 | 8/2006 | Jaeger et al. | |
| 7,113,175 B2 | 9/2006 | Liu et al. | |
| 7,125,333 B2 | 10/2006 | Brosnan | |
| 2002/0010018 A1 | 1/2002 | Lemay et al. | |
| 2002/0050983 A1 | 5/2002 | Liu et al. | |
| 2002/0141643 A1 | 10/2002 | Jaeger | |
| 2002/0142846 A1 | 10/2002 | Paulsen | |
| 2002/0160826 A1 | 10/2002 | Gomez et al. | |
| 2002/0183106 A1 | 12/2002 | Cole | |
| 2003/0100357 A1 | 5/2003 | Walker et al. | |
| 2003/0153385 A1 | 8/2003 | Ikeya et al. | |
| 2004/0018870 A1 | 1/2004 | Cole | |
| 2004/0053663 A1 | 3/2004 | Paulsen et al. | |
| 2004/0132528 A1 * | 7/2004 | Gauselmann | 463/29 |
| 2004/0147316 A1 | 7/2004 | Nagano | |
| 2005/0026702 A1 | 2/2005 | Cole | |
| 2005/0032578 A1 | 2/2005 | Cole | |
| 2005/0037843 A1 | 2/2005 | Wells et al. | |
| 2005/0059458 A1 | 3/2005 | Griswold et al. | |
| 2005/0077995 A1 * | 4/2005 | Paulsen et al. | 340/5.6 |
| 2005/0113163 A1 | 5/2005 | Mattice et al. | |
| 2005/0143176 A1 | 6/2005 | Cole | |
| 2005/0255924 A1 | 11/2005 | Cole | |
| 2005/0277477 A1 | 12/2005 | Hajder et al. | |
| 2005/0282631 A1 | 12/2005 | Bonney et al. | |
| 2006/0014586 A1 | 1/2006 | Gatto et al. | |
| 2006/0030412 A1 | 2/2006 | Cole | |
| 2006/0068908 A1 | 3/2006 | Pryzby et al. | |
| 2006/0189387 A1 | 8/2006 | Rigsby et al. | |

| | | | | |
|---|---|---|---|---|
| 2006/0199640 | A1 | 9/2006 | Emori et al. | |
| 2006/0247047 | A1 | 11/2006 | Mitchell et al. | |
| 2006/0247048 | A1 | 11/2006 | Mitchell et al. | |
| 2006/0277805 | A1 | 12/2006 | Kopera et al. | |
| 2006/0287112 | A1 * | 12/2006 | Mallory et al. | 463/46 |
| 2006/0290530 | A1 | 12/2006 | Ivancic | |
| 2007/0032949 | A1 | 2/2007 | Arai et al. | |
| 2007/0077984 | A1 | 4/2007 | Aida et al. | |

FOREIGN PATENT DOCUMENTS

| | | | |
|---|---|---|---|
| EP | 0 896 305 | A2 | 10/1999 |
| EP | 0 896 308 | A1 | 10/1999 |
| EP | 1262928 | A2 | 12/2002 |
| EP | 1298604 | A2 | 4/2003 |
| EP | 1494183 | A2 | 1/2005 |
| EP | 1544025 | A2 | 6/2005 |
| EP | 1686549 | A1 | 8/2006 |
| EP | 1298604 | A | 9/2006 |
| EP | 1074954 | | 2/2007 |
| GB | 2388696 | | 11/2003 |
| JP | 2003062156 | | 3/2003 |
| JP | 2003169899 | | 6/2003 |
| JP | 2003190398 | | 7/2003 |
| JP | 2004229956 | | 8/2004 |
| WO | WO 94/24683 | | 10/1994 |
| WO | WO 2006/015046 | | 2/2006 |
| WO | WO 2007/032949 | A1 | 3/2007 |

OTHER PUBLICATIONS

International Search Report and Written Opinion for Application No. PCT/US2007/084164 dated May 14, 2008.

International Search Report and Written Opinion for Application No. PCT/US2007/023564 dated May 7, 2008.

U.S. Appl. No. 11/558,853, filed Nov. 10, 2006.

U.S. Appl. No. 11/558,860, filed Nov. 10, 2006.

International Search Report and Written Opinion mailed Apr. 29, 2008 for PCT Application No. PCT/US2007/023394.

International Search Report and Written Opinion mailed Jun. 11, 2008 for PCT Application No. PCT/US2007/023701.

International Search Report and Written Opinion mailed Aug. 11, 2008 for PCT Application No. PCT/US2007/023568.

International Search Report and Written Opinion mailed Sep. 15, 2008 for PCT Application No. PCT/US2007/023509.

US Office Action dated Jan. 29, 2009 issued in U.S. Appl. No. 11/595,803.

US Office Action dated Jan. 29, 2009 issued in U.S. Appl. No. 11/598,251.

US Office Action dated Feb. 5, 2009 issued in U.S. Appl. No. 11/598,254.

US Office Action dated Feb. 19, 2009 issued in U.S. Appl. No. 11/598,216

US Office Action dated Feb. 25, 2009 issued in U.S. Appl. No. 11/598,253.

US Office Action dated Mar. 2, 2009 issued in U.S. Appl. No. 11/598,252.

European Office Action dated Oct. 16, 2009 issued in 07867388.6.

US Final Office Action dated Sep. 18, 2009 issued in U.S. Appl. No. 11/598,261.

US Final Office Action dated Oct. 1, 2009 issued in U.S. Appl. No. 11/598,253.

US Final Office Action dated Oct. 2, 2009 issued in U.S. Appl. No. 11/595,803.

US Final Office Action dated Oct. 2, 2009 issued in U.S. Appl. No. 11/598,216.

US Final Office Action dated Oct. 6, 2009 issued in U.S. Appl. No. 11/598,251.

* cited by examiner

GAMING MACHINE WITH CONSOLIDATED PERIPHERALS

CROSS-REFERENCE TO RELATED APPLICATIONS

The present application relates to the following commonly assigned U.S. patent applications:

Ser. No. 11/598,252, Beadell et al., filed concurrently herewith, for GAMING MACHINE WITH ADJUSTABLE BUTTON PANEL, Ser. No. 11/595,803, Beadell et al., filed concurrently herewith, for CONTROLLABLE ARRAY OF NETWORKED GAMING MACHINE DISPLAYS, Ser. No. 11/598,216, Beadell et al., filed concurrently herewith, for BUTTON PANEL CONTROL FOR A GAMING MACHINE, Ser. No. 11/598,254, Beadell et al., filed concurrently herewith, for PERSONALIZATION OF VIDEO AND SOUND PRESENTATION ON A GAMING MACHINE, Ser. No. 11/598,253, Beadell et al., filed concurrently herewith, for SPEAKER ARRANGEMENT AND CONTROL ON A GAMING MACHINE, and Ser. No. 11/598,251, Beadell et al., filed concurrently herewith, for GAMING MACHINE WITH VERTICAL DOOR-MOUNTED DISPLAY.

The above-listed applications are all incorporated herein by reference in their entirety for all purposes.

FIELD OF THE INVENTION

The present invention relates to gaming machines, such as slot machines and video poker machines. More particularly, the present invention relates to apparatus and methods for facilitating access and use of gaming machines.

BACKGROUND OF THE INVENTION

Gaming in the United States is divided into Class I, Class II and Class III games. Class I gaming includes social games played for minimal prizes, or traditional ceremonial games. Class II gaming includes bingo games, pull tab games if played in the same location as bingo games, lotto, punch boards, tip jars, instant bingo, and other games similar to bingo. Class III gaming includes any game that is not a Class I or Class II game, such as a game of chance typically offered in non-Indian, state-regulated casinos. Many games of chance that are played on gaming machines fall into the Class II and Class III categories of games.

As technology in the gaming industry progresses, the traditional mechanically driven reel slot machines are being replaced with electronic counterparts, that is, electronic gaming machines having video displays based on CRT, LCD, plasma, or the like. Electronic gaming machines such as video slot machines and video poker machines are becoming increasingly popular. Part of the reason for their increased popularity is the nearly endless variety of games that can be made available for play on a single gaming machine. Advancements in video and electronic gaming enable the operation of more complex games that would not otherwise be possible on mechanical-driven gaming machines or personal computers.

Various games, particularly the Class II and Class III categories of games, can be implemented as server-based games in a server-client system. In a server-based gaming arrangement, a gaming server serves multiple gaming machines as clients. For example, a casino can include a plurality of gaming machines located on the game floor, and a connected gaming server located in a back room of the casino. Generally, the games and capabilities of a gaming machine depend on the central server. Games can be downloaded from the central server to the gaming machines for execution, for instance, when initiated by casino operations management. Alternatively, the central server can execute the games and output game data to the gaming machines.

To enhance the gaming experience, there are a number of peripheral components/devices that can be connected to a gaming machine such as a slot machine or video poker machine. Examples of these devices include player tracking units, lights, ticket printers, card readers, speakers, bill acceptors/validators, ticket readers, coin acceptors, display panels, key pads, coin hoppers and button pads. These peripheral devices are built into the gaming machine or otherwise attached to the gaming machine. For instance, a top box is often constructed as a separate component on top of the gaming machine.

Typically, using a master gaming controller, a gaming machine controls various combinations of devices that allow a player to play a game on the gaming machine and also encourage game play on the gaming machine. For example, a game played on a gaming machine usually requires a player to input money or an indicia of credit into the gaming machine, indicate a wager amount, and initiate game play. These steps require the gaming machine to control input devices, such as bill acceptors/validators and coin acceptors, to accept money into the gaming machine and recognize user inputs from devices, including key pads, button pads, card readers, and ticket readers, to determine the wager amount, and initiate game play.

After game play has been initiated, the gaming machine determines a game outcome, presents the game outcome to the player and may dispense an award of some type depending on the outcome of the game. A game outcome presentation may utilize many different visual and audio components such as lights, music, sounds and graphics. The visual and audio components of the game outcome presentation may be used to draw a player's attention to various game features and to heighten the player's interest in additional game play.

Maintaining a game player's interest in game play, such as on a gaming machine or during other gaming activities, is an important consideration for an operator of a gaming establishment. More and more gaming services are being provided to gaming machines to maintain player interest. These services can be offered via communication networks that link groups of gaming machines to a remote computer, such as a host server, that provides one or more gaming services. As an example, gaming services that may be provided by a remote computer to a gaming machine via a communication network of some type include player tracking, accounting, cashless award ticketing, lottery, progressive games, and bonus games or prizes. These services and features are provided in addition to the games that are available for play on the gaming machines.

The traditional method of dispensing coins or tokens as awards for winning game outcomes is being supplemented by ticket printers/dispensers which print ticket vouchers that may be exchanged for cash or accepted as credit of indicia in other gaming machines for additional game play. An award ticket system, which allows award ticket vouchers to be dispensed and utilized by other gaming machines, increases the operational efficiency of maintaining a gaming machine and simplifies the player pay out process. An example of an award ticket system is the EZ pay ticket system by IGT of Reno, Nev. Award ticket systems and systems using other cashless mediums are referred to as cashless systems.

Cashless systems, such as the EZ pay ticket system, provide advantages to both game players and casino operators. For example, many players find it more convenient to carry an award ticket than a large number of coins. For gaming machine operators, cashless systems tend to reduce gaming machine operating costs. For example, the infrastructure needed to remove and count indicia of credit (e.g. coins, tokens, bills) from the gaming machine may be eliminated or minimized when it is replaced with a cashless system, which reduces the gaming machine operating costs. Further, coin dust, which is potentially damaging to the components of the gaming machine (e.g. electronic components) may be eliminated or minimized when coin acceptors are replaced with the cashless system. Of course, gaming machines still incorporate bill validators for players who prefer to use cash to play the machines.

Access to certain peripheral devices, namely the ticket printer and bill acceptor within the gaming machine, is important. On a daily or weekly basis, casino personnel often need to access both the ticket printer to replenish tickets, and the bill acceptor to remove cash. Sometimes, IGT technicians also need to access these peripherals to service them. In conventional gaming machines, the structure of the machine and orientation of the ticket printer and bill acceptor within the machine often require separate doors for access to the respective peripherals. Increased time is needed to service gaming machines with separate doors, because the doors must be separately unlocked and opened for access of both peripheral components. Awkward and crammed locations for the cash storage component of the bill acceptor, and/or the ticket storage part of the ticket printer, contribute to increased service time, and limitations on the amount of tickets and cash that can be stored within the machine. Increased service time leads to increases in the cost to customers for operation of the gaming machine. The more service time that is required, the more unavailable the machine is for game play. Also, in configurations where one or both of the peripherals are located in the same enclosed area as the master gaming controller, security of the controller can be compromised.

As casino floors become crowded with gaming machines, there is an increased likelihood for interference among the machines. Gaming machines are often located side-by-side in rows or banks on a casino floor or other gaming environment, and are otherwise in close proximity to one another, for instance, with narrow walkways between machines facing one another. Conventional gaming machines often have a front door with a door-mounted video display and button panel. Casino personnel and/or gaming machine technicians can unlock and open the door to access and service interior components of the machine, such as the bill acceptor and ticket printer. Conventional gaming machine doors are generally mounted to the machine by hinges at one side of the door, so the door opens and closes in a horizontal direction. When the machine is located in close proximity to other machines on the floor, for instance, adjacent machines in a row or bank of gaming machines, the door cannot be opened without physically contacting and interfering with the other machines. For instance, a protruding button panel on the door may be abutted against an adjacent machine before the door can be completely opened. Consequently, service is hindered and delayed until the machines can be re-positioned, if at all, and play on nearby machines may be obstructed.

Maximizing player time at the gaming machine is a primary focus for the gaming machine industry. Hence player comfort is paramount. One component, the player button panel for interacting with the machine, has a significant impact on player comfort. When a player is playing the gaming machine, a button panel placed too high or too low can detrimentally affect player ergonomics, leading to discomfort or pain. Players can get fatigued after sitting in uncomfortable positions for lengthy time periods, and constantly adjusting their position relative to the machine with no success. Such adjustments can add to frustration of the player, which is the opposite effect the gaming environment wishes to have on players of the gaming machines. Thus, proper placement of the button panel in relation to the player is important.

Gaming machines are often designed with an optimum button panel height for the average player. However, the intended height is based on assumptions as to the height of a stand supporting the machine, and a seat for the player. Gaming machine manufacturers often have their own optimized stand height, but casino operators often substitute their own stands of different height for aesthetic and functional purposes. Different machine stands or chairs may place the button panel in relation to the player seat height outside the acceptable range. Thus, the intended height for the button panel is often compromised during the installation process. Machine earnings can be adversely affected due to the resulting uncomfortable player position.

An additional source of frustration, particularly for new and/or inexperienced players, is unfamiliarity with buttons and other controls on the button panel of the machine. Button panel layouts can be confusing. A multitude of buttons for game play input and control of machine parameters and other settings, can seem daunting to players simply looking for the appropriate button to press at a stage of game play, such as "Deal." Also, the selection of lighting and colors on the machine, including a button panel, can frustrate players who do not respond favorably to the selected lighting and colors. For instance, a significant portion of the general public may reject certain lighting and color schemes because of cultural preferences and superstitions. Due to wide variations in player preferences, a casino may unknowingly alienate a percentage of players who, for example, do not like the color green. As machines become increasingly sophisticated, with intricate control mechanisms, panel layouts, color and lighting schemes, and other presentations of information, players seeking a simple and fun gaming experience may lose interest in playing those machines.

Other components of conventional gaming machines can add to player dissatisfaction with the gaming experience. The visual and audio presentation of a game may not be pleasing to the player, depending on the player's preferences. For instance, the video display may be too bright or dim for a given player. Whether a response to video and audio output of a gaming machine is favorable also depends on environmental conditions at the location of the gaming machine. Often, the gaming environment may be noisy due to the presence of other gaming machines broadcasting sounds and music. The player may lose interest in game play, feeling that the sound of the machine is to low, or that there is too much noise pollution.

Modern casino floor layouts often have gaming machines grouped into banks of machines. For example, all of the machines in a bank may be provided with similar games, and the same or similar game themes. Also, various machines may be coupled to participate in the same bonus game, or coupled to a tournament game server to participate in a tournament game. In such arrangements, it is often desirable to draw the attention of one or more players to a particular machine, or a display or other device when certain events occur. The casino operator might also wish to focus patron attention to an area of the casino, such as a new restaurant or bar. Also, there may be a need to simultaneously communicate information to casino personnel, such as a security breach at a gaming machine, and communicate information to one or more players at the machine or other machines in the bank. In conventional arrangements, a multitude of gaming machines having different and uncoordinated lighting, sounds, graphics, and displays, can hinder attempts to focus player and patron attention and communicate information when it is desired.

What are needed are gaming machines and gaming machine configurations, which facilitate access and use of the machines, and heighten and maintain player interest in playing games of chance on the machines.

SUMMARY OF THE INVENTION

Disclosed are gaming machines, including related methods, apparatus, and systems, including computer program products, implementing and using techniques for providing a game of chance.

According to one aspect of the present invention, a gaming machine is provided for playing a game of chance. The gaming machine includes a cabinet having a longitudinal axis. A first door is mounted to the cabinet in a first region of the cabinet. The first door has a closed position enclosing a plurality of peripheral devices. The first door is movable to an open position to permit access to the peripheral devices. The peripheral devices include a printer having a ticket stack and a bill acceptor having a cash box. The printer is configured to print and dispense tickets from the ticket stack, and the bill acceptor is configured to receive cash for a wager on the game of chance and to store the cash in the cash box. The ticket stack and the bill acceptor each have an access portion situated in the first region for access when the first door is in the open position. A second door is mounted to the cabinet in a second region of the cabinet. The second door has a closed position enclosing a processor coupled to output game data to a display and to control play of the game of chance. The second door is movable to an open position to permit access to the processor. A button panel is mounted to the cabinet and coupled to the processor to provide player input for the game of chance. The button panel is positioned along the longitudinal axis.

In one implementation, the first door is locked with a first lock, and the second door is locked with a second lock. The first key and first lock define a first level of security. The second key and the second lock define a second level of security. In another implementation, a second key is provided for both the first lock and the second lock to define the second level of security. In one implementation, the first door includes a display, such as a main display or an information panel. In one implementation, the ticket stack is a fan-fold-fed device. In another implementation, the ticket stack is a force-fed device. In one implementation, the access portion of the ticket stack includes an opening. The opening is oriented in a substantially upward direction along the longitudinal axis. In one implementation, the bill acceptor and the printer are mounted on a shelf, which defines a boundary between the first region and the second region of the cabinet. In one implementation, the shelf is integral with the cabinet. One or more ventilation holes can be formed in the shelf. In one implementation, the access portion of the cash box includes a movable door having a closed position to enclose the cash and an open position to permit access to the cash. When the first door is in the closed position, in one implementation, the first door includes a player tracking module exposing an interface portion of the bill acceptor and an interface portion of the printer.

According to another aspect of the present invention, the button panel is movable with respect to the first door and to the second door along the longitudinal axis to a plurality of positions disposed along the longitudinal axis. The plurality of positions include a position at which the button panel is disposed between the first door and the second door. In one implementation, the cabinet includes a mounting panel. The button panel is removably attached to the mounting panel by fasteners. The mounting panel provides the plurality of positions for the button panel. In another implementation, the button panel includes an arm extending into an interior region of the gaming machine. The arm has a member engaging a carriage assembly fitted to the cabinet. The carriage assembly provides the plurality of positions for the button panel. In one implementation, movement of the button panel is manually controlled, while in another implementation, movement is controlled by a motor. The motor is actuated by an input device such as a button, a lever, a mobile device, a data chip, and a data sensor.

According to another aspect of the present invention, a method is provided for adjusting the button panel on the gaming machine. Input data is received. Button panel height data corresponding to the input data is retrieved. One of the plurality of positions along the longitudinal axis corresponding to the retrieved button panel height data is selected. A signal instructing movement of the button panel to the selected one position is output. In one implementation, the input data includes information such as button panel direction information, player identification information, stand identification information, and chair identification information. The input data can be stored on a memory device such as a player tracking card, a ticket, and a smart card. In one implementation, stand identification information is encoded in an RFID chip coupled to the stand. The chair identification information can also be encoded in an RFID chip coupled to a chair. The button panel height data can be stored on a storage medium locally or remotely coupled to the gaming machine, depending on the desired implementation. The signal instructing movement of the button panel can be output to a motor controlling movement of the button panel, in one implementation.

According to another aspect of the present invention, the gaming machine includes a first display mounted to the cabinet. The first display is coupled to display game data. A second display is situated in an upper region of the cabinet. The second display is configured to simultaneously output a plurality of lighting patterns. Each lighting pattern is associated with a respective one of a plurality of events. In one implementation, the second display includes a first region coupled to display a first lighting pattern, and the second display includes a second region coupled to display a second lighting pattern. For example, the first lighting pattern can be provided by the processor of the gaming machine, while the second lighting pattern is provided by a server.

In one implementation, the second display includes a front display portion, a back display portion, and one or more side display portions. Display portions can be disposed about the second display in an arrangement such that the second display is viewable in 360 degrees. The second display can be implemented as a candle, a plurality of LEDs, such as multi-color LEDs, and can include a flat panel video display such as an LCD. The flat panel video display can also be implemented as a plasma screen, a liquid crystal on silicone (LCOS) display, a rear projection digital light processing (DLP) display, an organic light emitting diode (OLED) display, and a flexible OLED display. In one implementation, the second display is integral with the cabinet, while in another implementation, the second display is mounted to the cabinet. The secondary display, in one implementation, is coupled to display visual patterns such as moving text and moving images. The plurality of events with which lighting patterns are associated can include events related to game play and events unrelated to game play. Exemplary lighting patterns include color changes, color sequences, lighting intensity changes, lighting intensity variations, a lighting sequence, a flashing light, a strobing light, and a motion. The lighting patterns can provide game play information, location information, service information, and security information.

According to another aspect of the present invention, a first display mounted to the cabinet is coupled to display the game data, a second display is mounted to the cabinet and coupled to display game information, while a third display is situated in an upper region of the cabinet and configured to simultaneously output a plurality of lighting patterns. Each lighting pattern is associated with a respective one of a plurality of events. In one implementation, the third display is separate from the first display and the second display along the longitudinal axis of the gaming machine.

According to another aspect of the present invention, the gaming machine is in communication with a network. A display device in communication with the network is coupled to output lighting patterns. In one implementation, the output lighting pattern is synchronized with a further lighting pattern displayed on a display of the gaming machine. A server is coupled to the network. The server is coupled to provide the first lighting pattern to the gaming machine and the second lighting pattern to the display device responsive to an event. In one implementation, the server is one of the gaming machines. In another implementation, the server is a portable device such as a cell phone, a personal digital assistant, and a wireless game player.

According to another aspect of the present invention, a method is provided for coordinating the display of a lighting pattern on one or more networked gaming machines. An event notification signal is received. A first event associated with the event notification signal is identified. A first lighting pattern associated with the identified event is selected. The selected first lighting pattern is provided to a display of one of the gaming machines for output. The display is configured to simultaneously output a second lighting pattern associated with a second event. In one implementation, the display has display portions independently controllable to display the lighting patterns. The first event can be a game play event, a bonus event, and a tournament event. In one implementation, the first event includes identification of a location in a gaming environment. The first lighting pattern can provide information such as gaming machine status information, player status information, game status information, and casino floor status information.

According to another aspect of the present invention, a method is provided for coordinating the display of a lighting pattern on one or more networked gaming machines. An event notification signal is received. A first event associated with the event notification signal is identified. A plurality of lighting patterns associated with the identified event is selected. The selected plurality of lighting patterns is provided to a plurality of displays on the gaming machines for output. The selected plurality of lighting patterns are synchronized with one another to define a synchronized lighting pattern.

According to another aspect of the present invention, a button panel has a first plurality of input devices and a second plurality of input devices. A first light border is disposed around the first plurality of input devices. A second light border is disposed around the second plurality of input devices. The light borders are coupled to the processor to be lighted responsive to notification of one or more events. The input devices are configured to receive player input for interaction with the machine. Examples of suitable input devices include buttons, switches, joysticks, touch screens, displays such as an LCD, and a color light emitting display such as a multi-color LED display. According to another aspect of the present invention, a method is provided for coordinating the display of a lighting pattern to highlight one or more groups of buttons on a button panel of a gaming machine. An event notification signal indicating occurrence of an event is received. At least one of the first light border and the second border is identified as designated to be lighted. The event is identified. A lighting pattern associated with the event is selected. The selected lighting pattern is provided to the identified at least one light border for output.

In one implementation, the lighting pattern can include a color change, a color sequence, a lighting intensity change, a lighting intensity variation, a lighting sequence, a flashing light, a strobing light, and a motion. The event, such as a game play event, a bonus event, and a tournament event, can include a status of game play, a color theme designation, and a candle lighting pattern identification.

Another aspect of the invention relates to a method of providing a personalized presentation of a lighting pattern to highlight one or more groups of buttons on a button panel of the gaming machine. Player identification information is received. Player preference data associated with the received player identification information is retrieved. The player preference data includes a preferred lighting pattern. At least one of the first light border and the second border are identified as designated to be lighted. The preferred lighting pattern is provided to the identified at least one light border for output. In one implementation, the player identification information is received from a player tracking card. The preferred lighting pattern can include a color change, a color sequence, a lighting intensity change, a lighting intensity variation, a lighting sequence, a flashing light, a strobing light, and/or a motion.

According to another aspect of the present invention, a gaming machine includes a cabinet, and a processor situated in the cabinet. The processor is coupled to output game data related to play of a game of chance. A display is coupled to receive and display a video component of the game data. A speaker is coupled to receive and output an audio component of the game data. A player interface is coupled to receive player input for interaction with the machine. The player interface is operable to provide a preferred setting for a parameter defining a presentation of the game data. In one embodiment, the player interface includes a volume control operable to indicate a volume setting for outputting the audio component of the game data. In another embodiment, the player interface includes a display control operable to indicate a display setting for displaying the video component of the game data, such as brightness, hue, and contrast.

In one implementation, the player interface includes a selection operable to retrieve a parameter setting stored as a preference associated with a player. In one implementation, the selection is a "me" button. The parameter setting can be an element of player tracking data, in one implementation. The parameter setting can be stored on a storage medium locally or remotely coupled to the gaming machine. The parameter setting can also be stored on a portable storage medium. In one implementation, the player interface includes an input device on a button panel, while in another implementation, the player interface includes an input device on a graphical interface.

Another aspect of the present invention relates to a method of providing a personalized presentation of game data on a gaming machine. Player identification information is received. Player preference data associated with the received player identification information is retrieved. The player preference data includes a preferred setting of a parameter defining a presentation of game data on the gaming machine. Game data related to play of a game of chance is presented according to the preferred parameter setting. In one implementation, receiving the player identification information includes reading a player tracking card.

According to another aspect of the present invention, a gaming machine is provided for playing a game of chance. The gaming machine includes a cabinet having a longitudinal axis. A processor situated in the cabinet is coupled to output game data related to play of a game of chance. A display is mounted to the cabinet. The display is coupled to display the game data. A speaker is situated in an upper region of the cabinet. The speaker is coupled to output an audio signal. The speaker is situated at a height along the longitudinal axis above a position associated with the head of a player. The speaker is oriented at a downward angle towards the position associated with the head of the player. The angle is less than 90 degrees with respect to the longitudinal axis. An input device is coupled to receive an indication of a wager for play of the game of chance. In one implementation, the angle of the speaker is about 45 degrees. In another implementation, the speaker angle is in a range of about 30 to 60 degrees. In one implementation, the speaker is integral with the gaming machine cabinet and situated above the display along the longitudinal axis.

In one implementation, the position is associated with the ears of the player. In another implementation, the position associated with the head of the player is determined according to an average player height. The position can be determined according to a player height when seated, and also, according to a player distance from the gaming machine.

According to another aspect of the present invention, a gaming machine includes a cabinet having a longitudinal axis. A processor situated in the cabinet is coupled to output game data related to play of a game of chance. A door is mounted to the cabinet in a region of the cabinet. The door has a closed position enclosing a device. The door is movable along the longitudinal axis between an open position and the closed position. The open position permits access to the device. The door includes a display coupled to receive and display the game data. An input device is coupled to receive an indication of a wager for play of the game of chance.

The display can be implemented as a flat panel display such as an LCD. Other examples of suitable flat panel displays include plasma screens, LCOS displays, rear projection DLP displays, OLED displays, and flexible OLED displays. The device enclosed by the door can be a peripheral device, or the processor. In one implementation, the door is mounted to the cabinet in a hinged relationship. In one implementation, the door is movable to the open position in an upward direction along the longitudinal axis, and movable to the closed position in a downward direction along the longitudinal axis.

According to another aspect of the present invention, a first door is mounted to the cabinet in a first region of the cabinet. The first door is movable along the longitudinal axis between an open position and a closed position. The first door includes a display. A second door is mounted to the cabinet in a second region of the cabinet. The second door is movable along the longitudinal axis between an open position and a closed position.

In one implementation, the second door includes a display, such as an information panel or a suitable flat panel screen. In one implementation, the second door encloses a device, such as the processor, in the closed position. In one implementation, the first door is movable to the open position in an upward direction along the longitudinal axis, and the second door is movable to the open position in a downward direction along the longitudinal axis. In another implementation, the second door is movable to the open position in an upward direction along the longitudinal axis. In one implementation, the second door is also removable.

According to another aspect of the present invention, a gaming machine includes a cabinet having a longitudinal axis. A processor is situated in the cabinet. The processor is coupled to output game data related to play of a game of chance. A first display is mounted to the cabinet in an upper region of the cabinet. The first display is movable along the longitudinal axis between an open position and a closed position. The first display cooperates with the cabinet in the closed position to define an upper closed space in which a peripheral device is situated. A second display is mounted to the cabinet in the upper region of the cabinet. A door is mounted to the cabinet in a lower region of the cabinet. The door is movable along the longitudinal axis between an open position and a closed position. The door cooperates with the cabinet in the closed position to define a lower closed space in which the processor is situated. An input device is coupled to receive an indication of a wager for play of the game of chance.

In one implementation, the second display is an information panel. In another implementation, the second display is a candle. In one implementation, the gaming machine further includes a shelf defining a boundary between the upper region and the lower region of the cabinet.

All of the foregoing methods and apparatus, along with other methods and apparatus of aspects of the present invention, may be implemented in software, firmware, hardware and combinations thereof. For example, the methods of aspects of the present invention may be implemented by computer programs embodied in machine-readable media and other products. Also, aspects of the invention may be implemented by networked gaming machines, game servers and other such devices. These and other features and benefits of aspects of the invention will be described in more detail below with reference to the associated drawings.

BRIEF DESCRIPTION OF THE DRAWINGS

The invention may best be understood by reference to the following description taken in conjunction with the accompanying drawings, which are illustrative of specific embodiments of the present invention.

DESCRIPTION OF THE PREFERRED EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

Some embodiments of the present invention relate to a gaming machine with a novel grouping and consolidation of the bill acceptor and printer within the machine. More particularly, the orientation of the bill acceptor, in combination with the positioning of the ticket printer, allows for the consolidation of these frequently serviced peripherals in a central location of the gaming machine. A single door in an easy to access region of the gaming machine provides access to the commonly serviced components including the bill acceptor, printer, player tracking apparatus, and possibly other devices. A second door in a different region of the gaming machine provides access to infrequently serviced components.

The consolidated arrangement of the bill acceptor and printer, facilitated by the orientation of the bill acceptor, provides several benefits. The arrangement allows ease of access to the bill acceptor and printer simultaneously. The positioning of the bill acceptor and printer also allows for an increase in the bill acceptor cash box and ticket printer capacity. Also, the button panel can be vertically adjusted without interfering with access to the bill acceptor. Moving or adjusting the button panel along the length of the gaming machine provides an optimal positioning for the player.

The movable button panel of the gaming machine is mounted to the gaming machine cabinet, as opposed to the typical attachment of a button panel to a door. This configuration adds structural integrity to the system. The panel is vertically movable by either a manual or automated electromechanical system. In various embodiments, the movable button panel can be actuated by the player for individual adjustment, and/or it can be adjusted by a service technician during machine setup. Embodiments of the movable button panel provide for adjusting the height of the button panel by manipulating a locking mechanism and a release, an electronic switch, or by removal of standard mechanical fasteners.

Figure 1:
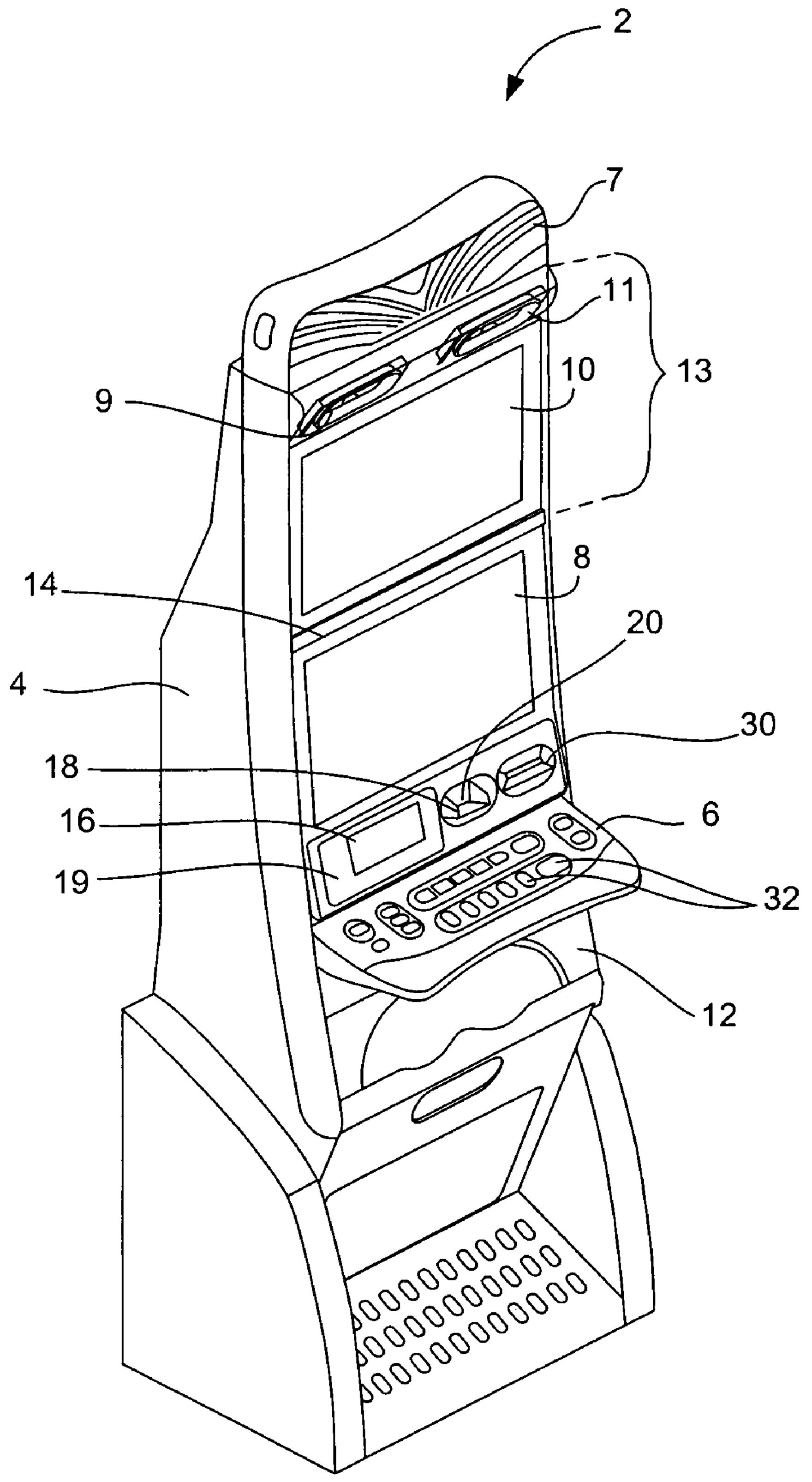
FIG. 1 is a diagram of a gaming machine 2 with closed doors, constructed according to one embodiment of the present invention.

Turning first to FIG. 1, a video gaming machine 2 constructed according to one embodiment of the present invention is shown. Machine 2 includes a main cabinet 4, which generally surrounds the machine interior and is viewable by users. Mounted to the cabinet 4 is a button panel 6 with player-input switches or buttons 32 and/or other input devices for a player to play games on the machine 2, i.e., place bets, and otherwise interact with the machine to play a game. The button panel 6 extends outward from the front of the cabinet 4. The gaming machine 2 also includes a coin acceptor and a coin tray.

In FIG. 1, the gaming machine 2 has vertically separated doors on the front side of the cabinet. These doors include a main video display 8 such as a high-resolution, flat-panel liquid crystal display (LCD), an information panel 10, and a lower door 12 all separately mounted to cabinet 4. The information panel 10 is located above the main display 8, and the lower door 12 is located below the main display 8. The information panel 10 can function as a secondary video display for the game. A cross bar 14 is attached to a lower portion of the information panel 10, as shown in FIG. 1. A purse hook can be fitted to the lower door 12 for hanging a purse, coat, or other accessory carried by a player.

In FIG. 1, the button panel 6, in one of its adjustable positions as shown, is generally disposed between the main display 8 and the lower door 12. The button panel 6 can be moved upwards and downwards to its other positions, as described herein. The main display 8 is configured to display video output data and other game information for games played on the machine 2. The information panel 10 is capable of displaying additional game output data and game information.

In FIG. 1, main display 8 can be a cathode ray tube (CRT), high resolution flat-panel LCD, or other conventional electronically controlled video monitor. The information panel 10 can also be a flat-panel display, or a back-lit, silk screened glass panel with lettering to indicate general game information including, for example, a game denomination (e.g., $0.25 or $1).

In FIG. 1, the information panel 10 may be used as an interface to provide player tracking services and other game services to a player playing a game on the gaming machine 2. The information panel 10 may be used as an interface by a player to: 1) input player tracking identification information, 2) view account information and perform account transactions for accounts such as player tracking accounts and bank accounts, 3) receive operating instructions, 4) redeem prizes or comps including using player tracking points to redeem the prize or comp, 5) make entertainment service reservations, 6) transfer credits to cashless instruments and other player accounts, 7) participate in casino promotions, 8) select entertainment choices for output via video and audio output mechanisms, 9) play games and bonus games, 10) request gaming services such as drink orders, 11) communicate with other players or casino service personnel and 12) register a player for a loyalty program such as a player tracking program. In addition, the information panel 10 may be used as an interface by casino service personnel to: a) access diagnostic menus, b) display player tracking unit status information and gaming machine status information, c) access gaming machine metering information and d) display player status information.

Many different types of games, including mechanical slot games, video slot games, video poker, video black jack, video pachinko and lottery, may be provided on gaming machine 2. The gaming machine 2 is operable to provide play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may execute game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

In FIG. 1, a top box area 13 above main display 8, including information panel 10, is located in an upper region of the cabinet 4 of the gaming machine 2. A candle 7 is positioned above the top box area 13. In some embodiments, the top box area 13 and candle 7 are formed as integral parts of cabinet 4, rather than being constructed as separate casings/devices and externally mounted on top of the cabinet. Constructing the candle 7, top box area 13, and cabinet 4 as a single integral unit, as illustrated in FIG. 1 is desirable, as it reduces enclosure costs and warehouse overhead. In addition, the single unit construction reduces assembly time and part count by removing bulkhead apparatus and secondary harnessing needed to mount separate casings and apparatus to the exterior of cabinet 4. In one embodiment, the top box area 13 houses devices, which may be used to add features to a game played on the gaming machine 2. For instance, speakers 9 and 11 are located in the top box area 13 beneath the candle 7. In an alternative embodiment, the candle 7 and top box area 13, including information panel 10, are omitted from gaming machine 2.

The candle 7 serves as a tertiary display, when considered in combination with the primary or main display 8, and the secondary display, i.e. information panel 10. The candle 7 is constructed to display information on the front, back, and sides, thereby providing a display in 360 degrees, rather than the single-sided viewing screens of main display 8 and information panel 10. The candle 7 is configured to display lighting patterns with variations in color, intensity, and motion, and can display various visual patterns such as scrolling text, moving images, and other video output suitable for a video display. To this end, candle 7 can be constructed with a plurality of multi-color LEDs to provide lighting and color sequences, and/or a cathode ray tube, high resolution flat-panel LCD, plasma screen, or other electronically controlled video monitor to display video data.

In FIG. 1, the gaming machine 2 further includes a player tracking module 19 exposing an interface portion of ticket printer 18, which prints bar-coded tickets 20, and an interface portion of bill acceptor 30. The player tracking module 19 holds a key pad for entering player tracking information, a florescent display 16 for displaying player tracking information, and often a card reader for entering a magnetic striped card containing player tracking information.

In FIG. 1, the information panel 10 may display a bonus wheel, which may be used to add bonus features to the game being played on the gaming machine. As another example, the information panel 10 may provide a display of a progressive jackpot offered on the gaming machine. During a game, the various devices are controlled and powered, in part, by circuitry, e.g. a master gaming controller, housed within the main cabinet 4 of the machine 2.

Understand that gaming machine 2 is but one example from a wide range of gaming devices on which the present invention may be implemented. For example, not all suitable gaming machines have information panels, top box areas, candles/tertiary displays or player tracking features. Also, a game may be generated on a host computer and may be displayed on a remote terminal or a remote gaming device. The remote gaming device may be connected to the host computer via a network of some type such as a local area network, a wide area network, an intranet or the Internet, by a wired or wireless connection. The remote gaming device may be a portable gaming device such as but not limited to a cell phone, a personal digital assistant, and a wireless game player. Images rendered from 3-D gaming environments may be displayed on portable gaming devices that are used to play a game of chance. Further, a gaming machine or server may include gaming logic for commanding a remote gaming device to render an image from a virtual camera in a 3-D gaming environment stored on the remote gaming device and to display the rendered image on a display located on the remote gaming device. Thus, those of skill in the art will understand that the present invention, as described below, can be deployed on most any gaming machine now available or hereafter developed.

Some preferred IGT gaming machines are implemented with special features and/or additional circuitry that differentiates them from general-purpose computers (e.g., desktop personal computers and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements, and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. This requirement affects the software and hardware design on a gaming machine. As anyone who has used a PC knows, PCs are not state machines and a majority of data is usually lost when such a malfunction occurs.

A second important difference between gaming machines and common PC based computer systems is that for regulation purposes, the software on the gaming machine used to generate the game of chance and operate the gaming machine has been designed to be static and monolithic to prevent cheating by the operator of the gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burned, approved by the gaming jurisdiction and installed on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and in some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally, in the gaming industry, gaming machines have been relatively simple in the sense that the number of peripheral devices and the number of functions of the gaming machine have been limited. Further, in operation, the functionality of gaming machines were relatively constant once the gaming machine was deployed, i.e., new peripherals devices and new gaming software were infrequently added to the gaming machine. This differs from a PC where users will buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators, ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the gaming machine circuitry. These can be generated in a central power supply or locally on the circuit board. If any of these voltages falls out of the tolerance limits of the circuitry they power, unpredictable operation of the gaming machine may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines typically have power supplies with tighter voltage margins than that required by the operating circuitry. In addition, the voltage monitoring circuitry implemented in IGT gaming machines typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This ensures the player's wager and credits are preserved and minimizes potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at just prior to the malfunction including an indication of selections that have already been made by the player. In general, the gaming machine may be restored to any state in a plurality of states that occur in the game of chance while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," all of which are hereby incorporated by reference for all purposes.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents in a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. Some details related to trusted memory devices that may be used in the present invention are described in U.S. Pat. No. 6,685,567 from U.S. patent application Ser. No. 09/925,098, filed Aug. 8, 2001 and titled "Process Verification," which is hereby incorporated by reference in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, an interface portion of a bill validator 30, and an interface portion of a ticket printer 18 are exposed through player tracking module 19. The ticket printer 18 may be used to print tickets 20 for a cashless ticketing system. The bill validator 30, player-input switches 32 on button panel 6, video display 8, and information panel 10 are devices used to play a game on the game machine 2. The devices are controlled by circuitry, including a master gaming controller, housed behind lower door 12 inside the main cabinet 4 of the machine 2. When a user wishes to play the gaming machine 2, he or she inserts cash through the coin acceptor or bill validator 30. Additionally, the bill validator may accept a printed ticket voucher, which can also be accepted by the bill validator 30 as indicia of credit when a cashless ticketing system is used. In an alternative embodiment, the player tracking module 19 exposes a Rotating Data Card (RDC). The RDC is a peripheral device which uses, in place of a paper voucher accepted by the bill validator 30, a plastic voucher often about the size of a credit card. The plastic voucher can be printed, presented, accepted, and validated by the RDC. In this way, the RDC serves both payout and acceptance functions in a cashless ticketing system. In one embodiment, the RDC employs a force fed, rather than gravity fed, hopper. Thus, gaming machine 2 can be constructed with various configurations of peripherals.

In FIG. 1, at the start of the game, the player may enter playing tracking information using the florescent display 16. Further, other game preferences of the player playing the game may be read from a card inserted into a card reader. During the game, the player views game information using the video display 8. Other game and prize information may also be displayed in the information panel 10.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input buttons 32, the video display screen 8 or using some other device which enables a player to input information into the gaming machine. In some embodiments, the player may be able to access various game services such as concierge services and entertainment content services using the video display screen 8, information panel 10, and/or one or more input devices.

After the player has completed a game, the player may receive game tokens from a coin tray or the ticket 20 from the printer 18, which may be used for further games or to redeem a prize. Further, the player may receive a ticket 20 for food, merchandise, or games from the printer 18.

During certain game events, the gaming machine 2 may display visual and auditory effects that can be perceived by the player. These effects add to the excitement of a game, which makes a player more likely to continue playing. In FIG. 1, visual effects include flashing lights, strobing lights, color changing sequences, and/or other patterns displayed from lights on the gaming machine 2. Auditory effects include various sounds that are projected by the speakers 9 and 11.

Players often complain about the sound level of their machine, or of the surrounding machines. Whether the argument is that the volume of the player's machine is too low, or the volume of surrounding machines is too high, it is difficult to find a sound level setting, which is ideal for all players. Some embodiments of the present invention address this concern by focusing the stereo speakers of the gaming machine towards the player.

Figure 8:
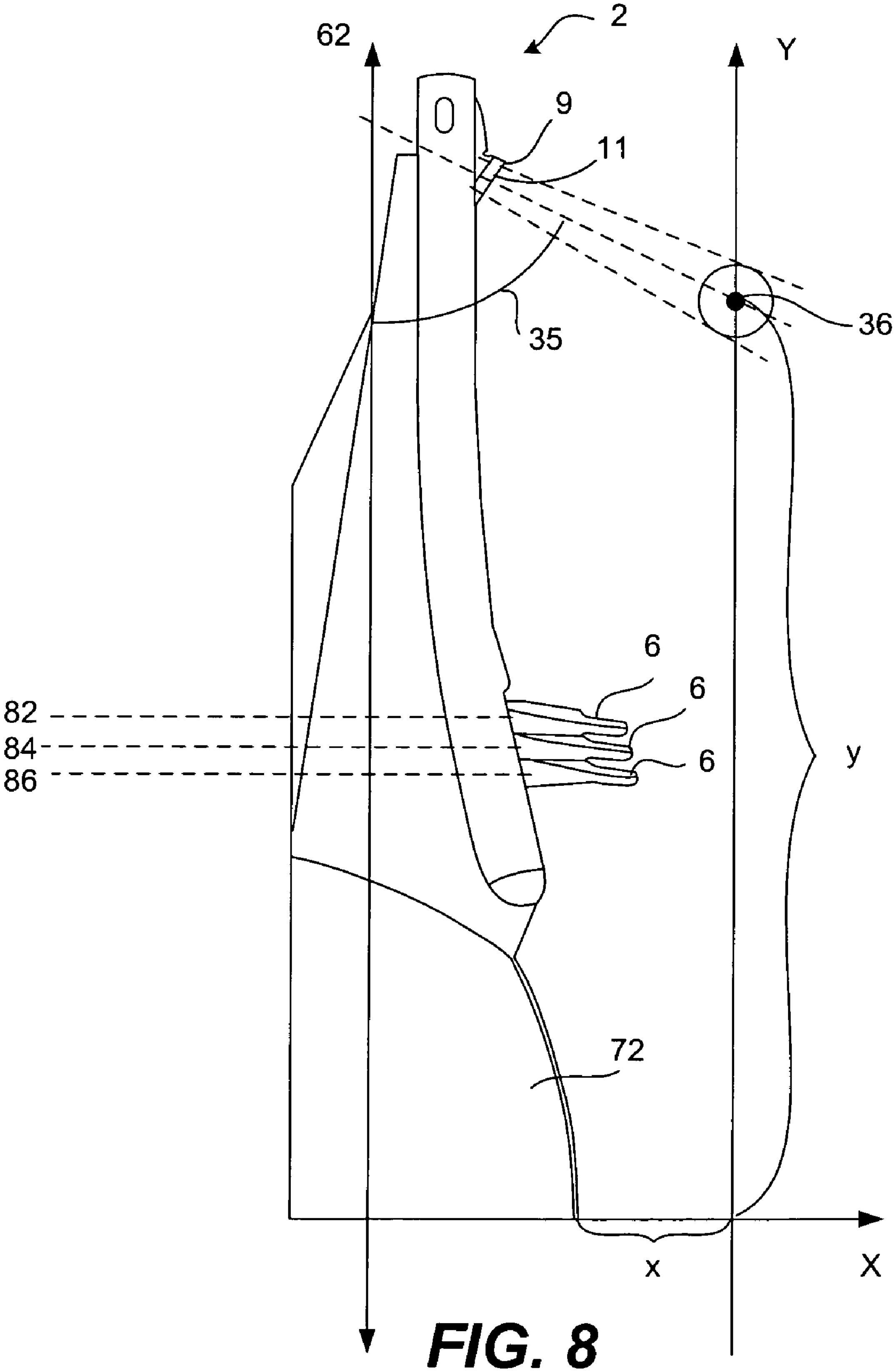
FIG. 8 is a diagram of a side view of the gaming machine 2 with an adjustable button panel in different positions, and an angled speaker orientation, constructed according to one embodiment of the present invention.

As shown in FIGS. 1, 8, 14A, and 14B, speakers 9 and 11 located in top box area 13 of the upper region of gaming machine 2 are mounted and situated in the cabinet with an angled orientation down towards the player and the floor. In particular, as shown in FIG. 8, the speakers are aimed downwards, oriented at an angle 35 with respect to a longitudinal axis 62 of machine 2. The angle 35 is less than 90 degrees with respect to longitudinal axis 62. In one example, angle 35 is 45 degrees. In another example, the angle 35 is in a range of 30-60 degrees with respect to longitudinal axis 62 of machine 2. In another example, angle 35 is any angle between 0 and 90 degrees. The angle 35 is desirably set such that the speakers are aimed towards the height or position 36 of the head of a player of gaming machine 2, generally when the player is seated on a stool or chair facing the gaming machine for game play. In another implementation, the speaker focus position 36 is the height of a player when standing, rather than seated.

Those skilled in the art will appreciate that variations in player height and build result in variations of the height of a particular player's head when seated at the gaming machine. Also, the distance of the player from the machine will affect measurements. Nonetheless, average height data can be gathered for a plurality of players, in a vertical dimension or "Y" axis with respect to the floor, and an average position of a player's ears with respect to the total player height can be calculated, for the vertical measurement "y" of position 36. The Y axis is generally parallel to the longitudinal axis 62, when the machine 2 is seated on the floor, as shown in FIG. 8. An optimal or average distance of a seat or stand from the gaming machine for an average player, that is, a measurement "x" in a horizontal dimension with respect to the floor along an "X" axis, can be determined. The position 36 towards which the speakers are focused, in one embodiment, is set at this calculated average ear height, "y," for the average distance of a player with respect to the machine, "x." In an alternative embodiment, the "x" and "y" measurements of speaker focus position 36 are tailored to a single player.

Figure 14A:
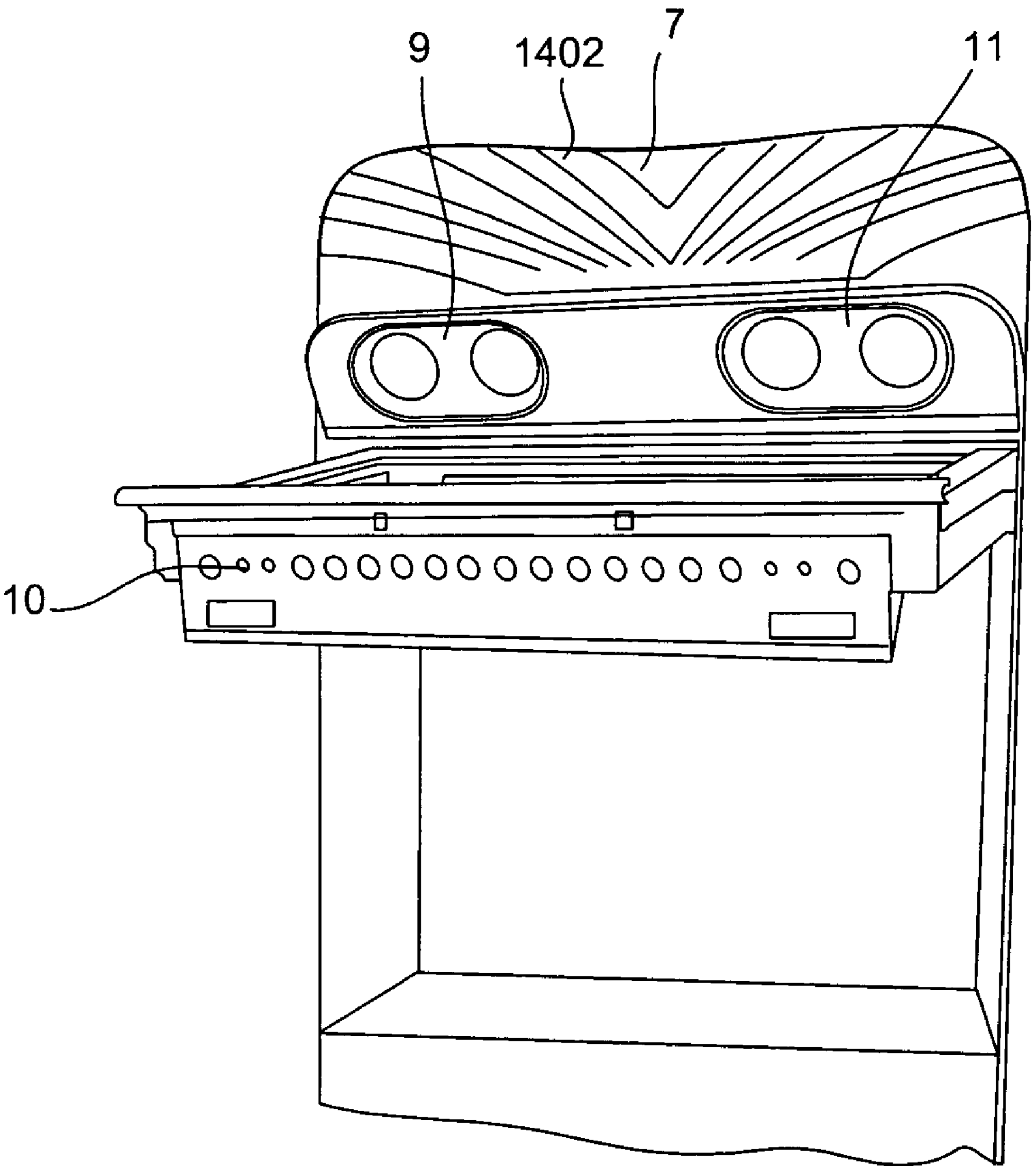
FIG. 14A shows a front view of the upper region of gaming machine 2, including a candle, speakers, and an information panel.
Figure 14B:
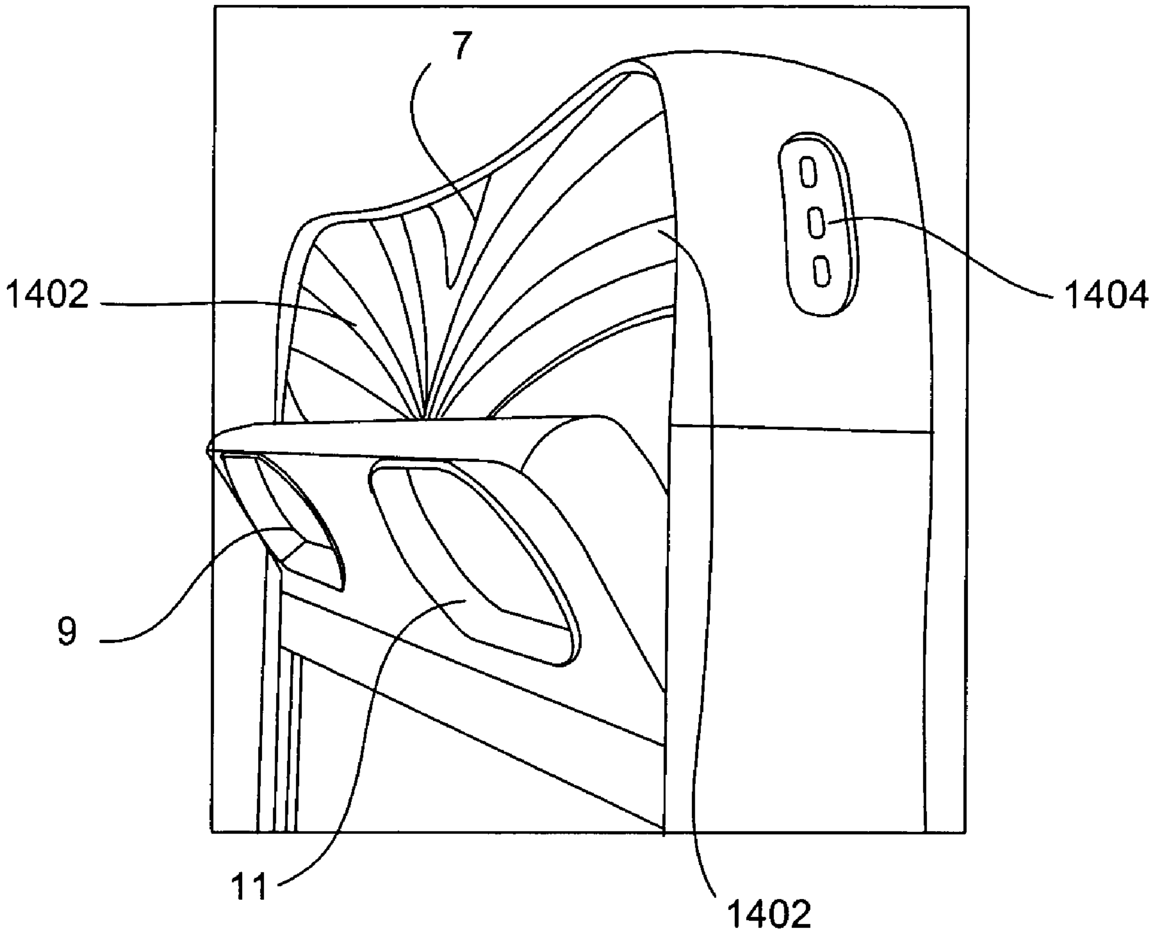
FIG. 14B shows a side view of the candle, having a panel defining a side display portion, constructed according to one embodiment of the present invention.

Focusing the speakers in an angled downward direction toward the player head/ear position 36, as shown in FIGS. 8 and 14B, maximizes the impact of sounds output from the speakers. The resulting sound is heard loudest at a general location above and in front of the button panel, that is, where the player's head is located when the player is positioned to play the machine 2. As shown in FIG. 8, the speakers are situated in a location above most players' heads. Because of the angled downward direction of speakers 9 and 11, sound energy is aimed at the casino floor, which preferably has carpeting or rugs to facilitate sound absorption. In this way, sound is prevented from being broadcast or reflected in a horizontal or upward direction away from the gaming machine. Thus, sound energy is not wasted competing with banks of machines in the vicinity, nor does excess volume pollute the acoustical environment of the casino floor.

In some game platforms offering multiple games, the games are stored on read-only memory devices, such as an EPROM chip set or a CD-ROM. To provide a new or a different game on a gaming platform of this type, a technician, usually accompanied by a gaming regulator, must manually install a new memory device (e.g. EPROM) and then manually update the licensing configuration on the gaming machine. The gaming regulator then places evidence tape across the EPROM. The evidence tape is used to detect tampering between visits by the gaming regulator. Since operations performed by entities other than a "trusted" $3^{rd}$ party, such as a gaming regulator, have been deemed untrustworthy, automatic game downloads and automatic licensing management is not available on these platforms. The licensing of multiple games on a gaming machine is described in U.S. Pat. No. 6,264,561, titled "Electronic Gaming Licensing Apparatus and Method," assigned to IGT (Reno, Nev.), which is incorporated herein by reference in its entirety and for all purposes.

Figure 2:
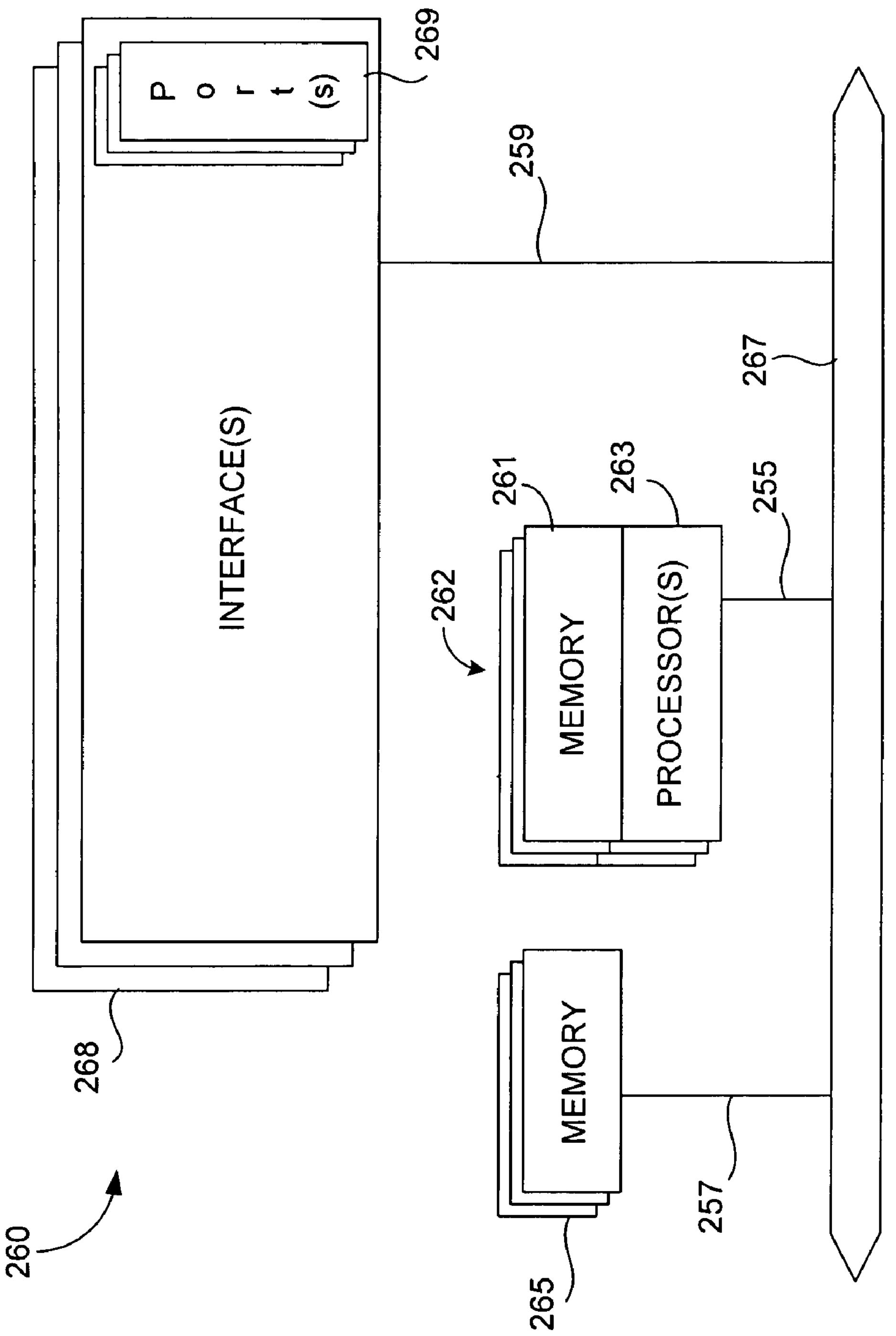
FIG. 2 is a block diagram of a network device 260 that can be configured as a server or other data processing apparatus for implementing embodiments of the present invention.

FIG. 2 illustrates an example of a network device that may be configured as a server for implementing some methods and apparatus of the present invention. Network device 260 includes a master central processing unit (CPU) 262, interfaces 268, and a bus 267 (e.g., a PCI bus). Generally, interfaces 268 include ports 269 appropriate for communication with the appropriate media. In some embodiments, one or more of interfaces 268 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 268 control such communications-intensive tasks as media control and management. By providing separate processors for the communications-intensive tasks, interfaces 268 allow the master microprocessor 262 efficiently to perform other functions such as routing computations, network diagnostics, security functions, etc.

The interfaces 268 are typically provided as interface cards (sometimes referred to as "linecards"). Generally, interfaces 268 control the sending and receiving of data packets over the network and sometimes support other peripherals used with the network device 260. Among the interfaces that may be provided are FC interfaces, Ethernet interfaces, frame relay interfaces, cable interfaces, DSL interfaces, token ring interfaces, and the like. In addition, various high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 262 may be responsible for implementing specific functions associated with the functions of a desired network device. According to some embodiments, CPU 262 accomplishes all these functions under the control of software including an operating system and any appropriate applications software.

CPU 262 may include one or more processors 263 such as a processor from the Motorola family of microprocessors or the MIPS family of microprocessors. In an alternative embodiment, processor 263 is specially designed hardware for controlling the operations of network device 260. In a specific embodiment, a memory 261 (such as non-volatile RAM and/or ROM) also forms part of CPU 262. However, there are many different ways in which memory could be coupled to the system. Memory block 261 may be used for a variety of purposes such as, for example, caching and/or storing data, programming instructions, etc.

Regardless of the network device's configuration, it may employ one or more memories or memory modules (such as, for example, memory block 265) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 2 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 2) or switch fabric based (such as a cross-bar).

Figure 3:
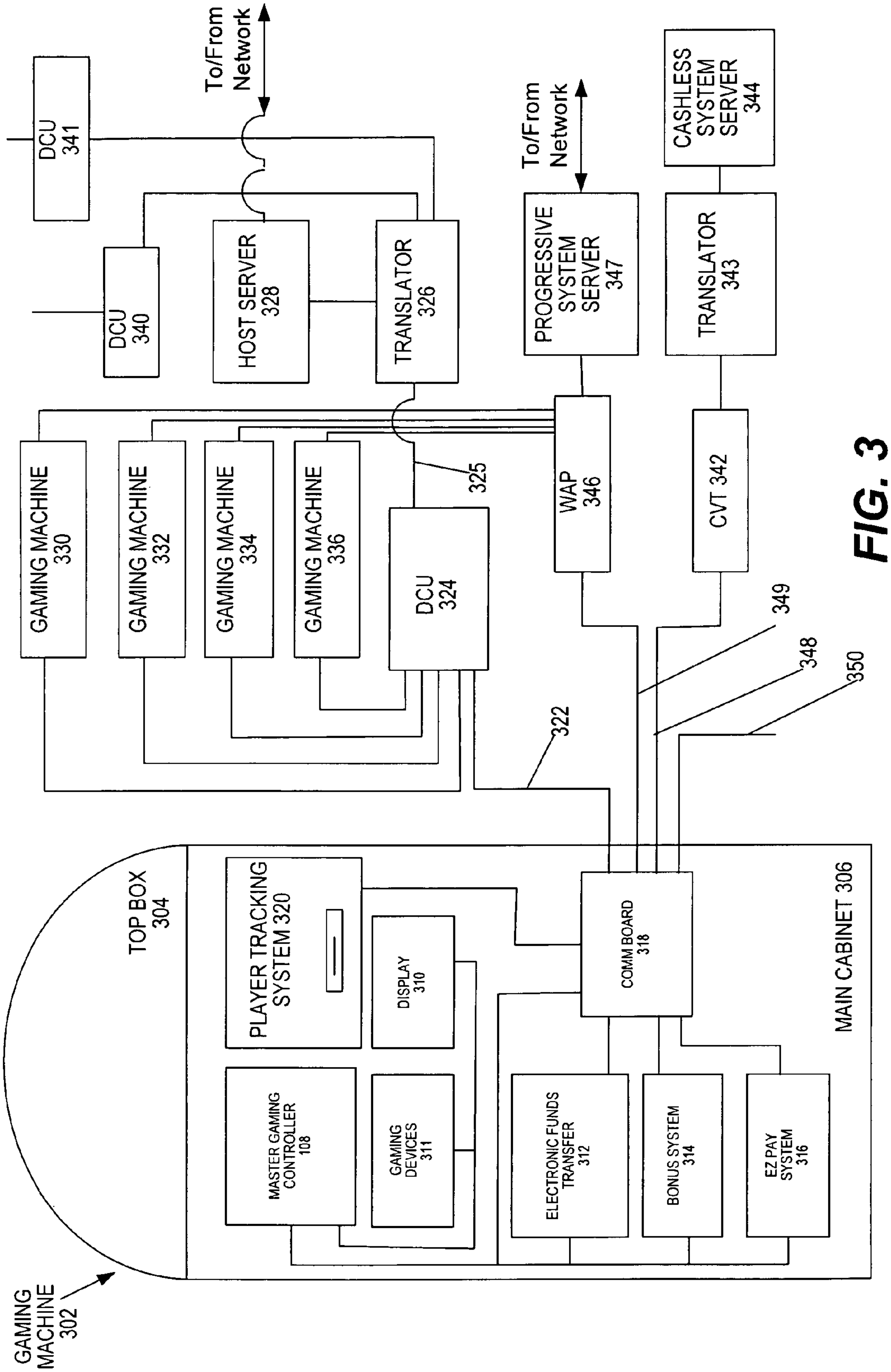
FIG. 3 is a block diagram depicting a network of gaming machines and other devices within a gaming establishment.

FIG. 3 is a simplified block diagram depicting gaming machines within a gaming establishment 301. The gaming machines are connected with a dedicated communication network via a host server 328 and a data collection unit (DCU) according to one embodiment of the invention. According to some embodiments of the invention, the DCU is an enhanced DCU as described in U.S. patent application Ser. No. 10/187,059, entitled "Redundant Gaming Network Mediation," which is hereby incorporated by reference in its entirety.

In FIG. 3, gaming machine 302, and the other gaming machines 330, 332, 334, and 336, include a main cabinet 306 and a top box 304. The main cabinet 306 houses the main gaming elements and can also house peripheral systems, such as those that utilize dedicated gaming networks. The top box 304 may also be used to house these peripheral systems.

The master gaming controller 108 controls the game play on the gaming machine 302 and receives or sends data to various input/output devices 311 on the gaming machine 302. The master gaming controller 108 may also communicate with a display 310.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 108 may also communicate with EFT system 312, bonus system 314, EZPay™ system 316 (a proprietary cashless ticketing system of the present assignee), and player tracking system 320. The systems of the gaming machine 302 communicate the data onto the network 322 via a communication board 318.

In general, the dedicated communication network is not accessible to the public. Due to the sensitive nature of much of the information on the dedicated networks, for example, electronic fund transfers and player tracking data, usually the manufacturer of a host system, such as a player tracking system, or group of host systems, employs a particular networking language having proprietary protocols. For instance, 10-20 different companies produce player tracking host systems where each host system may use different protocols. These proprietary protocols are usually considered highly confidential and not released publicly. Thus, whenever a new host system is introduced for use with a gaming machine, rather than trying to interpret all the different protocols utilized by different manufacturers, the new host system is typically designed as a separate network. Consequently, as more host systems are introduced, the independent network structures continue to build up in the casino. Examples of protocol mediation to address these issues may be found, for example, in U.S. Pat. No. 6,682,423, "Open Architecture Communications in a Gaming Network," which is hereby incorporated by reference in its entirety.

Further, in the gaming industry, gaming machines are made by many different manufacturers. The communication protocols on the gaming machine are typically hard-coded into the gaming machine software, and each gaming machine manufacturer may utilize a different proprietary communication protocol. A gaming machine manufacturer may also produce host systems, in which case their gaming machines are compatible with their own host systems. However, in a heterogeneous gaming environment, such as a casino, gaming machines from many different manufacturers, each with their own communication protocol, may be connected to host systems from many different manufacturers, each with their own communication protocol. Therefore, communication compatibility issues regarding the protocols used by the gaming machines in the system and protocols used by the host systems must be considered.

In the present illustration, the gaming machines, 302, 330, 332, 334, and 336 are connected to a dedicated gaming network 322. In general, the DCU 324 functions as an intermediary between the different gaming machines on the network 322 and the host server 328. In general, the DCU 324 receives data transmitted from the gaming machines and sends the data to the host server 328 over a transmission path 326. In some instances, when the hardware interface used by the gaming machine is not compatible with the host server 328, a translator 325 may be used to convert serial data from the DCU 324 to a format accepted by the host server 328. The translator may provide this conversion service to a plurality of DCUs, such as 324, 340 and 341.

Further, in some dedicated gaming networks, the DCU 324 can receive data transmitted from the host server 328 for communication to the gaming machines on the gaming network. The received data may be communicated synchronously to the gaming machines on the gaming network. Within a gaming establishment, the gaming machines 302, 330, 332, 334 and 336 are located on the gaming floor for player access while the host server 328 is usually located in another part of gaming establishment 301 (e.g. the backroom), or at another location.

In a gaming network, gaming machines, such as 302, 330, 332, 334 and 336, may be connected through multiple communication paths to a number of gaming devices that provide gaming services. For example, gaming machine 302 is connected to four communication paths, 322, 348, 349 and 350. As described above, communication path 322 allows the gaming machine 302 to send information to host server 328. Via communication path 348, the gaming machine 302 is connected to a clerk validation terminal 342. The clerk validation terminal 342 is connected to a translator 343 and a cashless system server 344 that are used to provide cashless gaming services to the gaming machine 302. Gaming machines 330, 332, 334 and 336 may also be connected to the clerk validation terminal 342 and may also receive cashless system services.

Via communication path 349, the gaming machine 302 is connected to a wide area progressive (WAP) device 346. The WAP is connected to a progressive system server 347 that may be used to provide progressive gaming services to the gaming machines. The progressive game services enabled by the progressive game network increase the game playing capabilities of a particular gaming machine by enabling a larger jackpot than would be possible if the gaming machine was operating in a "stand alone" mode. Playing a game on a participating gaming machine gives a player a chance to win the progressive jackpot. The potential size of the jackpot increases as the number of gaming machines connected in the progressive network is increased. The size of the jackpot tends to increase game play on gaming machines offering a progressive jackpot.

Gaming machines 330, 332, 334 and 336 are connected to WAP device 346 and progressive system server 347. Other gaming machines may also be connected to WAP device 346 and/or progressive system server 347. Via communication path 350, the gaming machine 302 may be connected with additional gaming devices (not shown) that provide other gaming services.

In some embodiments of the present invention, gaming machines and other devices in the gaming establishment depicted in FIG. 3 are connected to a central system and/or other gaming establishments via one or more networks, which may be public or private networks. For example, host server 328 and/or progressive system server 347 may be connected to an outside network. In other embodiments, a bingo server, a switch, or another type of network device may be part of an interface with an outside network. A network device that links a gaming establishment with another gaming establishment and/or a central system will sometimes be referred to herein as a "site controller."

Figure 4:
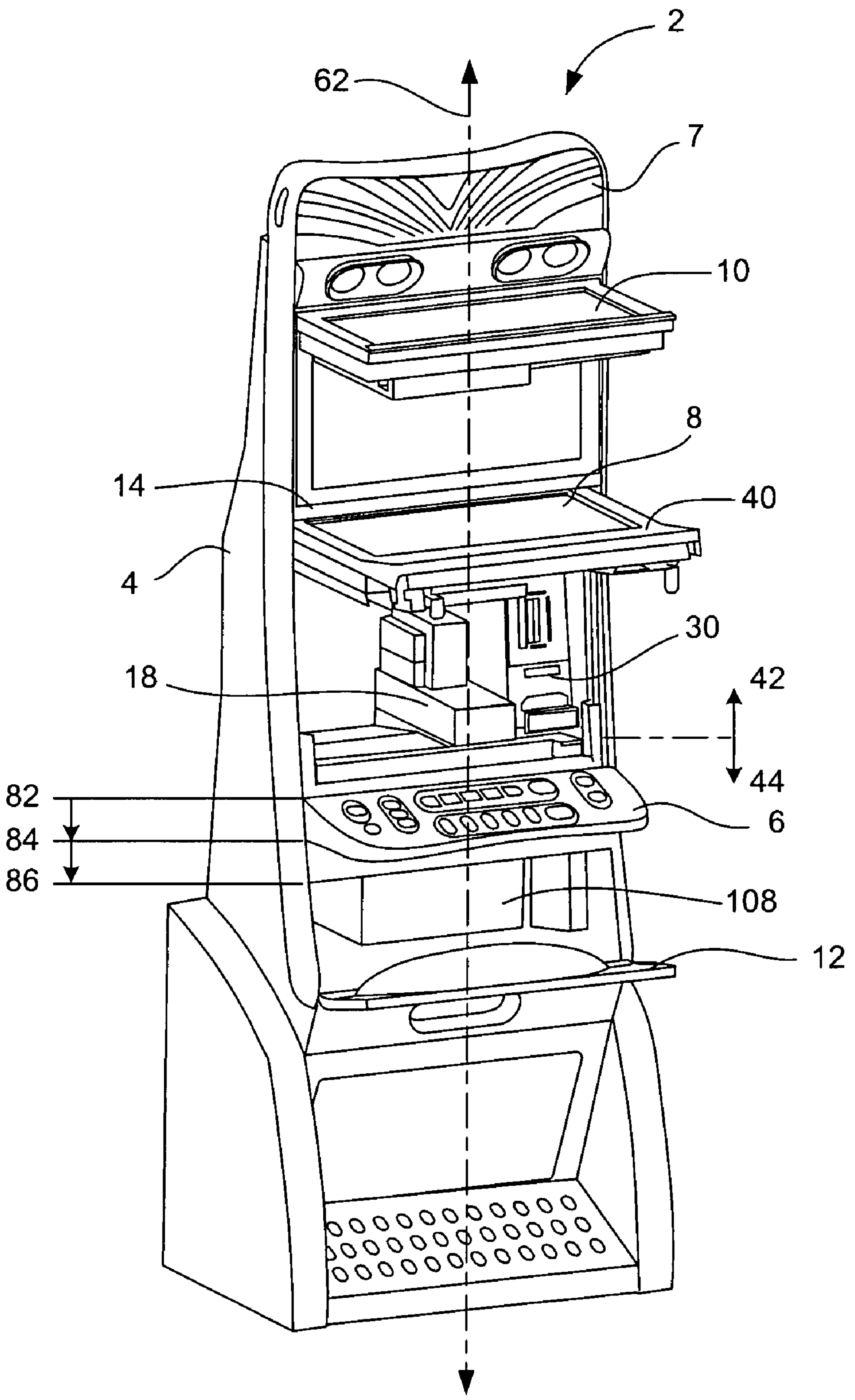
FIG. 4 is a diagram of the gaming machine 2 with open doors, constructed according to one embodiment of the present invention.

FIG. 4 is a diagram of gaming machine 2 with open doors, constructed according to one embodiment of the present invention. The doors include information panel 10, main display 8, and lower door 12, all in open positions, as shown in FIG. 4, to expose interior spaces of the cabinet 4. In FIG. 4, the main display 8, framed by a bezel 40, is mounted to the cabinet 4 in an upper region 42 of cabinet 4. Also, the information panel 10 is mounted to cabinet 4 in upper region 42. The lower door 12 is located in a lower region 44, or "belly" of the machine. In one embodiment, the lower door 12 does not have an LCD or any other type of display integral with or mounted to it.

In FIG. 4, the information panel 10 and main display 8 are each separately mounted to the cabinet 4, and horizontally hinged from their respective top sides as shown. In one embodiment, pegs or other suitable shaft members are fitted to extend outwards from upper portions of the sides of the information panel 10 and main display 8, and are received in slots formed in cabinet 4, to provide the hinged coupling of the doors to the cabinet 4. Thus, the main display 8 opens in an upward swinging manner to provide access to commonly-serviced components such as bill acceptor 30, printer 18, and other peripherals. The information panel 10 is also upward swinging, as shown in FIG. 4. Both the main display 8 and information panel 10 close in a downward swinging manner, to define closed positions, as shown in FIG. 1.

In FIG. 4, the lower door 12 is horizontally hinged from its bottom side, as shown. In one embodiment, the lower door 12 swings open in a downward direction to provide access to the master gaming controller 108 and other infrequently-serviced components, and closes in an upward direction. Also, in one embodiment, the lower door 12 is a removable panel, which can be removed from the gaming machine cabinet 4 when it is opened. Because the main display 8, the information panel 10, and the lower door 12 all open and close independent of one another in upwards or downwards directions, it can be said that the doors open separately in vertical directions along the longitudinal axis 62 of the gaming machine to provide access to different interior regions of the machine 2.

In FIG. 4, the master gaming controller 108 is capable of executing operations of the machine 2, including outputting video data to the main display 8 for displaying the game of chance and outputting game data to the information panel 10. Also, in some configurations, master gaming controller 108 is coupled to candle 7 to output and control the display of lighting patterns and video data on candle 7. The master gaming controller 108 is also referred to herein as the processor of the gaming machine 2.

In FIG. 4, when the main display 8 and the information panel 10 are closed, the main display 8 and the information panel 10 cooperate with cabinet 4 to define an upper closed space in which the bill acceptor 30 and the printer 18 are situated. The lower door 12 closes to define a lower closed space separate from the upper space, as explained below.

Figure 5A:
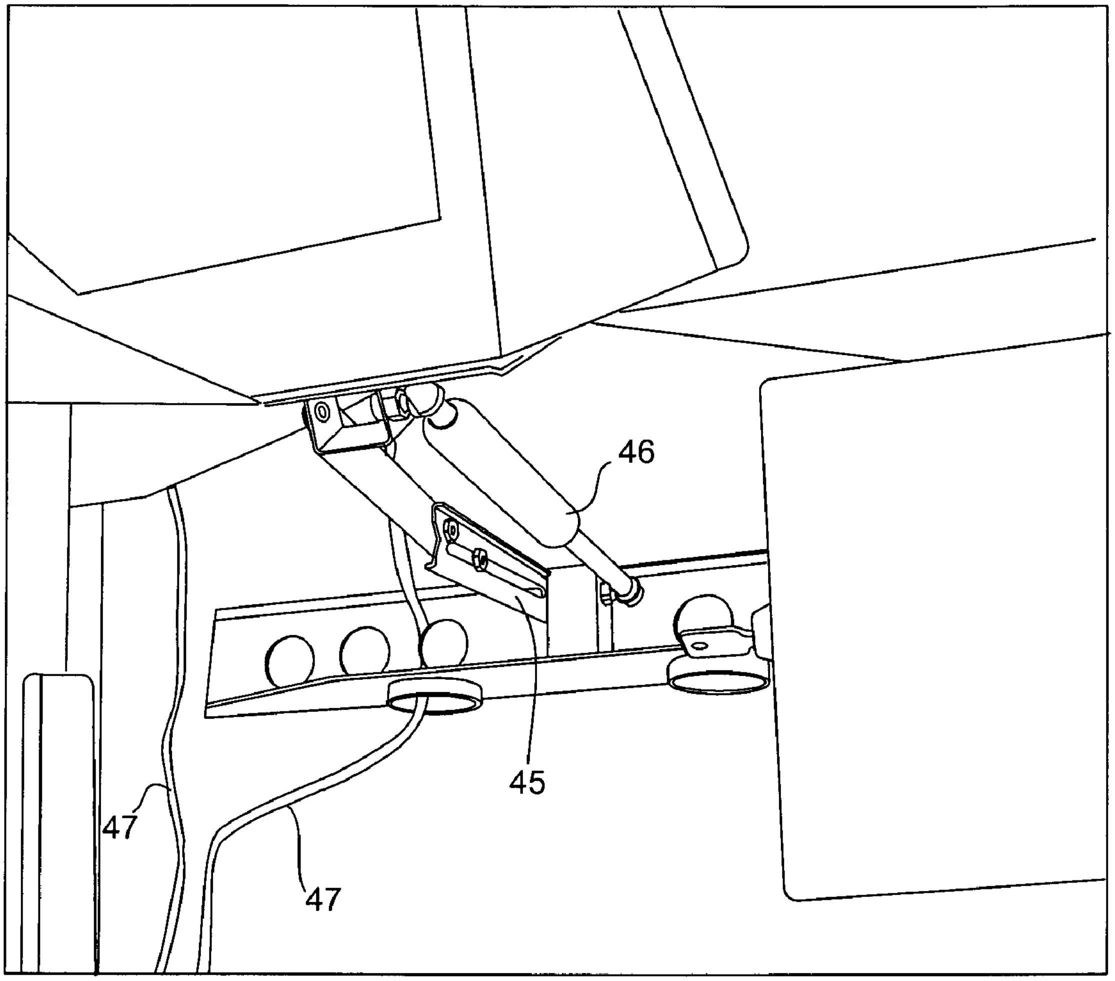
FIGS. 5A-C show diagrams of interior views of gaming machine cabinet 4 in an upper region of the machine, constructed according to embodiments of the invention.
Figure 5B:
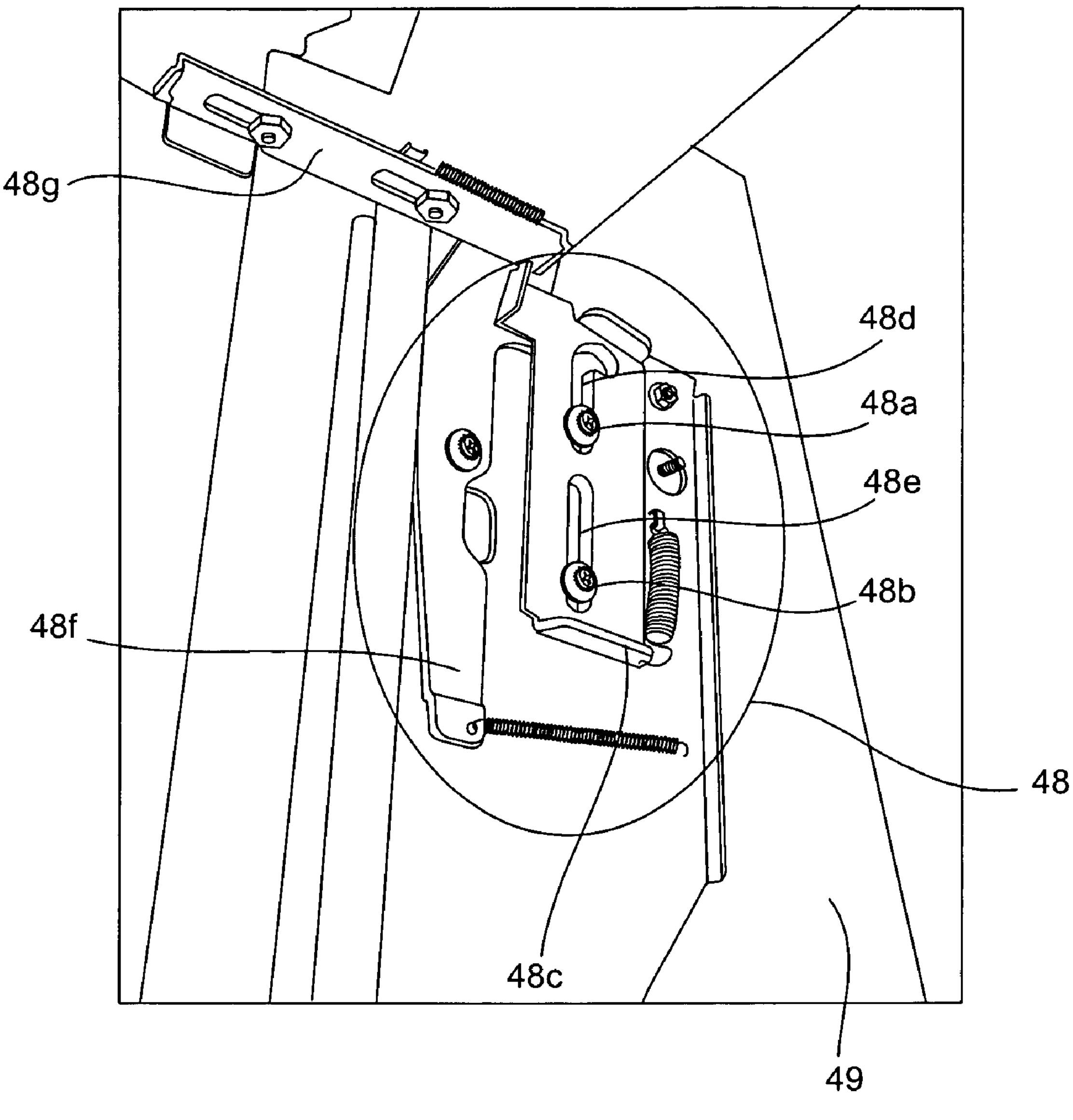
Figure 5C:
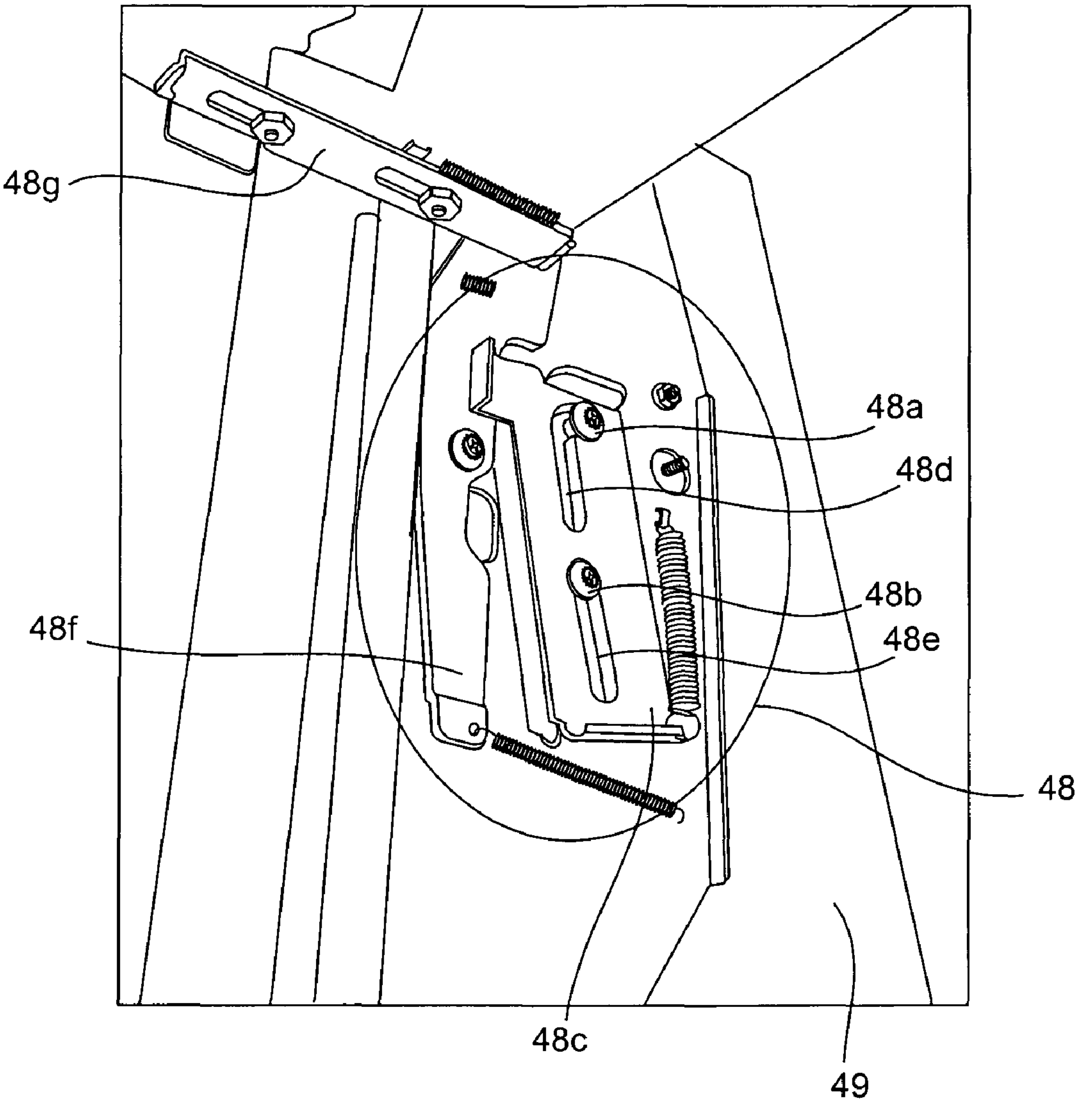

FIGS. 5A-C show diagrams of interior views of gaming machine cabinet 4 in a region behind main display 8, constructed according to embodiments of the invention. In FIG. 5A, when the main display 8 is moved to its open position, a locking bar or strut 45 holds the door 8 in place, while a damper 46 controls the speed at which the door can be opened and closed. Power and control cables 47 are coupled to provide power and control signals to the display 8. The control cables are coupled to master gaming controller 108, or another display controller in communication with the master gaming controller, and the power cables are coupled to an appropriate power supply.

In FIGS. 5B and 5C, a lock mechanism 48 fitted to one interior side wall 49 of cabinet 4 and coupled to main display 8 can be moved between an up, or locked position, in FIG. 5B, and a down, or unlocked position, shown in FIG. 5C. In one embodiment, the lock mechanism 48 has two pins 48*a* and 48*b* attached to the interior sidewall 49 of the cabinet 4. A locking member 48*c* has slots 48*d* and 48*e* enabling the locking member 48*c* to be moved up and down on the pins 48*a*, 48*b*. When the display 8 is open, an operator can manually actuate the lock mechanism 48, to move lock mechanism 48 between the locked position, FIG. 5B, in which display 8 is locked in place, and the unlocked position, FIG. 5C, in which display 8 can be decoupled from the cabinet 4 at its side pegs. Locking member 48*c* can be manually manipulated to move member 48*c* from the locked position to the unlocked position, enabling movement of a trigger 48*f* coupled as a component of the lock mechanism 48. Actuating the trigger 48*f*, or a sliding mechanism 48*g*, with an operator's finger facilitates removal of the display 8. In some embodiments, there is a pair of locking mechanisms, fitted on opposing interior sidewalls of the machine.

Figure 5D:
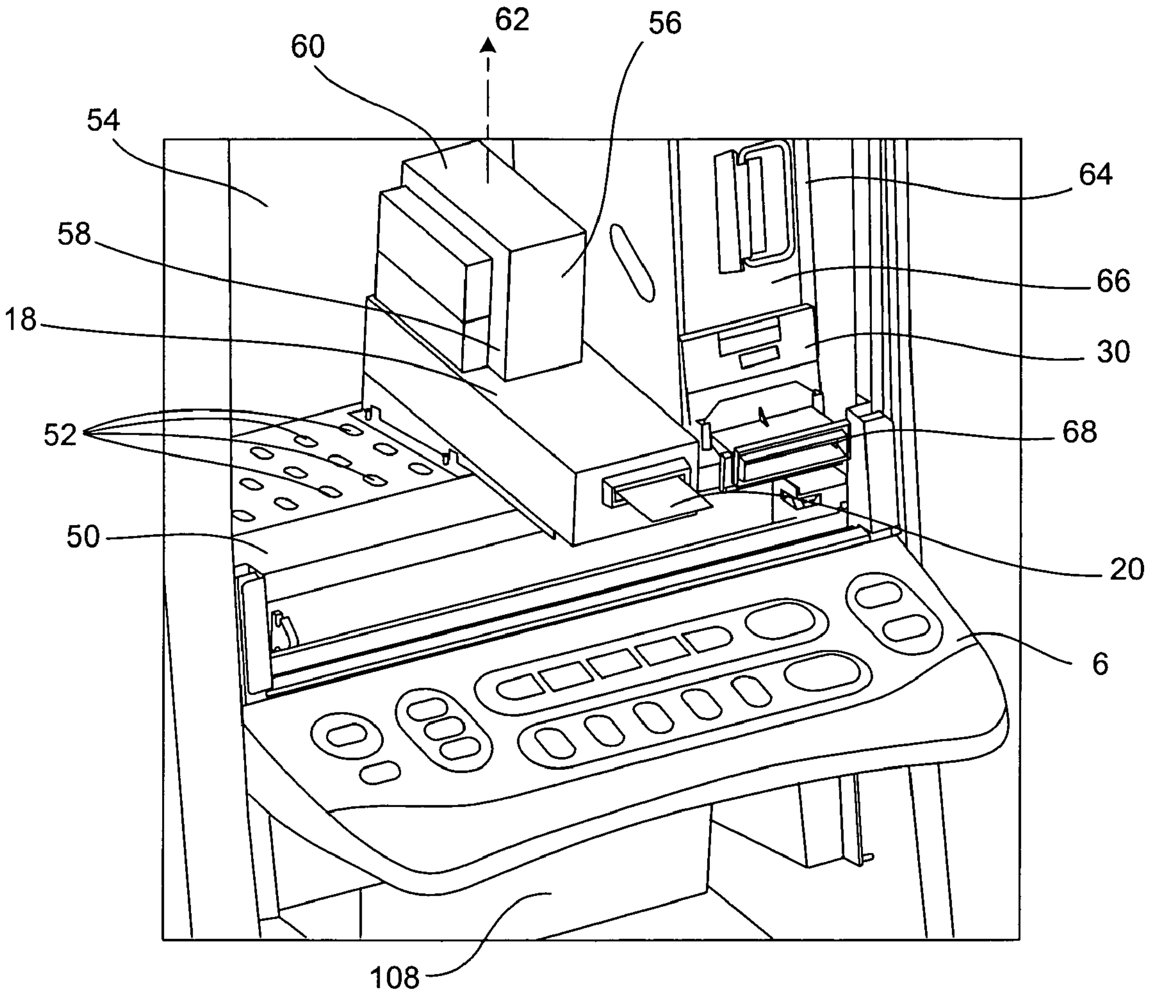
FIG. 5D shows a diagram of a close-up view of a middle region of the gaming machine 2, constructed according to an embodiment of the invention.

FIG. 5D shows a diagram of a close-up view of a middle region of the gaming machine 2, constructed according to an embodiment of the invention. As shown in FIG. 5D, a metal shelf 50, preferably non-removable, serves as a barrier to form a boundary between the upper and lower regions 42 and 44, and to separate them from one another. The bill acceptor 30 and the printer 18 are located in the upper region 42 in an interior space of cabinet 4, or "upper space," behind the main display 8 in its closed position. The bill acceptor 30 and printer 18 are mounted to a top side of the shelf 50. The processor 108 is located in the lower region 44 in an interior space of cabinet 4, or "lower space," behind the lower door 12 when door 12 is closed. The processor 108 is mounted to the cabinet 4 and/or shelf 50 below the non-removable shelf 50.

In FIG. 5D, in one embodiment, the shelf 50 is riveted into the cabinet 4 to form an integral part of the cabinet. There is a matrix of ventilation holes 52 formed in the shelf 50. The holes 52 provide ventilation for the processor 108, a power supply, and other heat-generating elements situated in the lower space. The shelf 50 extends from one side 49 of the interior cabinet 4 to the other, and extends from the front to a back interior wall 54 of the cabinet 4. Due to the presence of the shelf 50, and the small size of the ventilation holes 52, the lower space is generally inaccessible from the upper space, for instance, by opening the main display 8. The lower space is only accessible by opening the lower door 12.

The configuration of the machine 2, with the main display 8, the information panel 10, and the lower door 12 opening separately to provide access to different interior regions of the machine, provides the benefit of increased security. In one embodiment, the main display 8 and the lower door 12 are keyed with different locks to provide different levels of security. A "low access" key unlocks the main display 8, but not the lower door 12. Low access keys are given to casino personnel so they can open the main display 8 to access the bill acceptor 30 and the printer 18 as needed. With only the low access key, however, casino personnel cannot unlock the lower door 12 to access the processor 108 and possibly tamper with game play on the machine. A "high access" key unlocks both the lower door 12 and the main display 8. Preferably, IGT technicians hold high access keys. In this way, IGT technicians can open both the lower door 12 and the main display 8 to access the processor 108, the bill acceptor 30, the printer 18, and other components in both the upper and lower spaces to service them.

Various locks can be constructed and incorporated in embodiments of gaming machine 2 to provide the enhanced security features. In one implementation, a high access/low access locking mechanism includes a pin assembly which has two locks fitted to it. A low access key, when inserted in the lock mechanism, allows for movement of the pin in a single direction to unlock and release main display 8 from its locked position. Thus, casino personnel, and other technicians intended to have restricted access to machine 2, can be provided with low access keys. A high access key can be given to IGT technicians or other authorized personnel to insert in the high access/low access locking mechanism and move the pin in a first direction to release the lock for the main display 8, and also in a second direction to release the lower door 12. Additional door and locking apparatus, and related methods, can be implemented in gaming machines constructed according to embodiments of the present invention, including subject matter described in commonly assigned U.S. patent application Ser. No. 11/558,086, Beadell et al., filed concurrently herewith, for SINGLE ACCESS MECHANISM FOR GAMING DEVICE (Attorney Docket No. 4164-587/P-1130), which is incorporated herein by reference in its entirety for all purposes.

In another embodiment, an internal lever is located in an area behind the lower door 12. The main display 8 is unlocked by activating the internal lever. The high access key still unlocks the lower door 12. So, in this embodiment, the higher security area in which the processor 108 is situated is opened first. Then, the internal lever can be actuated to release the main display 8, bypassing the lock for the main display 8. Thus, in the various embodiments, the provision of different keys with different access permissions enables different levels of security for different regions of the same gaming machine 2, depending on the desired implementation.

The configuration of the machine 2 also provides the benefit of less physical interference with other machines. Gaming machines are often located in close proximity to one another, for instance, side-by-side in rows along a casino floor or other gaming environment. In the machine 2, the main display 8, the information panel 10, and the lower door 12 all swing open independent of one another in an upwards or downwards manner, that is, in a vertical direction. This configuration is beneficial because when the main display 8, the information panel 10, and the lower door 12, are opened, they do not collide with, obstruct, or otherwise interfere with gaming machines located on either side of the machine 2.

Figure 6:
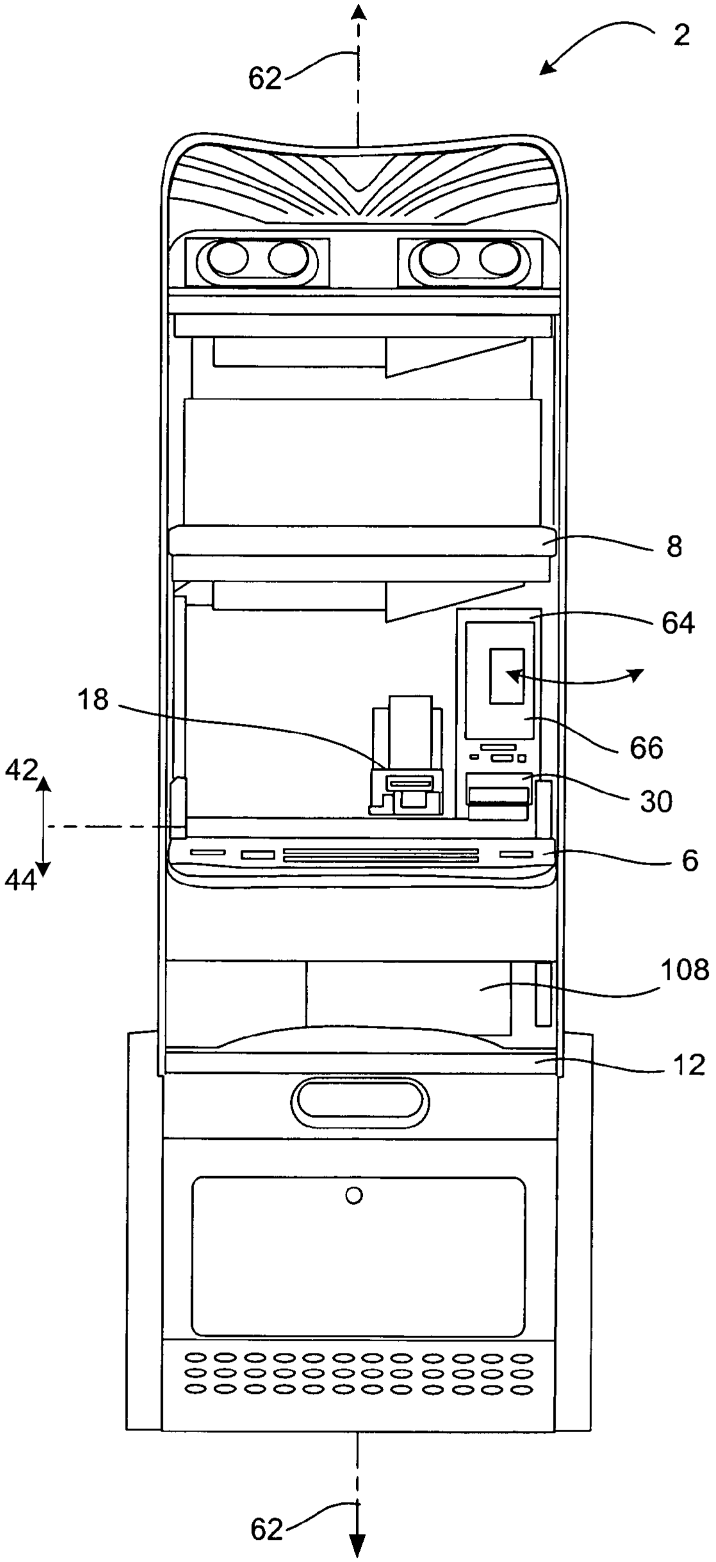
FIG. 6 is a diagram of a front view of the gaming machine 2 with open doors, constructed according to one embodiment of the present invention.

FIG. 6 shows a diagram of a front view of gaming machine 2, constructed in accordance with one embodiment of the present invention. The various doors including information panel 10, main display 8, and lower door 12 are open to show interior spaces enclosed by those doors. As shown, the printer 18 and bill acceptor 30 are consolidated in the upper space of region 42 of gaming machine 2, while the processor 108 is located in the lower space of region 44.

Returning to FIG. 5D, printer 18 includes a ticket stack 56, which holds tickets for printing and dispensing by printer 18. Printer 18 further includes an upper portion 60 which is open to receive tickets. Ticket stack 56 is a gravity feeding stack, so that tickets can simply be dropped in from the upper portion 60 of ticket stack for feeding into printer 18. Tickets are pulled from the upper portion 60 of ticket stack 56 in a fan-fold orientation, fed down through printer 18, and then printed and dispensed from printer 18, for instance, ticket 20. As tickets are pulled from the ticket stack 56, and printed and dispensed from printer 18, eventually the tickets in ticket stack 56 run out unless they are replenished. Thus, casino personnel need to regularly access the upper, open portion 60 of ticket stack 56 to add tickets to the stack. In the arrangement shown in FIGS. 5D and 6, therefore, the orientation of printer 18, with the upper portion 60 of ticket stack 56 exposed in a vertical direction generally aligned with a longitudinal axis 62 of the gaming machine 2, enables personnel to simply open main display 8 and easily place tickets in upper portion 60 of ticket stack 56 for replenishment.

In FIGS. 5D and 6, bill acceptor 30 includes a cash box 64 with a door 66 which swings open in a horizontal direction to access an interior region of cash box 64 in which bills are stored. Generally, cash box 64 is a box that holds the money inserted through the bill receiving portion 68 of bill acceptor 30. In some embodiments, a metal casing in the interior region of the cash box 64 holds the bills. In one embodiment, as shown in FIGS. 4, 5D and 6, the door 66 of cash box 64 is mounted to cash box 64 with hinges along one side in the vertical direction. In this way, the door 66 opens horizontally to provide an access portion in the front of cash box 64, facing the front of gaming machine 2. Thus, casino personnel only need to open the main display 8 to access cash box 64.

In the embodiment of gaming machine 2 shown in FIGS. 5D and 6, the bill acceptor 30, including the cash box 64, is situated in upper region 42 of gaming machine 2. This arrangement and positioning of bill acceptor 30 is to be contrasted with conventional bill acceptor designs and orientations, where the bill acceptor 30 is inverted. That is, in many conventional designs, cash box 64 is situated below interface portion 68 of bill acceptor 30. Thus, in a conventional gaming machine configuration, the cash box 64 of bill acceptor 30 would extend into lower region 44 of gaming machine 2, that is, behind lower door 12. So in the conventional arrangement, lower door 12 would have to be opened every time cash box 64 needed to be accessed.

In FIGS. 5D and 6, those skilled in the art should appreciate that the design of novel bill acceptor 30, including cash box 64, may require a specialized head arrangement with re-oriented sensors, as opposed to conventional bill acceptor designs, to properly scan and process bills received through interface portion 68 of bill acceptor 30. In embodiments of gaming machine 2, because both ticket printer 18 and bill acceptor 30 have access portions or regions exposed in upper region 42 of machine 2, casino personnel and service technicians only need to open the single display 8 to access these peripheral devices. Thus, anytime tickets need to be replenished in printer 18 and bills removed from cash box 64, the lower door 12 can remain closed, enclosing and maintaining the security of processor 108. Because there is reduced need for access to processor 108, the entire machine 2 is more secure.

Figure 7A:
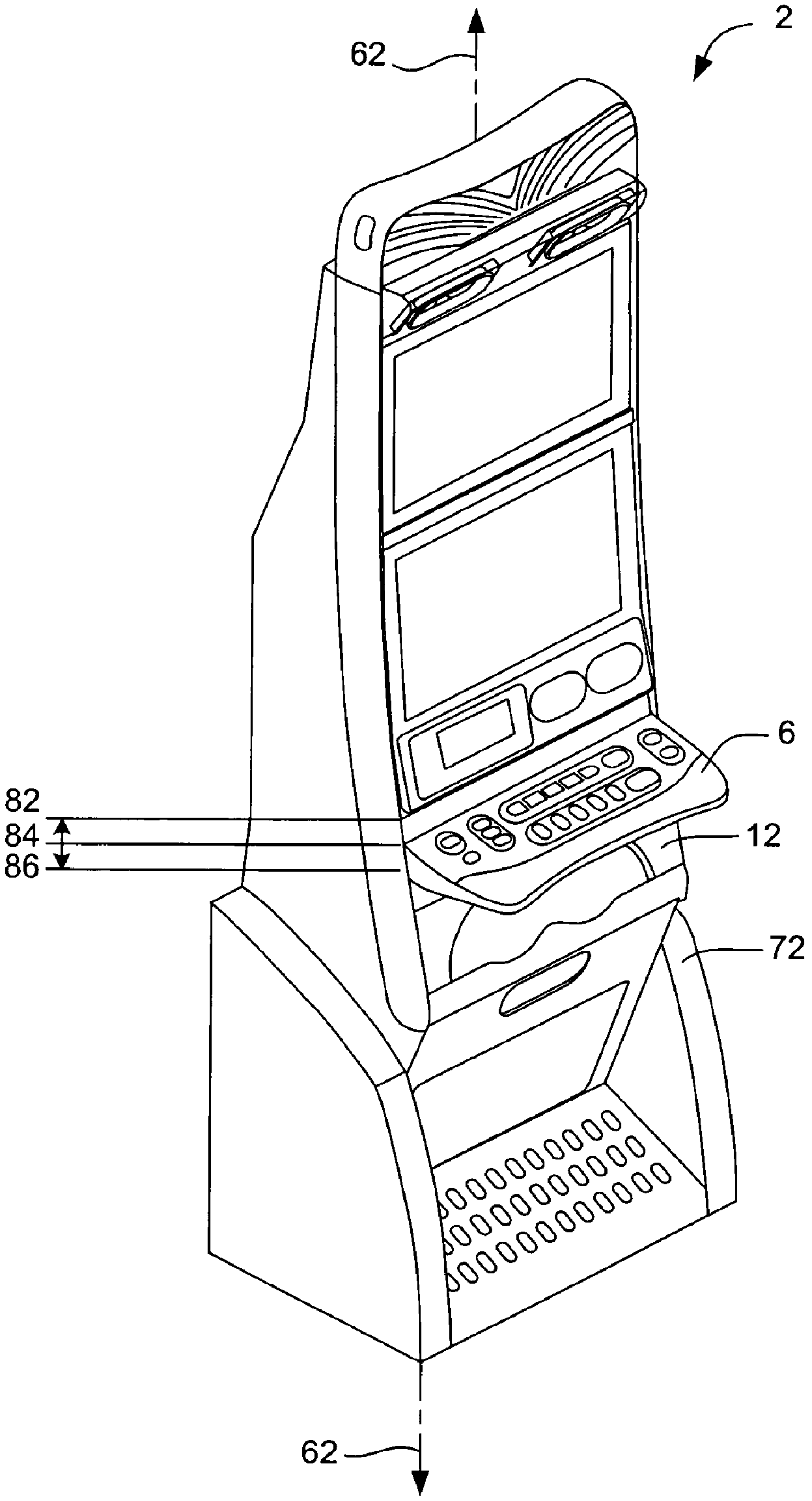
FIGS. 7A and 7B are diagrams of the gaming machine 2 with an adjustable button panel in different positions, constructed according to one embodiment of the present invention.
Figure 7B:
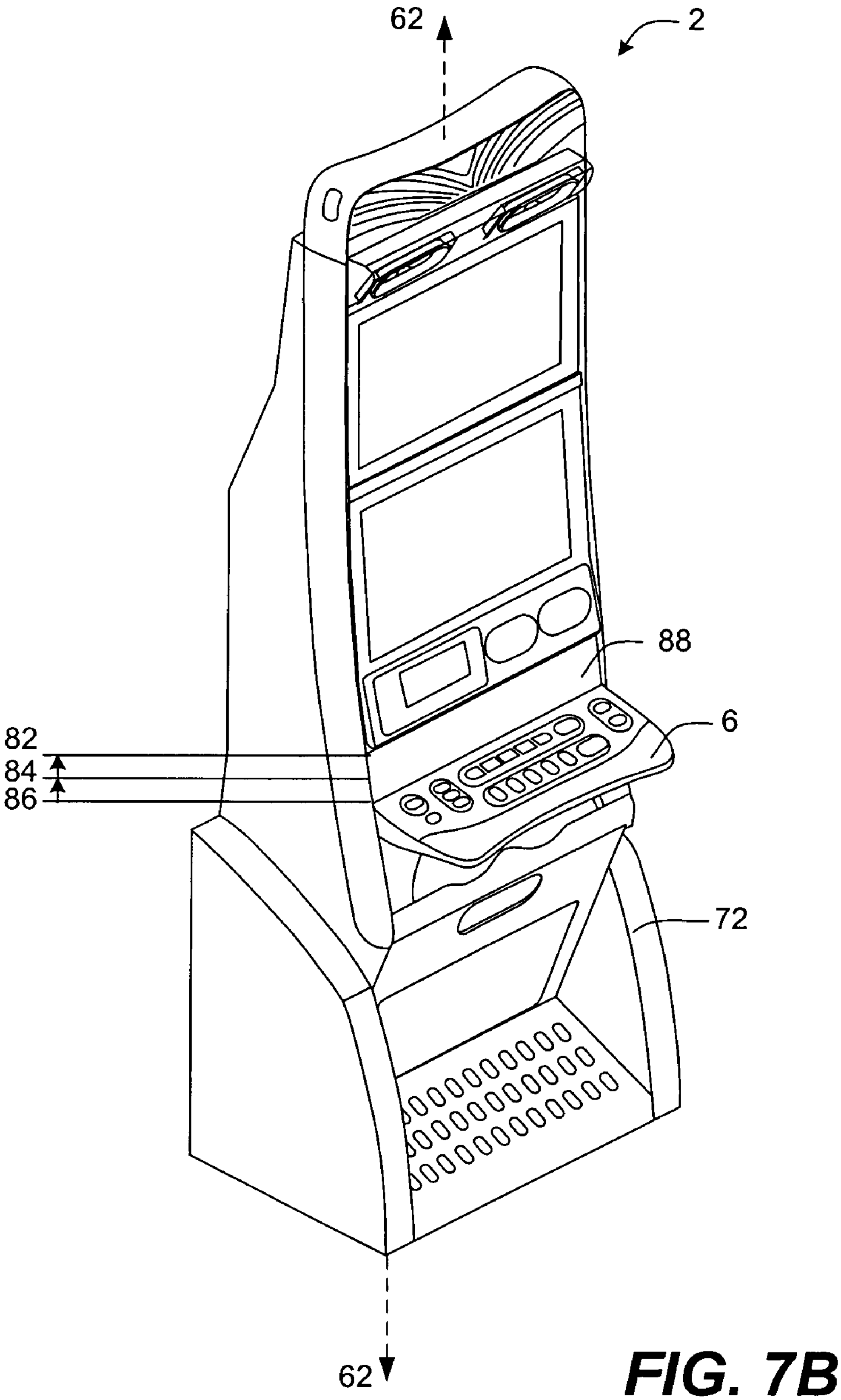

FIGS. 7A and 7B show diagrams of gaming machine 2 with an adjustable button panel 6. When viewed in combination with FIG. 4, the adjustable button panel 6 is shown as moving vertically along the longitudinal axis 62 of gaming machine 2. In one embodiment, the adjustable button panel 6 is adjustable for variations in the height of the stand 72 on which gaming machine 2 is mounted, and variations in the height of a chair on which the player can sit to place wagers for play of games of chance on gaming machine 2. In another embodiment, the player can adjust the button panel height to accommodate for variations in the height and build of that particular player of gaming machine 2. Thus, adjustable button panel 6 provides the benefit of flexibility in achieving comfortable ergonomic positions for a player regardless of the particular stand 72, particular chair, and the height of the player of gaming machine 2.

In FIGS. 7A and 7B, in one embodiment, a base portion of the gaming machine cabinet 4 and the stand 72 are formed with self-alignment features, so the base portion and the stand 72 automatically locate one another when mated, prior to being bolted together. Thus, movement of the machine 2 about the gaming environment floor is facilitated. In one embodiment, the base portion of the cabinet 4 is fitted with a metal rack, rather than the wood panel of some conventional gaming machines. A bottom region of the stand 72 is preferably open, that is, not fitted with a floor panel, to provided unfettered wiring access to communications and power cables located on the casino floor.

FIG. 8 shows a diagram of a side view of gaming machine 2 with an adjustable button panel 6 having three positions 82, 84 and 86. Those skilled in the art should appreciate that button panel 6 can be constructed to be adjustable to any number of different positions along the longitudinal axis 62 of gaming machine 2. Thus, the height of button panel 6 can be adjusted as desired to meet an ergonomically correct range of positions for players of gaming machine 2. In one embodiment, the height adjustment mechanism is situated within gaming machine 2 so that adjustments are made only by authorized service technicians and casino personnel in setting up gaming machine 2 for play. In this embodiment, control mechanisms for adjusting button panel 6 are provided within gaming machine 2, and can only be accessed by a holder of the proper key or keys to open one or more of the doors to access the interior of gaming machine 2. For instance, a positioning and release mechanism can be situated in the interior of gaming machine 2 behind lower door 12 of the machine. Thus, adjustments can only be made when lower door 12 is opened and the installer or service technician of gaming machine 2 has a key to open lower door 12 and access the mechanism to adjust the height of button panel 6.

In FIG. 8, the button panel 6 is built with an adjustability to raise or lower the button panel 6 to any of the positions 82, 84 and 86 along the vertical direction, that is longitudinal axis 62 of gaming machine 2. In one embodiment, for example, there are approximately 1.5 inches between positions 82 and 84, and 1.5 inches between positions 84 and 86. Thus the machine 2 is provided with approximately 3 inches of adjustability. Other distance ranges can be implemented as desired. In one embodiment, a vertical jack screw or sliding mechanism is implemented to provide a continuum of positions rather than the hard stops for positions 82, 84 and 86. The casino operator or player can set the position of button panel 6 as desired in each direction along longitudinal axis 62. For instance, when a gaming venue owner puts machine 2 on his stand of choice and/or adjacent to his chair of choice, the height of button panel 6 can be optimized accordingly. In another embodiment, in which the player is provided with adjustability of button panel 6, the player can adjust button panel 6 to optimize the player's height for player comfort.

Figure 9A:
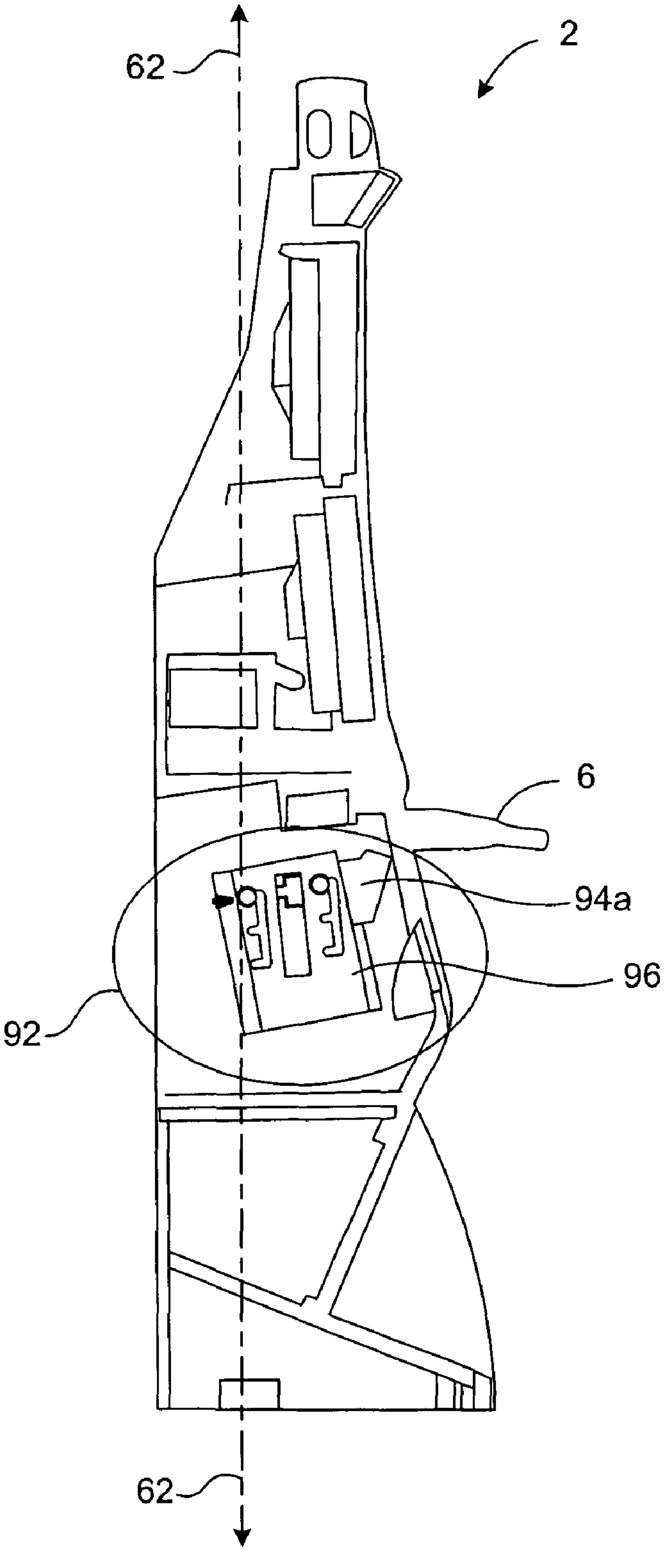
FIG. 9A is a diagram of a side view of the gaming machine 2 with an interior carriage assembly for seating an adjustable button panel in different positions, constructed according to one embodiment of the present invention.
Figure 9B:
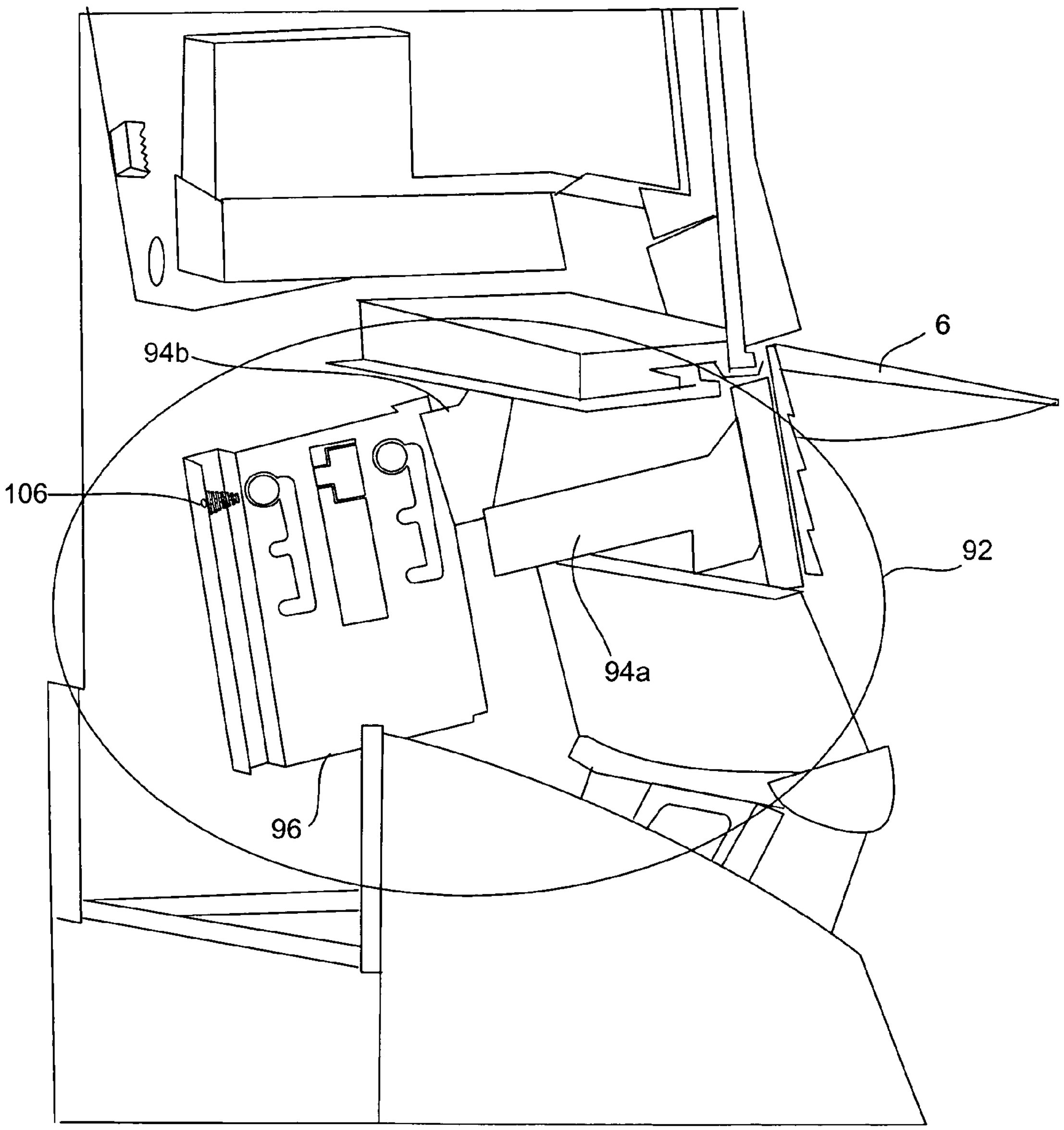
FIGS. 9B and 9C are diagrams of close-up side views of the gaming machine 2 with an interior carriage assembly for seating an adjustable button panel in different positions, constructed according to one embodiment of the present invention.
Figure 9C:
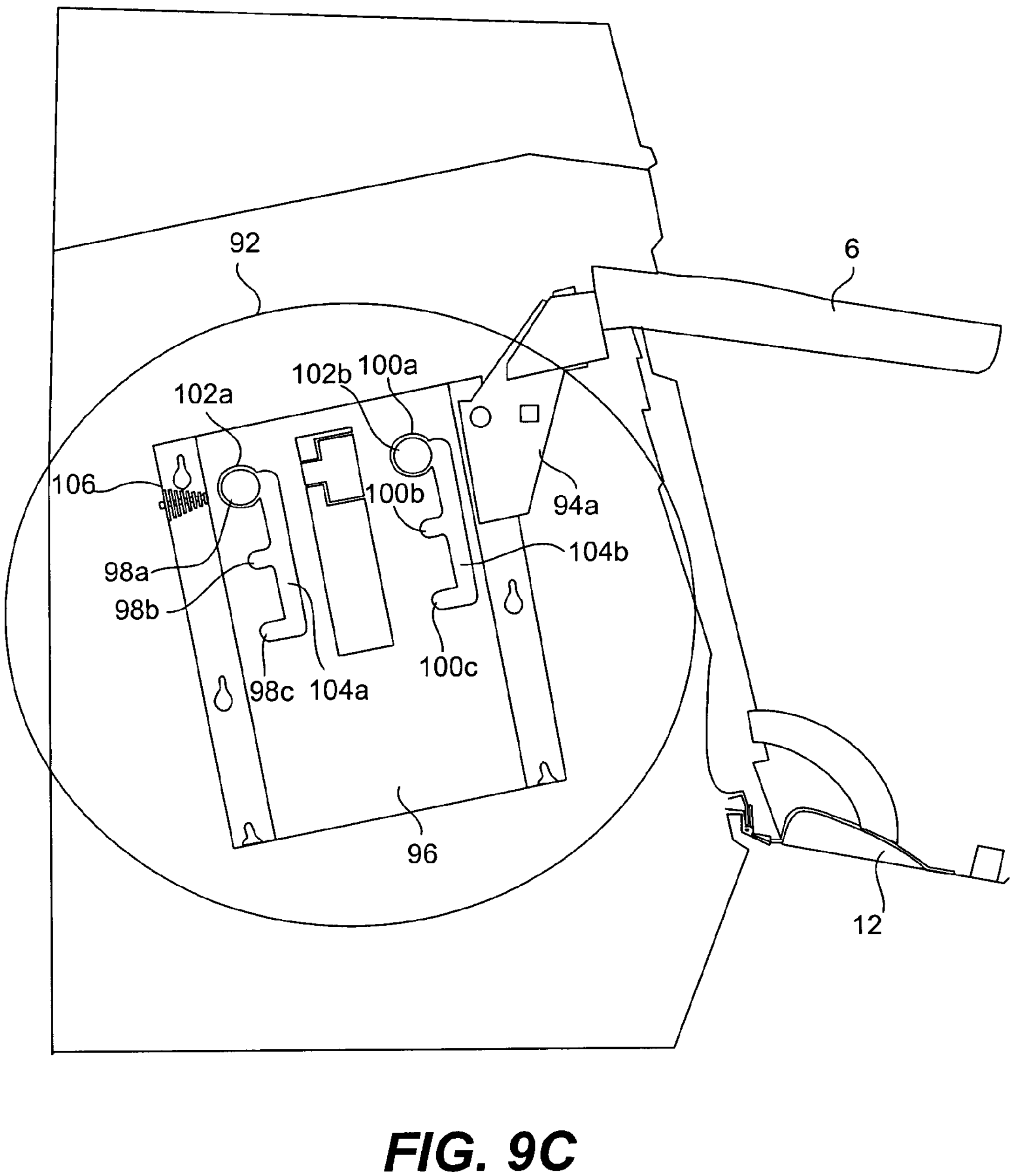

FIGS. 9A, 9B and 9C show diagrams of side internal views of gaming machine 2 including one embodiment of a positioning mechanism 92 for adjusting the position of button panel 6 along longitudinal axis 62. The positioning mechanism can be actuated manually, in some embodiments, or in an automated fashion using a stepper motor or other suitable apparatus for electromechanical control of the button panel height, in other embodiments. In FIGS. 9A-9C, two arms **94*a* and 94*b* situated on opposite sides of button panel 6 are provided as internal structural members of button panel 6, extending towards the back of the machine in the interior of the gaming machine. At least one of these arms is fitted into a carriage 96 having two sets of aligned slots, 98*a*, 98*b* and 98*c* in one set, and corresponding slots 100*a*, 100*b* and 100*c* in a second set. The arm 94*a* has bolts 102*a* and 102*b* or other suitable members extending from the side of arm 94*a* to fit into one pair of slots formed in carriage 96. For instance, as shown in FIGS. 9B and 9C, the members 102*a* and 102*b* are seated in slots 98*a* and 100*a*, respectively. In another embodiment, one or more additional sets of slots are formed in carriage 96**, for seating one or more additional bolts. For instance, in one embodiment, there are three sets of slots for seating three respective bolts.

In FIGS. 9A-9C, the corresponding pairs of slots define the three possible positions 82, 84 and 86 for adjustable button panel 6. That is, when members **102*a* and 102*b* are seated in the first pair of slots 98*a* and 100*a*, the button panel 6 is in position 82 as shown in FIG. 8. Similarly, the slots 98*b* and 100*b* correspond to the middle position 84, and slots 98*c* and 100*c* correspond to the lower position 86 of button panel 6. In other embodiments, additional slots are formed in carriage 96 to provide additional positions for the button panel 6. For instance, in one embodiment, four slots are provided to define four positions for locating adjustable button panel 6. In one embodiment, there is a single carriage 96 into which one arm 94*a* is seated. The carriage 96 is mounted on one interior side wall of the gaming machine cabinet. Those skilled in the art will appreciate that, when a single carriage 96 is used, the carriage could be fitted on either side of the interior of machine 2, so that either arm 94*a* or 94*b* can be fitted with members 102*a* and 102*b* to engage carriage 96. In another alternative embodiment, a pair of carriages are provided, one on either side of gaming machine 2. Both arms 94*a* and 94*b* have members which engage the respective carriages. In one embodiment, the carriages are formed as integral parts of the gaming machine cabinet. In this way, the button panel 6** is coupled to the supportive sides of the cabinet itself.

In FIG. 9C, in one embodiment, the button panel 6 is manually adjustable by lifting and pulling panel 6 towards the front of gaming machine 2 and moving the button panel in a generally vertical direction along longitudinal axis 62 so that the members **102*a* and 102*b* can move within vertical transition areas 104*a* and 104*b* of carriage 96. When the desired position, 82, 84 or 86 is reached, the user can manually push button panel 6 towards the rear of gaming machine 2 into one of the three pairs of slots, such as slots 98*a* and 100*a* corresponding to position 82**.

In FIGS. 9B and 9C, in one embodiment, a release button 106 is pressed to unlock or release the button panel 6 from any of the positions 82, 84 and 86 for movement along longitudinal axis 62 and repositioning. In this implementation, a locking mechanism in carriage 96 automatically locks members **102*a* and 102*b* in the pair of slots into which they are inserted when the user manually positions button panel 6. When repositioning is desired, in one embodiment, the user accesses release button 106 from the interior of gaming machine 2, for instance, when lower door 12 is opened. In other alternative embodiments, release button 106 can be fitted with additional hardware to provide electromechanical actuation of button 106, for instance, from an electronic control mechanism on button panel 6, or even a wireless device external to gaming machine 2 and provided with communication capabilities with gaming machine 2**.

Embodiments of the movable button panel provide for adjusting the height of the button panel by manipulating a locking mechanism and a release, an electronic switch, or by removal of standard mechanical fasteners, depending on the desired implementation. For instance, in one embodiment, the gaming machine cabinet 4 has a mounting panel mounted to or integral with the cabinet in an interior region of the cabinet. The mounting panel is accessible to an operator, for instance, through lower door 12 of the cabinet. The button panel 6 is removably attached to the mounting panel by fasteners. The mounting panel provides a plurality of positions at which the button panel 6 can be attached, allowing the button panel to be reconfigured for different locations on the mounting panel.

Figure 10:
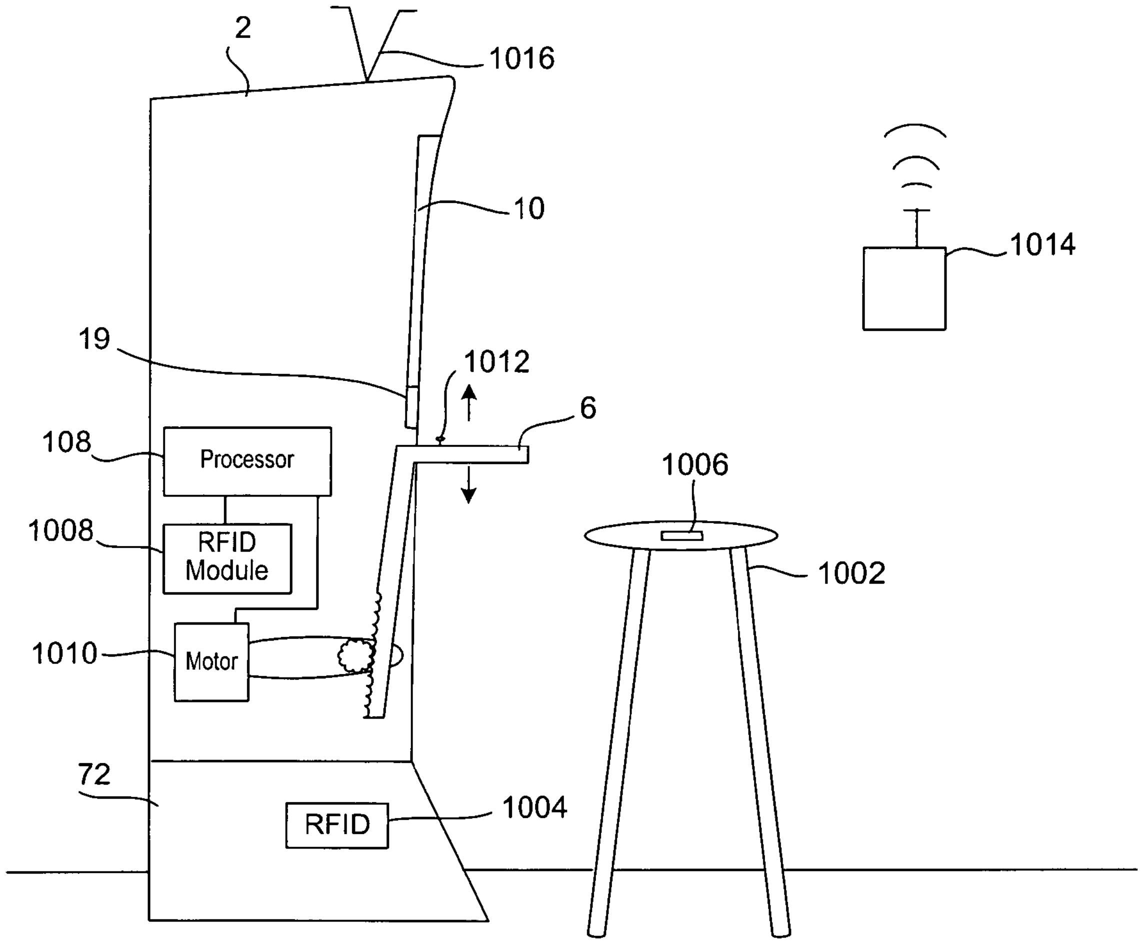
FIG. 10 is a diagram of a side view of a gaming machine and system with an automated adjustable button panel, constructed according to one embodiment of the present invention.

FIG. 10 shows a diagram of a side view of a gaming machine and system constructed according to another embodiment of the present invention. In FIG. 10, the gaming machine 2 is mounted on top of a stand 72, and a chair 1002 is provided in front of gaming machine 2 for players to sit on and play games of chance on the gaming machine. The gaming machine of FIG. 10 is provided with several mechanisms for adjusting the height of button panel 6.

In one embodiment, as shown in FIG. 10, a Radio Frequency Identification (RFID) chip 1004 is built into or attached to stand 72. Another RFID chip 1006 is attached to chair 1002. Each RFID chip 1004 and 1006 provides information identifying the particular stand or chair model, in one embodiment, and in another embodiment, simply provides height data for the respective stand 72 or chair 1002. An RFID module 1008, provided in gaming machine 2, senses both RFID chips 1004, 1006. The RFID module 1008 is coupled to retrieve height data directly from RFID chips 1004 and 1006, or alternatively, look up in a database or other suitable storage medium height information associated with the identification information provided by RFID chips 1004 and 1006. Through master gaming controller 108, RFID module 1008 provides adjustment instructions to a motor 1010 which adjusts button panel 6 accordingly. In one embodiment, a suitable storage medium provided within gaming machine 2 or coupled to a data network in communication with gaming machine 2 includes position information for button panel 6 corresponding to respective stand 72 and chair 1002 identification data. A table look-up procedure can be performed to determine a predetermined height of button panel 6 corresponding to the identified stand 72 and chair 1002.

One benefit of using RFID chips in stand 72 and chair 1002 is that various stands and chairs can be used in conjunction with gaming machine 2. As stands and chairs are interchanged, the RFID module 1008 enables the same machine 2 to have an appropriate button panel height to accommodate the selected stand and chair.

In FIG. 10, in one embodiment, a set of up and down buttons or lever 1012 can be provided on the button panel 6 or a suitable location accessible to players of gaming machine 2. In this embodiment, players are free to adjust the button panel 1012 as desired. Actuation of the lever 1012, for example, in an up or down direction, causes direction signals to be sent to processor 108 which, responsive to those signals, causes button panel 6 to move accordingly until button panel 6 reaches the desired positioning for the player.

In FIG. 10, in another embodiment, a portable wireless device 1014 such as a mobile phone, PDA, or wireless email device can be held by a player or casino personnel. Using wireless device 1014, positioning data for button panel 6 can be entered and transmitted to gaming machine 2 through antenna 1016 or other suitable wireless communications interface, such as a BlueTooth interface, for processing by processor 108 to control motor 1010 and adjust the position of button panel 6 accordingly. In another embodiment, the wireless communications interface of gaming machine 2 automatically detects the presence of wireless device 1014. The position data can be received directly from wireless device 1014. In another embodiment, the position data is stored in an accessible storage medium and retrieved using player identification information received from the wireless device 1014.

In FIG. 10, in another alternative embodiment, a player tracking card, ticket, smart card, or other portable storage medium can be inserted in player tracking module 19. With button panel positioning data stored on the storage medium, such information can be read through the player tracking module 19 and communicated to processor 108 for adjustment of button panel 6.

In FIG. 10, in the various implementations described above, button panel positioning data can be stored in a storage medium local or remote to gaming machine 2 and accessible over a suitable bus or communications network. Thus, when player ID information, stand ID information, chair ID information, or other ID information is provided to machine 2, conventional look-up techniques can be implemented to retrieve associated positioning data for button panel 6. When the positioning data is provided to master gaming controller 108, the height of button panel 6 is adjusted accordingly.

In FIGS. 7B and 7C, as the button panel moves down to positions 84 and 86, a decorative surface 88 of the front of gaming machine 2, behind button panel 6, is exposed. This decorative surface is preferably made of a solid material and firmly mounted to the front of cabinet 2 to prevent players from gaining access to the interior of gaming machine 2. Electronics in button panel 6 are coupled to master gaming controller 108 within gaming machine 2. Generally, harnesses carrying wires travel from button panel 6 through openings formed in decorative surface 88 to master gaming controller 108 of the machine 2. The harnesses that travel from the button panel to the master gaming controller 108 preferably expose no wires to players of gaming machine 2, to prevent tampering.

In FIGS. 4, 7A and 7B, the various possible positions of button panel 6 are such that the main display 8, including player tracking module 19, can always be opened with a proper key to access the peripheral devices housed within. That is, in all of the various positions 82, 84 and 86 of button panel 6, the main display 8 is not obstructed. Thus, one benefit of gaming machine 2 is that the cash box 64 and ticket stack 56 can always be accessed regardless of the position of button panel 6. In addition, the lower door 12 can always be opened, regardless of the position of button panel 6. The grouping and orientation of printer 18 and bill acceptor 30 behind the main display 8, rather than behind lower door 12, facilitates the sizing of lower door 12 so that it can be opened even when the button panel 6 is in its lowest position 86.

Figure 11:
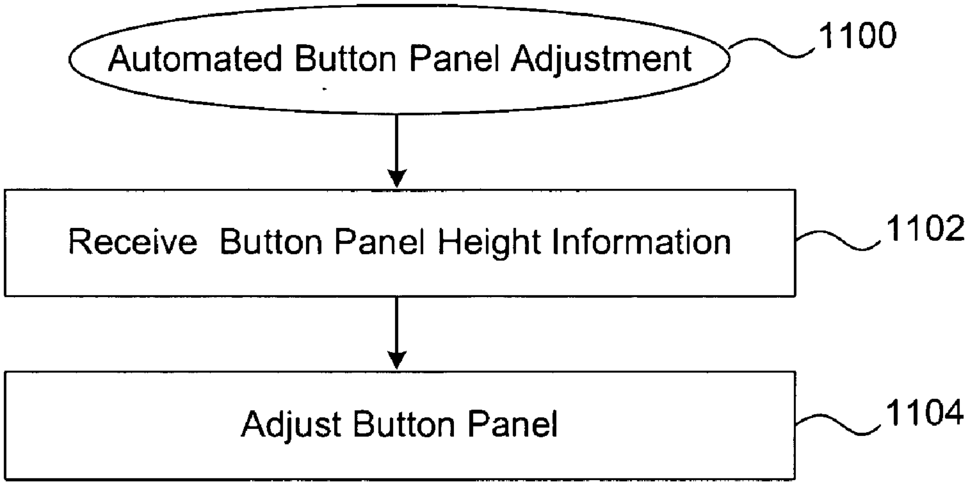
FIGS. 11, 12 and 13 are flow diagrams of methods for adjusting a button panel of a gaming machine, performed in accordance with embodiments of the present invention.

FIG. 11 shows a flow diagram of a method 1100 for adjusting button panel 6 of gaming machine 2, performed in accordance with one embodiment of the present invention. In step 1102, button panel height information is received. As mentioned above, such information can be received directly from RFID sensors mounted in the stand 72 or chair 1002, input by a player using a key pad on the button panel 6 or player tracking module 19, read off of a card or other suitable storage medium such as a player tracking card, ticket, or smart card, and received directly by pressing of a switch or lever 1012 on button panel 6. Such input data can be provided by casino personnel or players of the machine 2, depending on the desired implementations. In step 1104, upon receiving such information, the button panel is adjusted. In one embodiment, as mentioned above, a motor 1010 is controlled by master gaming controller 108 to automatically adjust the button panel to the desired position. In another embodiment, the button panel is manually adjusted, for example, using the carriage 96 and other related apparatus as described above with respect to FIGS. 9A-9C.

Figure 12:
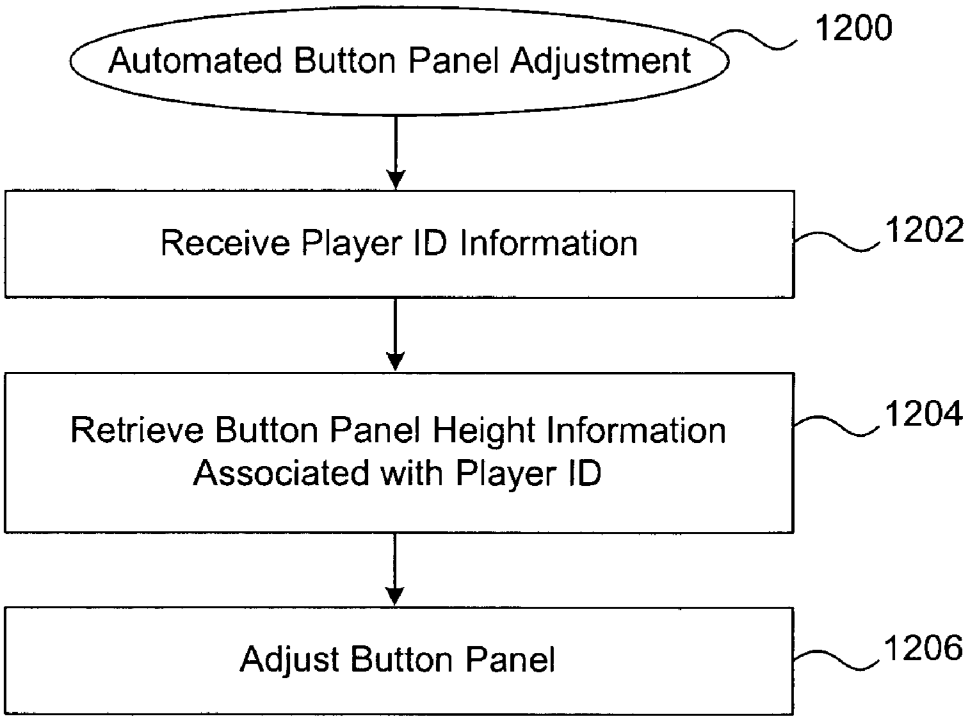

FIG. 12 shows a flow diagram of a method 1200 for adjusting button panel 6 of gaming machine 2, performed in accordance with an embodiment of the present invention. In method 1200, player identification (ID) information is used to retrieve associated button panel height information stored in a suitable storage medium, coupled directly to gaming machine 2 or accessible over a suitable communications network. In step 1202, player ID information is received by gaming machine 2. In one example, a player tracking card is inserted in an interface on player tracking module 19, and the player ID information is read off of the card. Other suitable storage mediums and input devices can be used to provide player ID information to gaming machine 2. For instance, the ID information can be keyed directly into gaming machine 2 using button panel 6, using a touch screen device built into the player tracking module 19 or any of the displays 8 and 10. In another example, such player ID information is retrieved from a mobile device 1014 such as a cell phone or PDA.

In FIG. 12, when the player ID information is received through an appropriate communications interface of gaming machine 2, the player ID information is passed to master gaming controller 108. Responsive to receiving the player ID information, in step 1204, master gaming controller 108 retrieves button panel height information associated with the player ID. As mentioned above, the storage medium look-up procedures can be performed to identify the associated button panel positioning data associated with the retrieved player ID. For example, a player account maintained for the player may store the desirable button panel height for that player, based on past play of gaming machine 2 or other similar machines. In step 1206, when the button panel height data is retrieved, the button panel 6 can be adjusted accordingly, for instance, by processor 108 controlling motor 1010.

Figure 13:
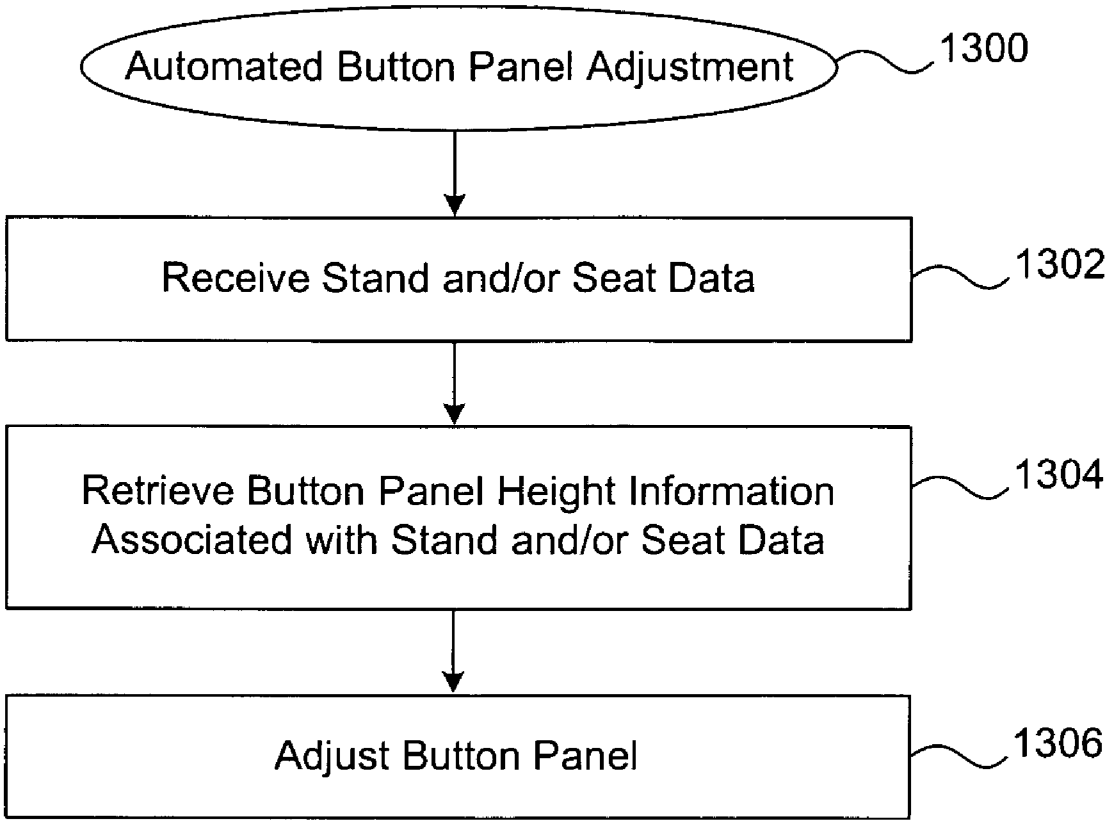

FIG. 13 shows a flow diagram of a method 1300 of automated button panel adjustment, performed in accordance with one embodiment of the present invention. In method 1300, adjustments to button panel 6 are made based on stand 72 and chair 1002 data. In step 1302, stand and/or seat data is received. In one embodiment, as mentioned above, RFID chips 1004 and 1006 embedded in the stand and chair, respectively, provide such data. In another embodiment, the data stored by RFID chips 1004 and 1006 simply indicate an identification of the stand and chair, for instance a model number. Responsive to receiving such data, in step 1304, button panel height data associated with the received stand and/or seat data is retrieved. Again, a suitable look-up procedure can be performed to identify the appropriate button panel height data providing an optimal positioning for the selected stand and seat. In step 1306, the button panel is adjusted accordingly, for instance, using motor 1010 controlled by processor 108.

FIG. 14A shows a front view of the upper region of gaming machine 2, including candle 7, speakers 9 and 11, and information panel 10. As described above with respect to FIG. 1, a candle 7 is situated above the top box area 13 of gaming machine 2. In a preferred embodiment, the candle 7 is built into the machine 2 as an integral part of cabinet 4. In an alternative embodiment, the candle 7 is constructed as a separate component mounted on top of area 13. The candle 7 can be constructed in several different manners. In one embodiment, as shown in FIG. 14A, the candle 7 includes a front display portion constructed with a panel of multi-color lights 1402, which are coupled to master gaming controller 108 and/or a lighting display controller configured to control the output of visual effects on the candle 7, such as flashing and strobing lights.

Figure 14C:
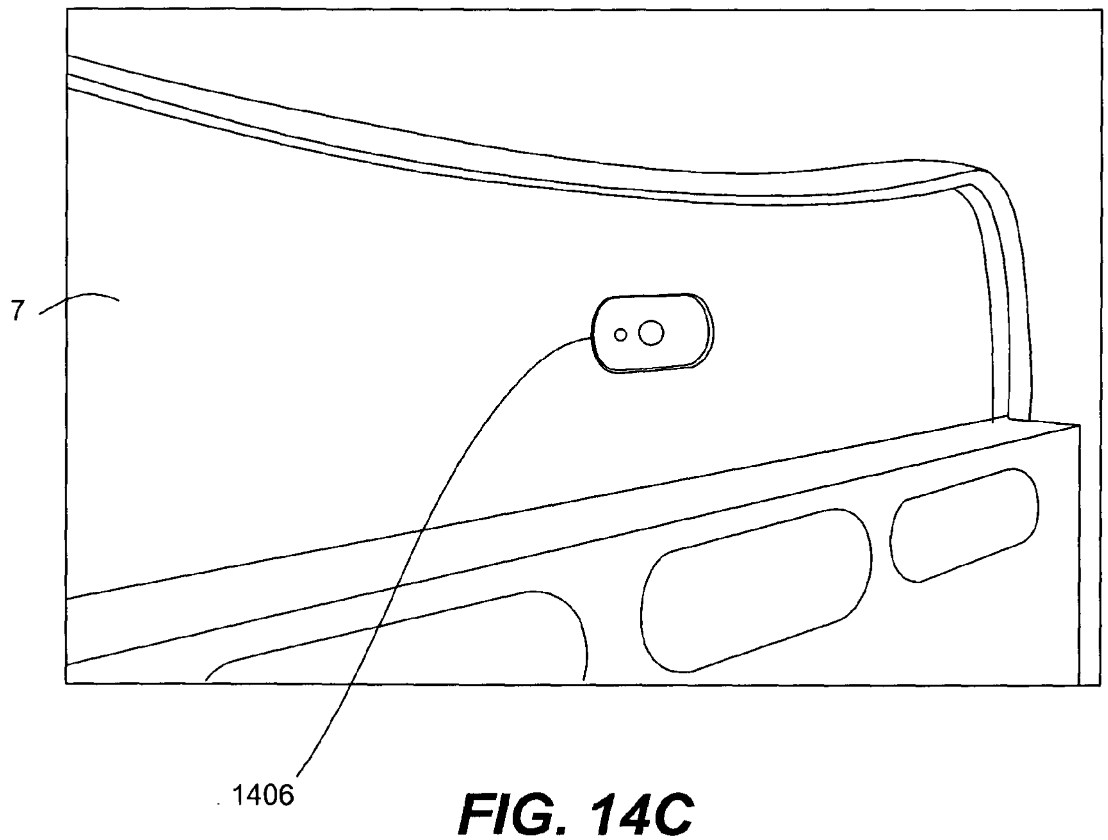
FIG. 14C shows a rear view of the candle, having a panel defining a back display portion, constructed according to one embodiment of the present invention.

FIG. 14B shows a side view of the candle 7. As shown, the candle includes a further arrangement of lights presented in a side panel 1404, defining a side display portion of candle 7 for viewing. A further side display portion is preferably fitted on the opposite side of candle 7. As shown in FIG. 14C, a further panel of lights 1406 defining a back display portion of candle 7 can be located on a back side of the candle 7 of the gaming machine. The front, side, and back display portions of candle 7 are independently controllable by one or more controllers, such as master gaming controller 108, so different information and images can be output on the respective display portions simultaneously, and at different times. In another embodiment, the front, side, and back display portions of candle 7 are configured to present the same visual effect. In both instances, the displayed information is provided in 360 degrees.

In FIGS. 14A-C, visual effects can be presented on one or more of the panels of lights 1402-1406, to provide lighting patterns corresponding to various events occurring on the gaming machine or in the casino. As used herein, "light pattern" and "lighting pattern" refers not only to patterns and sequences of lighting, but also to the changing, patterning, and sequencing of colors of the lights. Patterns and sequences of lighting capable of being displayed on panels 1402-1406 of candle 7 include lighting intensity variations and patterns, such as flashing and strobing effects, simulated motion of a light in some direction or pattern, and selections and changes in the color of one or more lights. In addition, the lighting pattern can present textual information, such as a bet denomination or other gaming information, and present a video image signal, particularly in implementations where the candle 7 incorporates a video display screen, such as an LCD.

In one implementation, the display panels 1402-1406 incorporate lights such as full-color LEDs, which facilitate color changing schemes, and provide the desired lighting patterns and other various visual effects described above. In an alternative embodiment, candle 7 is implemented as a video display, such as an LCD, plasma screen, or other suitable display device. In another embodiment, one or more portions of candle 7 incorporate a video display, such as the front and back display portions of candle 7, while other portions of candle 7 have lights or multi-color LEDs. A single display portion, such as the front display portion, can incorporate both flashing lights/LEDs in one area and a video display in another area.

The video information output on the video display portion of candle 7 can include flashing and strobing light patterns as described above, and other moving images and graphics as desired for the particular visual presentation of gaming and casino events. One or more light patterns displayed on candle 7 can be associated with a game outcome presentation, and to present game information. Also, a light pattern can be selected and output to draw a player's attention to other gaming events occurring either at the gaming machine 2, or at a plurality of gaming machines, for instance, signaling a bonus round. Lighting patterns can be designed and output to draw player attention to various locations in a gaming environment, for various events, in accordance with embodiments of the present invention. Some categories of events are related to game play, while others are unrelated to game play, as further described below.

Figure 15A:
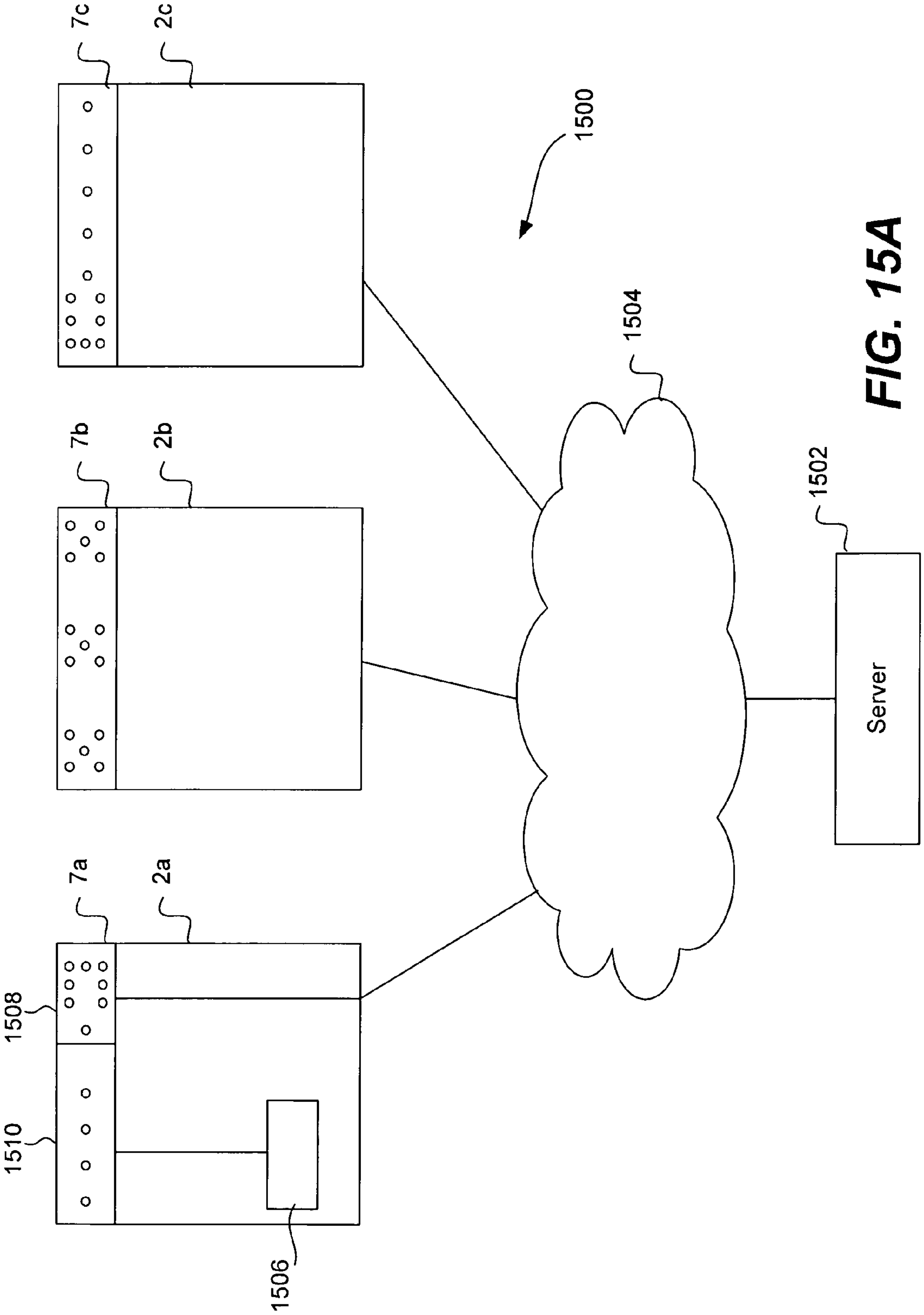
FIG. 15A shows a networked gaming system 1500, constructed according to an embodiment of the present invention.

FIG. 15A shows a networked gaming system 1500, constructed according to an embodiment of the present invention. Gaming system 1500 includes a bank of gaming machines 2*a*, 2*b*, and 2*c*, coupled to a gaming server 1502 over a suitable communications network 1504. Each machine 2*a*, 2*b*, and 2*c*, has a respective candle 7*a*, 7*b*, and 7*c*, mounted on top of the machine. In one embodiment, each of the candles 7*a*, 7*b*, and 7*c* incorporates a full-color LED array, which can be programmed to display a number of visual effects, including apparent motion, using selective lighting patterns with multiple colors and intensities. For instance, when a player of gaming machine 2*b* hits a jackpot, an output pattern of white strobing lights can be displayed on candle 7*b*. The other machines 2*a*, and 2*c*, in the bank, display a sequence of lights simulating motion, such as a moving object or animated arrow. For example, candle 7*a* can display an animated arrow of yellow lights, moving from left to right to draw attention to machine 2*b*. Simultaneously, candle 7*c* displays an animated arrow of yellow lights, moving from right to left to focus an observer's attention on machine 2*b*.

Figure 15B:
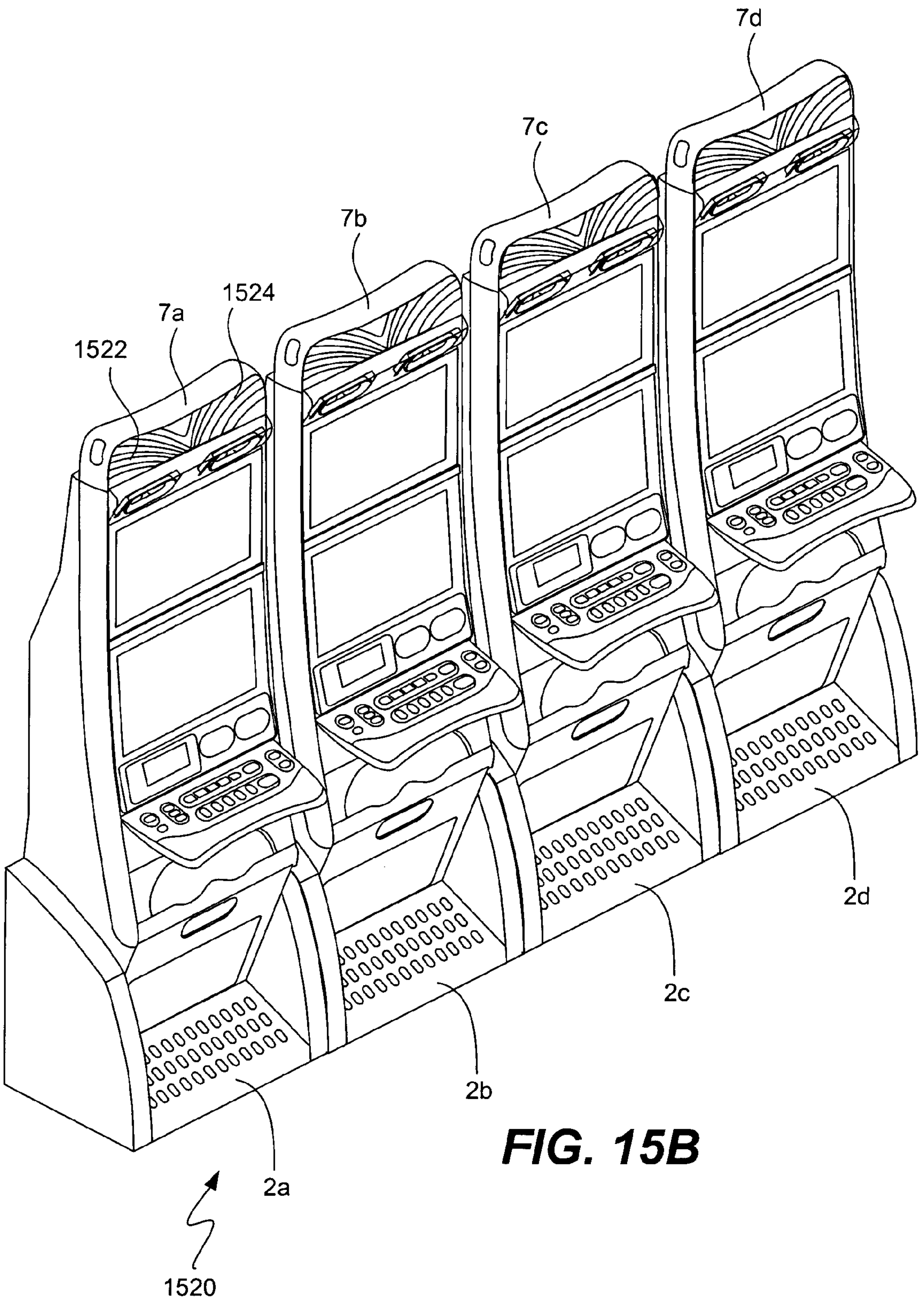
FIG. 15B shows a bank of gaming machines 1520 of a networked gaming system, constructed according to an embodiment of the present invention.

FIG. 15B shows a bank of gaming machines 1520 of networked gaming system 1500, constructed according to an embodiment of the present invention. The bank 1520 includes machines 2*a*, 2*b*, and 2*c* of FIG. 15A, and a fourth machine 2*d*. As shown, the candles 7*a*, 7*b*, 7*c*, and 7*d* of the respective machines cooperate to display lighting patterns, as described herein. At a certain time T1, the candles all show the same pattern, with at least two colors 1522 and 1524, for instance, green and blue. While not illustrated, the displayed lighting patterns can include strobing effects and light/color motion in directions along the candles 7*a*-7*d*.

In FIGS. 15A and 15B, the selection, coordination, and output of lighting patterns on the various candles 7*a*-7*d* can be controlled, at least in part, by server 1502 of FIG. 15A. Depending on the desired implementation, server 1502 can be a dedicated gaming server located, for example, in a back room of a casino. In another implementation, server 1502 is one of the gaming machines in a network. The server 1502 is coupled to a suitable storage medium to select and output one or more lighting patterns, sometimes simultaneously, to the various candles 7*a*-7*d*.

In FIG. 15A, in one embodiment, the server 1502 is coupled to control a networked region 1508 of one or more display portions of a candle 7, while the master gaming controller or other suitable display controller 1506 within the gaming machine is coupled to control a different, local region 1510 of candle 7. In this way, the gaming machine 2*a* and the server 1502 can cooperate to simultaneously output different sets of information to candle 7 for display. For instance, during game play, the gaming machine controller 1506 can output lighting patterns on the front side of candle 7 indicative of game play events and/or gaming machine service requests, while the server 1502 is coupled to output information/lighting patterns on the front, sides, and/or back side of candle 7, intended to draw attention to promotional events in the casino. The various lighting patterns can be output to predetermined sides of candle 7, as shown in FIGS. 14A-C, as desired.

In FIG. 15B, individual machines 2*a*, 2*b*, 2*c*, and 2*d*, may be controlled over the network 1504 to achieve synchronization in lighting patterns displayed on the machines. The synchronized lighting patterns can be output on a designated cluster or group of machines such as bank 1520, in some implementations, and/or across all of the machines on a casino floor. In FIG. 15A, when server 1502 is one of the gaming machines in the network, the controller of the server gaming machine can be configured to control the output of lighting patterns on its candle, and on the candles of the other machines in the network. In one implementation, when a bonus event occurs on a gaming machine in a bank of machines, that gaming machine sends a request message to server 1502 to display a synchronized set of lighting patterns across all of the machines in the bank.

In FIGS. 15A and 15B, the system 1500 is able to simultaneously articulate a wide variety of information using various effects. In its various embodiments, the gaming machines 2*a*, 2*b*, 2*c*, and 2*d* in system 1500 can be programmed to display a myriad of light and color patterns, which communicate various information to be interpreted by patrons and/or casino personnel. Some lighting patterns are related to gaming/bonusing, while others are for ancillary events unrelated to gaming. For example, a dominant color and lighting scheme, such as white strobing lights, may be displayed on the front side of a candle 7, to convey certain information to a player, such as a winning game outcome. In FIG. 15A, a secondary lighting pattern output on the networked regions 1508 of a group of candles 7 may convey different information to players, patrons, and/or casino personnel, such as a light pattern directing players to a casino exit (e.g., in an emergency), or a particular machine winning a tournament. A different lighting pattern, for example, in a color scheme of red and/or blue, may convey maintenance or service information to casino personnel. At the same time, a different dynamic lighting pattern may be output on the side panel of a candle 7 for an unrelated purpose, such as conveying alerts to casino security, such as an indication of gaming machine tampering, undetectable by patrons.

Figure 16:
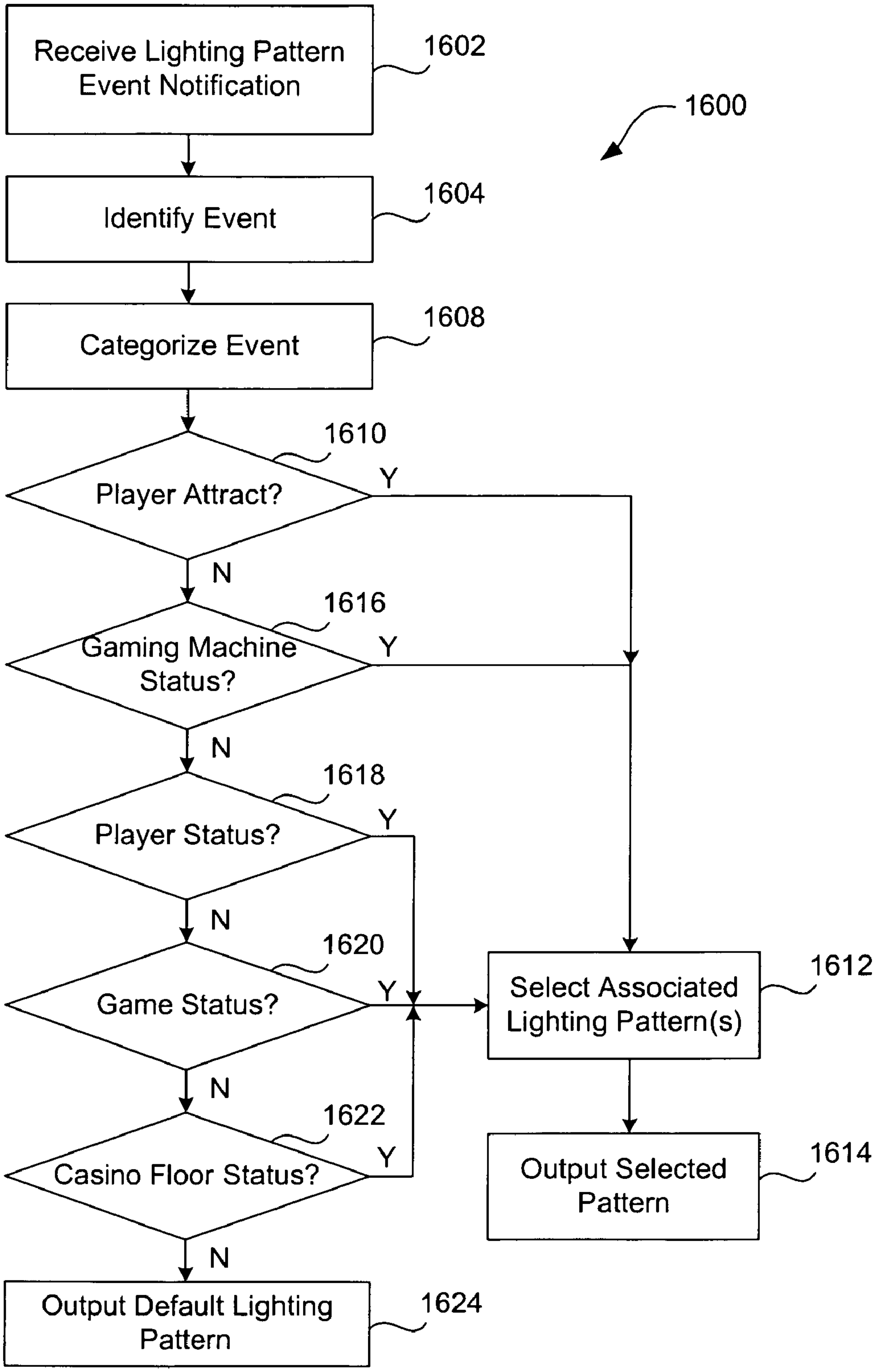
FIG. 16 shows a flow diagram of a method 1600 of coordinating the display of information, such as lighting patterns, on one or more networked gaming machines, performed in accordance with one embodiment of the present invention.

FIG. 16 shows a flow diagram of a method 1600 of coordinating the display of information, such as lighting patterns, on one or more networked gaming machines, in accordance with one embodiment of the present invention. The method 1600 can be performed by a server, the gaming machine in which the candle 7 is situated, a further gaming machine in the system, or any combination thereof, as described above. Because of the ability to simultaneously output different lighting patterns on one or more gaming machines, as described above, a plurality of instances of method 1600 can be performed simultaneously, in response to triggering events occurring independently of one another. The method 1600 includes a number of determining steps, 1610-1622, described below, which can be used to identify events and select appropriate lighting patterns to display on the candle and, in some instances, further candles and/or display devices, responsive to the identified event. Those skilled in the art should appreciate that the steps 1610, and 1616-1622, can be performed in any order. Method 1600 can also be practiced with the omission of one or more of steps 1610, and 1616-1622, as desired for the particular implementation, within the bounds of the spirit and scope of the present invention.

In FIG. 16, the method begins in step 1602, in which a lighting event notification signal is received, for instance, from a gaming machine or gaming server. The event notification signal indicates that an event has occurred on one or more gaming machines, responsive to which a lighting pattern is to be output for display on the gaming machine or a bank of gaming machines. The event can be a gaming or bonus related event, as described above, or an unrelated event. The method proceeds to step 1604, in which the gaming server identifies the event indicated in the notification signal of step 1602. By identifying the event, the server can then select a lighting pattern or synchronized plurality of lighting patterns associated with the identified event to output to the one or more gaming machines.

The selection and output of lighting patterns can be performed using several data structures and arrangements. In one embodiment, a database or other suitable storage medium in communication with the server stores a table, with one column identifying various events, and the second column identifying corresponding lighting patterns to be output when the events occur. In one implementation, lighting pattern identification information in the second column is used as an index to a further collection of lighting pattern data, to retrieve the lighting pattern data, in some instances, sets of synchronized lighting pattern data, to be output to the various candles 7*a*, 7*b*, and 7*c*. Because of the large number of events that can occur at or with respect to a gaming machine, in another embodiment, the database is arranged in a more hierarchical format, in which the events and lighting patterns are grouped into categories of events.

In one implementation, the identification of an event in step 1604 is followed by classification of the event in one or more event categories, in step 1608, so appropriate lighting pattern data can be retrieved. Various categories of gaming machine events can be constructed. In one embodiment, a "player attract" category of lighting patterns is stored in a group in a database. Lighting patterns in the player attract categories include, for example, sequences of colors and patterns designed to draw the attention of potential players to the machine on which the candle 7 is situated. In another example, the a synchronized set of lighting patterns are output to machines 2*a*, 2*b*, and 2*c*, as shown in FIG. 15A, to draw the attention of all observers to gaming machine 2*b*, for instance, when machine 2*b* hits a jackpot or triggers a bonus round.

In one embodiment, a monitoring device is implemented in software and/or hardware on the gaming machine, or coupled locally or remotely to the gaming machine. The monitoring device monitors the play frequency of the gaming machine. When a machine has been idle for some period of time, or is played less frequently than desired over a defined time interval, the monitoring device can determine that the machine is in an idle condition. Accordingly, the monitoring device outputs a player attract event notification in step 1602. The monitoring device can be coupled to monitor the occurrence of other events, as described herein.

When an event notification signal is received, the gaming server determines whether the identified event constitutes a player attract event. When the player attract event is identified, in step 1610, the gaming server or gaming machine, depending on the desired implementation, can select an associated "player attract" lighting pattern, in step 1612, retrieve the associated lighting pattern data from the database, and output the lighting data to the candle 7 in step 1614. When more than one gaming machine is to display a lighting pattern responsive to the event, for instance, in the system 1500 illustrated in FIG. 15A, a set or plurality of lighting data patterns can be output to designated machines for display. Thus, such a plurality of lighting patterns can be applied to a bank of machines, and represent a common theme or lighting pattern, which all of the machines cooperate in displaying.

The categories of lighting pattern data can be defined with desired granularities. In one example, the player attract category includes a number of different lighting patterns. The lighting pattern event notification can include an ID, which identifies a particular one of the lighting patterns. In another embodiment, the event notification has game play frequency data. In step 1612, the server or gaming machine can then select the most appropriate lighting pattern to accommodate the reported game play frequency. For example, when a machine has been played much less than desired, a more intense lighting pattern is selected, for instance, with higher-frequency strobing and frequently changing colors.

In FIG. 16, in step 1610, when the event notification signal does not identify a "player attract" event, the method proceeds to step 1616 to determine whether the notification identifies the status of the gaming machine. For instance, the event notification can indicate a service condition, in which the machine is in need of service. For example, the cashbox may be full or the ticket stack may need to be replenished. The service condition can also indicate that any of the various peripherals or components of the gaming machine are in need of service. The machine status notification can indicate other conditions relating to status of the gaming machine. For instance, the status notification can indicate a particular game being played on the machine, the denomination of the game, a level of wager activity at the machine, a tampering/security alert, and other conditions.

In FIG. 16, in step 1616, when the event notification can be categorized as a machine status indication, an appropriate lighting pattern is selected in step 1612, and output to the gaming machine for display on candle 7. Again, various levels of granularity can be implemented to differentiate among the various machine status lighting patterns. In one implementation, a machine status ID is embedded in the event notification. The machine status ID identifies a particular machine status condition. The machine status ID is then used as an index to the database, within the machine status category of lighting patterns, to retrieve the particular lighting pattern or patterns associated with the identified status condition. The lighting pattern data is then provided to candle 7, where a controller is programmed to display an intermittent pattern indicating the status condition, such as a need for service. The use of lighting patterns to indicate such machine status conditions in this manner can eliminate the need for separate indicators on the various devices, which may be distracting to players.

In FIG. 16, returning to step 1616, when the event notification cannot be categorized as a gaming machine status indication, the method 1600 proceeds to step 1618, in which it is determined whether the event notification identifies a player status condition. For example, in step 1602, the event notification can be output responsive to the player pressing a button or activating another suitable input device that triggers an intermittent lighting pattern to summon such assistance. For instance, the gaming machine controller may interact with a player tracking unit and system to identify the player as a high-value customer, or as having other attributes deserving of attention. In such situations, the event notification can indicate player status, and an appropriate lighting pattern can be selected in step 1612 and output in step 1614, for display on the gaming machine at which the identified player is located. As shown in FIG. 15A, for instance, related and secondary lighting patterns can be output to the candles of other gaming machines, such as adjacent machines 2*a* and 2*c* in the bank, to draw even more attention to the player at machine 2*c*. Casino personnel can desirably interpret the selected lighting pattern, so such personnel can respond by approaching the player and offering assistance, and/or various services or awards to the player.

In FIG. 16, returning to step 1618, when the event notification cannot be categorized as indicative of a player status condition, the method 1600 proceeds to step 1620, in which it is determined whether the event notification is indicative of a game status condition. For instance, the candle 7 can be integrated into the game play, so that displayed light patterns can be synchronized with game audio, game play outcomes and other events, and other game color and lighting schemes on other apparatus of the gaming machine. In another example, a gaming machine can participate in a progressive jackpot. The event notification can indicate increments of the jackpot amount. Thus, as the jackpot amount increases, increasingly "frantic" or exciting lighting patterns can be selected in step 1612 and output to the candle 7 in step 1614. In this way, the lighting pattern data output for display on the candle provides lighting and color sequences with increasing intensity. Likewise, the displayed effects may draw attention to machines, which have recently paid large jackpots, and/or those which have not paid well and can therefore be viewed as "due" to hit soon.

In FIG. 16, returning to step 1620, when the event notification cannot be categorized as player status, the method 1600 proceeds to step 1622, in which it is determined whether the event notification is indicative of a gaming environment floor status condition. Gaming environment status conditions provide indications of events occurring on a gaming environment floor, such as a casino, where a plurality of gaming machines and/or display devices can be synchronized to direct patron attention. In one embodiment, a casino floor comprises a large number of gaming machines having candles. Network synchronization of the gaming machines can, therefore, focus the attention of a large number of patrons on the floor towards a certain location. The 360 degree viewing area of the candles 7, as described above, facilitates communication of lighting patterns to patrons at various locations on the floor.

In another example, an environment status event notification can be issued when a large jackpot has been won, or a player enters a large bonus round. When categorized as a gaming environment status condition, in step 1622, a "traveling" synchronized pattern of moving lights can be output to various gaming machines, and other display devices such as wall-mounted video displays and screens, in step 1614, to direct the attention of the entire casino floor, or a portion thereof, to the bonus event on a particular machine. In another example, the environment status condition can be issued for promotional purposes, to direct patron attention to various parts of a casino, such as restaurants, shows, or special events. Also, when the event notification indicates an emergency, an appropriate synchronized lighting pattern may be selected and output on the appropriate candles and other display devices to direct patrons to emergency exits. In another example, networked, multi-player games are implemented on selected machines on the casino floor. Players linked to each other by virtue of a common game on the selected machines can be identified by lighting patterns having unique colors or lighting sequences to allow those players to identify each other.

In FIG. 16, returning to step 1622, when the event notification of step 1602 cannot be categorized as indicative of a casino floor status condition and, in this embodiment, thus not categorized as any of the defined categories of events in steps 1610, and 1616-1622, a default lighting pattern can be selected and output in step 1624, such as a flashing pattern of default colors displayed on the candle 7.

In FIG. 16, the method 1600 can be performed to select and output appropriate lighting patterns for display on one or more candles of gaming machines, and other various display devices in a casino. The principles of method 1600 are equally applicable to other light-emitting and display devices on a gaming machine, such as light arrangements on a button panel, a video display serving as an information panel, and other various input and output devices on the gaming machine, as outlined above. Thus, method 1600 can provide coordinated lighting patterns to be displayed on various components of a gaming machine, so that the patterns are synchronized with respect to one another, and with respect to other gaming machines on the gaming environment floor to convey the desired information.

Figure 17A:
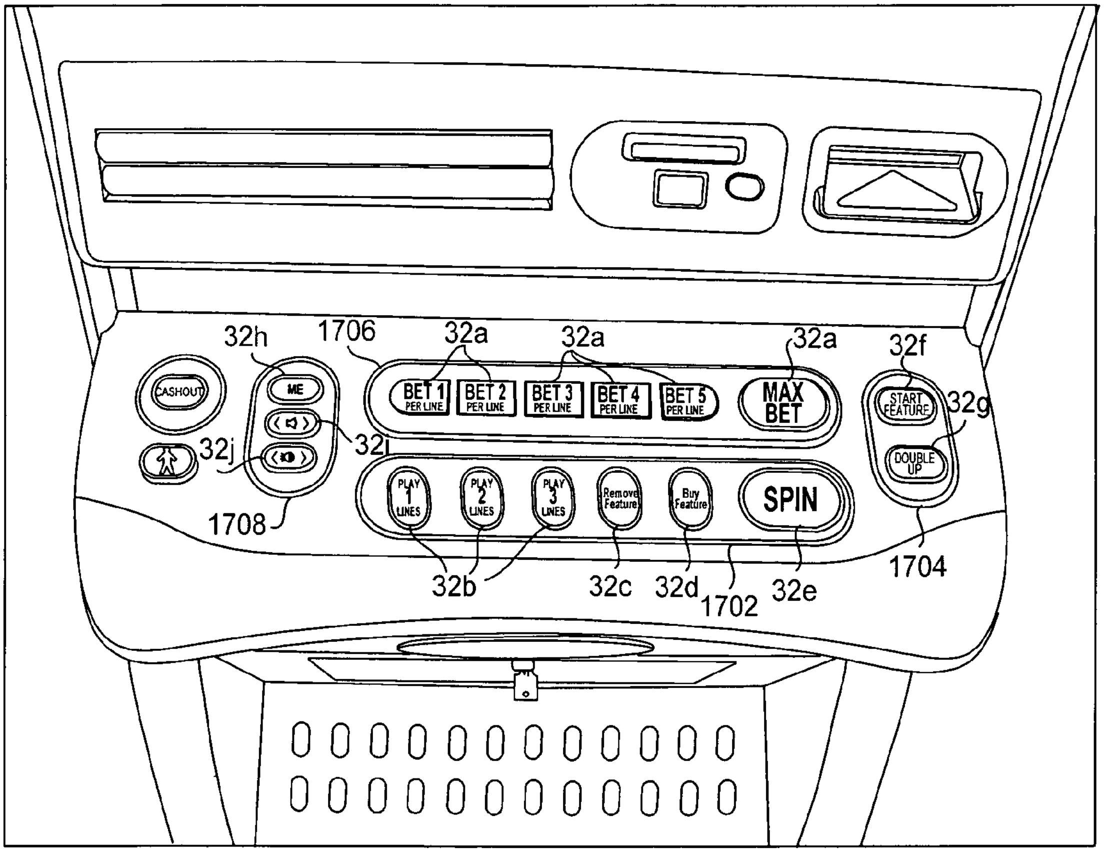
FIGS. 17A and 17B show button panels 6*a* and 6*b*, constructed according to embodiments of the present invention.
Figure 17B:
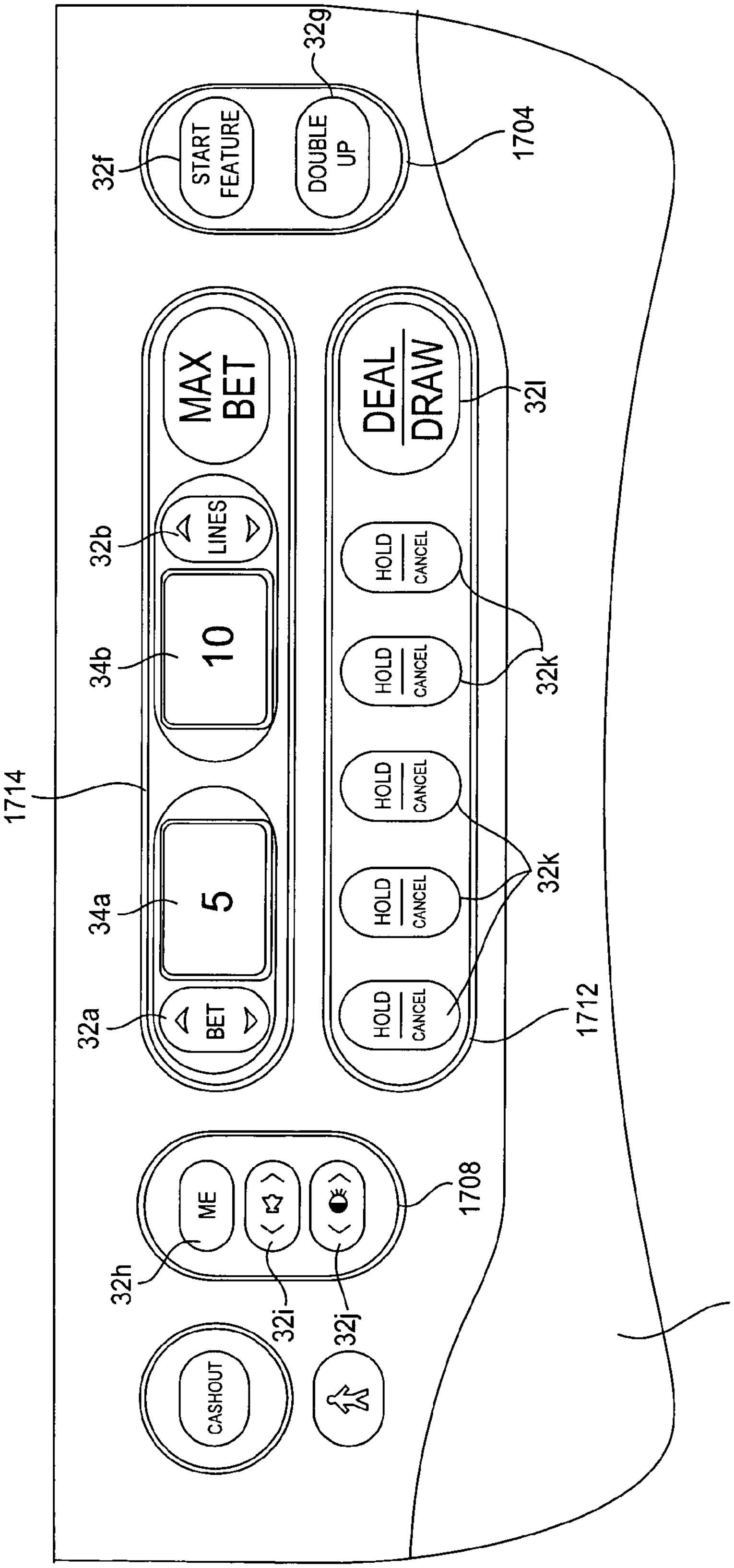

FIGS. 17A and 17B show button panels 6*a* and 6*b*, constructed according to embodiments of the present invention. Each button panel 6*a* and 6*b* can be mounted to the gaming machine cabinet 4, as described above. In FIG. 17A, the button panel 6*a* includes a group of bet selection buttons 32*a*, a group of payline select buttons 32*b*, and other buttons such as "Remove Feature" 32*c*, "Buy Feature" 32*d*, and "Spin" 32*e*. A further group of buttons includes "Start Feature" 32*f*, and "Double Up" 32*g*. A group of buttons providing personalized settings for the presentation of games and game play on the machine includes a "Me" button 32*h*, volume control button 32*i*, and display brightness button 32*j*. Various additional buttons can be provided on button panel 6*a*, depending on the game and game-related functions for which player input is to be received.

As mentioned above, players often complain about the sound level of their machine, or of the surrounding machines. A further mechanism for addressing this concern is the volume control button 32*i*. The volume control button 32*i*, coupled to an audio output device controlling the speakers 9 and 11, enables the player to adjust the speaker volume for control of the audio presentation of sounds on the gaming machine. In this way, control of the sound level can be in the player's hands. The volume button 32*i* on button panel 6 empowers the player to take control of his or her experience and adjust the volume to a preferred setting. The button can be implemented in hardware, software, and combinations thereof. In one embodiment, the volume control button 32*i* is coupled to master gaming controller 108. When the volume control button 32*i* is pressed, a user interface is presented on the main display 8 or information panel 10, for example, with graphical slides to set the volume.

In FIGS. 17A and 17B, the brightness button 32*j* is coupled to enable the player to adjust brightness of the main display of the gaming machine, to control the video presentation on the machine. Other display controls found on video display devices, such as hue, contrast, black level, and other parameters can be incorporated as buttons on button panel 6. These buttons, and interfaces providing the levels or settings for the various buttons, can also be implemented graphically on main display 8 or information panel 10. In one embodiment, the information panel 10 or main display 8 incorporates a touch screen for a player to interact directly with the graphical representations of the various button selections.

The "Me" button 32*h* causes the master gaming controller or other suitable processor to retrieve volume, brightness, and other audio and video parameter settings stored as player preferences for the player. In one embodiment, such audio and video parameter settings are stored as elements of player tracking data maintained by a player tracking server or other device on a suitable storage medium. Thus, the desired audio and video parameter settings for a gaming machine can be stored as part of the player's profile data. When a player inserts a player tracking card into the gaming machine, or otherwise inputs player identification information, the gaming machine is capable of retrieving the player's preferred audio and video parameter settings from the storage medium, using the player identification information as an index to retrieve such data. In another embodiment, the parameter settings are stored, or encoded, on the player tracking card or other suitable storage device. In one embodiment, the parameter settings can be retrieved with other player tracking information automatically in response to input of player identification information to the machine. In another embodiment, the audio and video parameter settings are retrieved when the "Me" button 32*h* is pressed.

In FIG. 17B, an alternative arrangement and configuration of buttons is shown on panel 6*b*. As with button panel 6*a*, the panel 6*b* includes the personalized settings group of buttons 32*h*, 32*i*, and 32*j*, and the group including "Start Feature" button 32*f*, and "Double Up" button 32*g*. A group of "Hold" buttons 32*k* and a "Deal/Draw" button 32*l* are provided to implement functions of games of chance available on the machine, such as video poker and blackjack. The bet selection buttons 32*a* and payline selection buttons 32*b* are reduced and grouped together in a different arrangement and configuration, with small LCD screens 34*a* and 34*b* or other suitable video display devices mounted in the button panel to show game play settings. In particular, display 34*a* is positioned next to bet select button 32*a*, to indicate the selected bet per line. Display 34*b* is situated next to the payline select button 32*b*, to indicate the number of selected paylines. When the player actuates the buttons 32*a* and 32*b*, the displays 34*a* and 34*b* are updated accordingly.

In FIGS. 17A and 17B, the buttons 32 can be implemented as pre-printed mechanical buttons. In another embodiment, the buttons incorporate button-size LCD or OLED displays, which can be configured to display any variety of gaming functions, depending on the particular game or selection of games available on the machine. Button panels constructed in accordance with embodiments of the present invention are well-suited for the inclusion of haptic feedback from game events. The panels are also capable of supporting other features and input devices, including but not limited to joysticks, touch screens, and a removable/disposable cup holder.

In FIGS. 17A and 17B, the various groupings of buttons on the button panel are surrounded by borders constructed of variable-color light emitting elements, such as multi-color LEDs. For instance, in FIG. 17A, bet buttons 32*a* are surrounded by border 1706, buttons 32*b*-32*e* are surrounded by border 1702, buttons 32*f* and 32*g* are surrounded by border 1704, and personalized settings buttons 32*h*-32*j* are surrounded by border 1708. In FIG. 17B, buttons 32*k* and 32*l* are surrounded by light border 1712, and the group of buttons 32*a*, 32*b*, 34*a*, and 34*b*, are surrounded by light border 1714. Groups of panel buttons are enclosed by the various variable-color borders, which are independently controlled and illuminated from the interior of the button panel assembly 6. Control of the illumination is provided by the master gaming controller, or a suitable processor coupled to the light borders, for instance, inside the button panel 6.

In FIGS. 17A and 17B, the various light borders represent one implementation of a coordinated lighting arrangement configured to display lighting patterns, which can be used for various purposes, such as to draw the player's attention to one or more particular buttons when a certain event occurs. For instance, after drawing cards in a video blackjack game, the game is configured to highlight the border 1712 surrounding "Hold" buttons, to assist the player in finding the appropriate button(s) to press at that stage of game play. The group of bet select buttons 32*a* is lighted at another stage of game play. Other implementations of lighting and button groupings can provided, in accordance with embodiments of the present invention. For example, lights can be situated behind buttons having substantially clear portions, so activation of the lights highlights a defined group of buttons.

Figure 18:
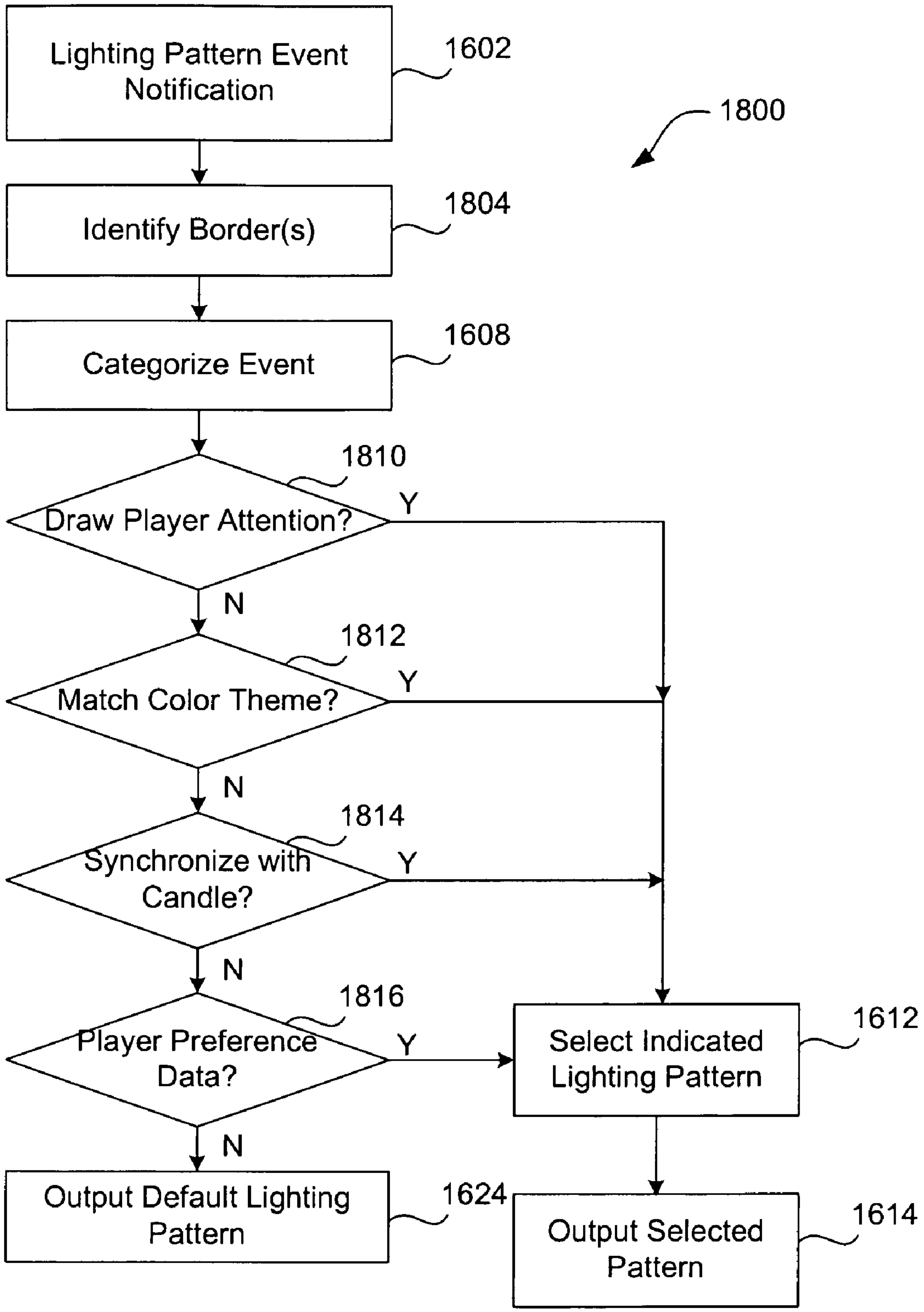
FIG. 18 shows a flow diagram of a method 1800 of coordinating the lighting of buttons or groups of buttons to display lighting patterns, on one or more networked gaming machines, performed in accordance with one embodiment of the present invention.

FIG. 18 shows a flow diagram of a method 1800 of coordinating the lighting of buttons or groups of buttons to display lighting patterns, on one or more networked gaming machines, in accordance with one embodiment of the present invention. Similar to the method 1600 of FIG. 16 above, the method 1800 can be performed by a server, the gaming machine on which the button panel 6 is situated, a further gaming machine in the system, or any combination thereof. Because of the ability to simultaneously output different lighting patterns, a plurality of instances of method 1800 can be performed simultaneously, in response to triggering events occurring independently of one another. The method 1800 also includes a number of determining steps, described below, which are used to identify events and select appropriate lighting patterns to display on the candle and, in some instances, further candles and/or display devices, responsive to the identified event. Those skilled in the art should appreciate that the steps can be performed in any order. Method 1800 can also be practiced with the omission of one or more steps, as desired for the particular implementation, within the bounds of the spirit and scope of the present invention.

In FIG. 18, the method 1800 begins with steps 1602 and 1608, as described above with respect to FIG. 16. Unlike method 1600, step 1604 is replaced with step 1804, in which one or more light borders are identified in the event notification signal as designated to receive a lighting pattern. In FIG. 18, in step 1810, it is determined whether the event notification is intended to draw player attention to one or more lighted buttons. For instance, during a certain phase of game play, the player may need to select one of a particular group of buttons, such as the bet buttons 32*a* on panel 6*a*. Thus, when game play reaches this phase, the event notification signal identifies border 1706 to be lighted, in step 1804, and indicates a lighting pattern, such as a color change or flashing lights. In another example, the event notification in step 1810 corresponds to another game play event, such as the machine hitting a bonus. In this case, for example, a default light border color such as blue is changed to a different color, such as red, to signal the bonus. In yet another example, a change in lighting pattern is triggered when the player of the machine is winning a slot tournament. For instance, the light borders on the panel of the winning gaming machine are changed to a yellow strobing pattern, while light borders on panels of other machines in the bank are colored blue.

In FIG. 18, the indicated lighting pattern is selected in step 1612, and output for display on the identified border or borders in step 1614. In one embodiment, the mechanics of the selecting step 1612 and outputting step 1614 can be performed as described above with respect to FIG. 16. In a simpler embodiment, a single lighting pattern, such as a color highlight or color change, is the one selected and output when the event notification is intended to draw player attention, in step 1810.

In FIG. 18, in step 1812, the event notification can also indicate a color theme. The color theme can be applicable to the particular game being played on the machine, or be generally applicable to a group of machines presenting the same or similar games, or participating in the same jackpot. In one embodiment, in step 1812, the event notification signal provides a color ID field, which is used to identify a color or combination of colors to be displayed on one or more buttons, or groups of buttons on the button panel 6. In one example, when a Little Green Men game is played on the machine, all of the various light borders are lighted in the color green. Thus, responsive to a game play event, when border 1706 is identified to be lighted, for example, the border 1706 can present a flashing or strobing sequence of green lights.

In another situation, the event notification signal indicates that one or more light borders on button panel 6 are to be synchronized with a lighting pattern displayed on the candle 7, main display 8, information panel 10, or other light emitting and/or video device on the machine. In one embodiment, the event notification provides a reference to the candle lighting pattern. A database or subset of data is constructed with corresponding button lighting patterns, which match the candle lighting patterns. Thus, in step 1612, the corresponding button lighting pattern is selected and output, in step 1614, to the designated buttons or groups of buttons. In this way, the button lighting patterns are synchronized with the color and motion of the candle.

In FIG. 18, in step 1816, lighting patterns displayed on button panel 6 can be selected according to player preferences. For instance, a player tracking server coupled to the gaming system can store player identification data, and associated preferences for visual and audio presentation of games and game-related information. For example, player preference data can indicate a particular color scheme or lighting sequence that the identified player finds stimulating and enjoyable. Thus, in step 1816, the event notification signal can be generated responsive to receiving player identification information for the player. The player identification information is provided to the player tracking server to look up the lighting pattern(s) indicated as preferred by that player. The player tracking server can provide the retrieved information to the gaming server or machine, to then output the preferred lighting pattern to the light borders on the button panel for display. Thus, colors and lighting behavior may be controlled according to player preferences, including implementations which allow a player to customize the machine configuration to suit that player's own preferences.

In FIG. 18, following step 1816, when the event notification cannot be classified in one or more categories of lighting patterns, a default lighting pattern is output to the designated light borders for display, in step 1624.

While the invention has been particularly shown and described with reference to specific embodiments thereof, it will be understood by those skilled in the art that changes in the form and details of the disclosed embodiments may be made without departing from the spirit or scope of the invention. For instance, various alternative hardware embodiments are contemplated to leverage the use of player tracking data, including the consolidation of the player preference data retrieval and lighting pattern control into a single gaming server or one or more gaming machines in the system. Also, the gaming network may be connected to other devices including other servers or gaming devices over the Internet or through other wired and wireless systems. Moreover, embodiments of the present invention may be employed with a variety of network protocols and architectures. Thus, the examples described herein are not intended to be limiting of the present invention. It is therefore intended that the appended claims will be interpreted to include all variations, equivalents, changes and modifications that fall within the true spirit and scope of the present invention.

What is claimed is:

1. A gaming machine for playing a game of chance comprising:

a cabinet having a longitudinal axis;

a first door mounted to the cabinet in a first region of the cabinet, the first door having a closed position enclosing a plurality of peripheral devices in a first space and not enclosing a processor, the first door moveable to an open position to permit access to the peripheral devices, the peripheral devices including a printer having a ticket stack and a bill acceptor having a cashbox, the printer configured to print and dispense tickets from the ticket stack, the bill acceptor configured to receive cash for a wager on the game of chance and store the cash in the cashbox, the ticket stack and the bill acceptor each having an access portion situated in the first space for access when the first door is in the open position;

a second door mounted to the cabinet in a second region of the cabinet, the second door having a closed position enclosing the processor in a second space not including peripheral devices, the processor coupled to output game data to a display and control play of the game of chance, the second door moveable to an open position to permit access to the processor, the second space not accessible through the first space and the first space not accessible through the second space; and a button panel mounted to the cabinet and coupled to the processor to provide player input for the game of chance, the button panel positioned along the longitudinal axis.

2. The gaming machine of claim 1, the first door locked with a first lock, and the second door locked with a second lock.

3. The gaming machine of claim 2, a first key provided for the first lock to define a first level of security, and a second key provided for the second lock to define a second level of security.

4. The gaming machine of claim 2, a first key provided for the first lock to define a first level of security, and a second key provided for the first lock and the second lock to define a second level of security.

5. The gaming machine of claim 1, wherein the first door includes a display.

6. The gaming machine of claim 5, wherein the display is a main display.

7. The gaming machine of claim 5, wherein the display is an information panel.

8. The gaming machine of claim 1, wherein the ticket stack is a fan-fold-fed device.

9. The gaming machine of claim 1, wherein the ticket stack is a force-fed device.

10. The gaming machine of claim 1, wherein the access portion of the ticket stack includes an opening.

11. The gaming machine of claim 10, wherein the opening is oriented in a substantially upward direction along the longitudinal axis.

12. The gaming machine of claim 1, wherein the bill acceptor and the printer are mounted on a shelf.

13. The gaming machine of claim 12, wherein the shelf defines a boundary between the first space and the second space of the cabinet.

14. The gaming machine of claim 12, wherein the shelf is integral with the cabinet.

15. The gaming machine of claim 12, wherein one or more ventilation holes are formed in the shelf.

16. The gaming machine of claim 1, wherein the access portion of the cashbox includes a moveable door having a closed position to enclose the cash and an open position to permit access to the cash.

17. The gaming machine of claim 1, wherein the first door includes a player tracking module exposing, when the first door is in the closed position, an interface portion of the bill acceptor and an interface portion of the printer.

18. A gaming machine for playing a game of chance comprising:

a cabinet having a longitudinal axis;

a display mounted to the cabinet in a first region of the cabinet, the display configured to display game data related to the game of chance, the display having a closed position enclosing a plurality of peripheral devices in a first space and not enclosing a processor, the display moveable to an open position to permit access to the peripheral devices, the peripheral devices including a printer having a ticket stack and a bill acceptor having a cashbox, the ticket stack and the bill acceptor each having an access portion situated in the first space for access when the first door is in the open position;

a door mounted to the cabinet in a second region of the cabinet, the door having a closed position enclosing the processor in a second space not including peripheral devices, the processor coupled to output the game data to the display, the door moveable to an open position to permit access to the processor, the second space not accessible through the first space and the first space not accessible through the second space; and a button panel mounted to the cabinet and coupled to the processor to provide player input for the game of chance.

19. The gaming machine of claim 18, further comprising a shelf defining a boundary between the first space and the second space of the cabinet.

20. A gaming machine for playing a game of chance comprising:

a cabinet having a longitudinal axis;

a first display mounted to the cabinet in a first region of the cabinet, the first display coupled to display game data related to the game of chance, the first display having a closed position enclosing a plurality of peripheral devices in a first space and not enclosing a processor, the first display moveable to an open position to permit access to the peripheral devices, the peripheral devices including a printer having a ticket stack and a bill acceptor having a cashbox, the ticket stack and the bill acceptor each having an access portion situated in the first space for access when the first door is in the open position;

a second display mounted to the cabinet in the first region of the cabinet, the second display coupled to display game information;

a door mounted to the cabinet in a second region of the cabinet, the door having a closed position enclosing the processor in a second space not including peripheral devices, the processor coupled to output the game data and the game information, the door moveable to an open position to permit access to the processor;

a shelf defining a boundary between the first space and the second space of the cabinet, the second space not accessible through the first space and the first space not accessible through the second space; and a button panel mounted to the cabinet and coupled to the processor to provide player input for the game of chance.

* * * * *